US012619111B2

(12) United States Patent
Garbar et al.

(10) Patent No.: US 12,619,111 B2
(45) **Date of Patent: *May 5, 2026**

(54) COLOR FILTER ENHANCEMENTS FOR DISPLAY DEVICES

(71) Applicant: Eyesafe Inc., Eden Prairie, MN (US)

(72) Inventors: Arkady Garbar, Lakeville, MN (US);
Derek Harris, Saint Paul, MN (US);
Davis Lee, Seoul (KR)

(73) Assignee: Eyesafe Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,326

(22) Filed: Mar. 13, 2024

(65) Prior Publication Data

US 2024/0219767 A1     Jul. 4, 2024

(51) Int. Cl.
*G02F 1/1335*     (2006.01)
*F21V 8/00*     (2006.01)
(Continued)

(52) U.S. Cl.
CPC ......... *G02F 1/133514* (2013.01); *G02B 1/04* (2013.01); *G02B 5/003* (2013.01); *G02B 5/208* (2013.01); *G02B 5/22* (2013.01); *G02B 6/0051* (2013.01); *G02F 1/133536* (2013.01); *G02F 1/133603* (2013.01); *H05B 47/11* (2020.01);
(Continued)

(58) Field of Classification Search
CPC .................................................. G02F 1/133514
See application file for complete search history.

(56) References Cited

U.S. PATENT DOCUMENTS

| | | | |
|---|---|---|---|
| 2,403,685 A | 7/1946 | Sachtleben et al. | |
| 2,493,200 A | 1/1950 | Land | |

(Continued)

FOREIGN PATENT DOCUMENTS

| | | | |
|---|---|---|---|
| CA | 2924278 A1 | 6/2008 | |
| CN | 1545702 A | 11/2004 | |

(Continued)

OTHER PUBLICATIONS

Inoue et al., "Development of Color Resists Containing Novel Dyes for Liquid Crystal Displays", Sumitomo Chemical Co., Ltd., IT-Related Chemicals Research Laboratory, 2013.
(Continued)

*Primary Examiner* — Edmond C Lau
(74) *Attorney, Agent, or Firm* — GRUMBLES LAW PLLC; Brittany Haanan

(57) ABSTRACT

A display system comprising a backlight device having a light emitting array, a liquid crystal panel, and a color filter having one or more absorbing dyes and, optionally, one or more dye enhancement compounds, wherein the one or more absorbing dyes and the one or more dye enhancement compounds are located in at least one color set of subpixels in the color filter. The one or more absorbing dyes may be a soluble, blue light, green light, or red light absorbing dye included in blue, green, or red subpixels of the color filter. A blue light absorbing dye may reduce transmission in a wavelength range of 410-430 nm, a green light absorbing dye may reduce transmission in a wavelength range of 490-570 nm, and a red light absorbing dye may reduce transmission of wavelengths less than 620 nm.

27 Claims, 50 Drawing Sheets

(51) Int. Cl.

| | |
|---|---|
| *G02B 1/04* | (2006.01) |
| *G02B 5/00* | (2006.01) |
| *G02B 5/20* | (2006.01) |
| *G02B 5/22* | (2006.01) |
| *G02F 1/13357* | (2006.01) |
| *H05B 47/11* | (2020.01) |

(52) U.S. Cl.
CPC .. *G02F 1/133607* (2021.01); *G02F 1/133614* (2021.01); *G02F 2201/086* (2013.01)

(56) References Cited

U.S. PATENT DOCUMENTS

| | | | |
|---|---|---|---|
| 3,382,183 A | 5/1968 | Donoian et al. |
| 3,482,915 A | 12/1969 | Ferrand |
| 3,687,863 A | 8/1972 | Paul |
| 4,618,216 A | 10/1986 | Suzawa |
| 4,842,781 A | 6/1989 | Nishizawa et al. |
| 4,878,748 A | 11/1989 | Johansen et al. |
| 4,966,441 A | 10/1990 | Conner |
| 4,989,953 A | 2/1991 | Kirschner |
| 5,083,252 A | 1/1992 | Mcguire |
| 5,177,509 A | 1/1993 | Johansen et al. |
| 5,446,569 A | 8/1995 | Iwai et al. |
| 5,483,464 A | 1/1996 | Song |
| 5,555,492 A | 9/1996 | Feger |
| 5,745,391 A | 4/1998 | Topor |
| 5,952,096 A | 9/1999 | Yamashita et al. |
| 6,019,476 A | 2/2000 | Kirschner |
| 6,229,252 B1 | 5/2001 | Teng et al. |
| 6,295,106 B1 * | 9/2001 | Fukuzawa ............. C09B 69/101 |
| | | 349/71 |
| 6,663,978 B1 | 12/2003 | Olson et al. |
| 6,778,238 B2 | 8/2004 | Moon et al. |
| 6,824,712 B1 | 11/2004 | Yang et al. |
| 6,826,001 B2 | 11/2004 | Funakura et al. |
| 6,846,579 B2 | 1/2005 | Anderson et al. |
| 6,955,430 B2 | 10/2005 | Pratt |
| 6,984,038 B2 | 1/2006 | Ishak |
| 6,991,849 B2 | 1/2006 | Oya |
| 7,014,336 B1 | 3/2006 | Ducharme et al. |
| 7,019,331 B2 | 3/2006 | Winters et al. |
| 7,019,799 B2 | 3/2006 | Utsumi et al. |
| 7,019,903 B2 | 3/2006 | Berger et al. |
| 7,029,118 B2 | 4/2006 | Ishak |
| 7,045,944 B2 | 5/2006 | Ushifusa et al. |
| 7,066,596 B2 | 6/2006 | Ishak |
| 7,071,602 B2 | 7/2006 | Terui et al. |
| 7,126,589 B2 | 10/2006 | Sung |
| 7,158,300 B2 | 1/2007 | Shimoda |
| 7,193,779 B2 | 3/2007 | Kim et al. |
| 7,218,044 B2 | 5/2007 | Kim et al. |
| 7,227,190 B2 | 6/2007 | Yasukawa et al. |
| 7,258,923 B2 | 8/2007 | Van Den et al. |
| 7,491,440 B2 | 2/2009 | Fukatani et al. |
| 7,520,608 B2 | 4/2009 | Ishak et al. |
| 7,524,060 B2 | 4/2009 | Ramos et al. |
| 7,556,376 B2 | 7/2009 | Ishak et al. |
| 7,572,028 B2 | 8/2009 | Mueller et al. |
| 7,579,769 B2 | 8/2009 | Wu et al. |
| 7,630,128 B2 | 12/2009 | Krieg-Kowald |
| 7,695,180 B2 | 4/2010 | Schardt et al. |
| 7,703,917 B2 | 4/2010 | Sanchez |
| 7,710,511 B2 | 5/2010 | Gehlsen et al. |
| 7,731,791 B2 | 6/2010 | Deno et al. |
| 7,755,276 B2 | 7/2010 | Wang et al. |
| 7,785,501 B2 | 8/2010 | Segawa et al. |
| 7,825,578 B2 | 11/2010 | Takashima et al. |
| 7,832,903 B2 | 11/2010 | Ramos |
| 7,884,545 B2 | 2/2011 | Yokoyama et al. |
| 7,914,177 B2 | 3/2011 | Sanchez et al. |
| 8,034,206 B2 | 10/2011 | Kim et al. |
| 8,044,942 B1 | 10/2011 | Leonhard et al. |
| 8,063,999 B2 | 11/2011 | Jabri et al. |
| 8,075,133 B2 | 12/2011 | Sanchez |
| 8,075,145 B2 | 12/2011 | Engblom et al. |
| 8,113,651 B2 | 2/2012 | Blum et al. |
| 8,164,844 B2 | 4/2012 | Toda et al. |
| 8,303,859 B2 | 11/2012 | Koo et al. |
| 8,323,357 B2 | 12/2012 | Feldhues et al. |
| 8,360,574 B2 | 1/2013 | Ishak et al. |
| 8,403,478 B2 | 3/2013 | Ishak |
| 8,487,331 B2 | 7/2013 | Jang et al. |
| 8,498,042 B2 | 7/2013 | Danner et al. |
| 8,500,274 B2 | 8/2013 | Ishak |
| 8,506,114 B2 | 8/2013 | Ven |
| 8,507,840 B2 | 8/2013 | Yu et al. |
| 8,518,498 B2 | 8/2013 | Song et al. |
| 8,547,504 B2 | 10/2013 | Guo et al. |
| 8,570,648 B2 | 10/2013 | Sanchez |
| 8,599,542 B1 | 12/2013 | Healey et al. |
| 8,657,455 B2 | 2/2014 | Yagi et al. |
| 8,659,724 B2 | 2/2014 | Hagiwara et al. |
| 8,680,406 B2 | 3/2014 | Chua |
| 8,680,492 B2 | 3/2014 | Ren et al. |
| 8,716,729 B2 | 5/2014 | Wiesmann et al. |
| 8,759,540 B2 | 6/2014 | Maeda et al. |
| 8,767,282 B2 | 7/2014 | Hashimura et al. |
| 8,770,749 B2 | 7/2014 | McCabe et al. |
| 8,817,207 B2 | 8/2014 | Rho et al. |
| 8,836,209 B2 | 9/2014 | Baek et al. |
| 8,882,267 B2 | 11/2014 | Ishak et al. |
| 8,928,220 B2 | 1/2015 | Ko et al. |
| 8,957,835 B2 | 2/2015 | Hoellwarth |
| 8,982,197 B2 | 3/2015 | Kim et al. |
| 9,051,232 B2 | 6/2015 | Kosuge et al. |
| 9,063,349 B2 | 6/2015 | Ishak et al. |
| 9,122,089 B2 | 9/2015 | Lee et al. |
| 9,287,471 B2 | 3/2016 | De et al. |
| 9,377,569 B2 | 6/2016 | Ishak et al. |
| 9,545,304 B2 | 1/2017 | Ishak et al. |
| 9,575,335 B1 | 2/2017 | Mccabe et al. |
| 9,798,163 B2 | 10/2017 | Ishak et al. |
| 9,814,658 B2 | 11/2017 | Ishak et al. |
| 9,885,885 B2 | 2/2018 | Weber et al. |
| 9,927,635 B2 | 3/2018 | Ishak et al. |
| 10,247,980 B2 | 4/2019 | Cho et al. |
| 10,418,532 B2 | 9/2019 | Okubo |
| 10,649,129 B2 | 5/2020 | Chang et al. |
| 10,957,826 B2 | 3/2021 | Itoga et al. |
| 2002/0005509 A1 | 1/2002 | Teng et al. |
| 2002/0018890 A1 | 2/2002 | Sugimachi |
| 2002/0158574 A1 | 10/2002 | Wolk et al. |
| 2003/0214695 A1 | 11/2003 | Abramson et al. |
| 2004/0070726 A1 | 4/2004 | Ishak |
| 2004/0114242 A1 | 6/2004 | Sharp |
| 2004/0166342 A1 | 8/2004 | Wursche et al. |
| 2004/0181006 A1 | 9/2004 | Warren, Jr. et al. |
| 2004/0232813 A1 | 11/2004 | Nakano et al. |
| 2004/0246413 A1 | 12/2004 | Stephenson et al. |
| 2005/0042531 A1 | 2/2005 | Lee et al. |
| 2005/0259082 A1 | 11/2005 | Potsch et al. |
| 2005/0275769 A1 | 12/2005 | Roh et al. |
| 2005/0285997 A1 | 12/2005 | Koyama et al. |
| 2006/0012754 A1 | 1/2006 | Larson et al. |
| 2006/0040416 A1 | 2/2006 | Sano |
| 2006/0045989 A1 | 3/2006 | Minami |
| 2007/0013649 A1 | 1/2007 | Kim et al. |
| 2007/0030415 A1 | 2/2007 | Epstein |
| 2007/0058107 A1 | 3/2007 | Im et al. |
| 2007/0077410 A1 | 4/2007 | Shi |
| 2007/0078216 A1 | 4/2007 | Cao et al. |
| 2007/0146584 A1 | 6/2007 | Wang et al. |
| 2007/0195404 A1 | 8/2007 | Iijima |
| 2007/0216861 A1 | 9/2007 | Ishak et al. |
| 2007/0275184 A1 | 11/2007 | Lee et al. |
| 2008/0094566 A1 | 4/2008 | Ishak et al. |
| 2008/0137030 A1 | 6/2008 | Hoffman |
| 2008/0290787 A1 | 11/2008 | Cok |
| 2008/0297931 A1 | 12/2008 | Ramos |
| 2009/0058250 A1 | 3/2009 | Sin et al. |
| 2009/0105437 A1 | 4/2009 | Determan et al. |
| 2009/0128895 A1 | 5/2009 | Seo et al. |
| 2009/0173958 A1 | 7/2009 | Chakraborty et al. |

(56) References Cited

U.S. PATENT DOCUMENTS

| | | |
|---|---|---|
| 2009/0236622 A1 | 9/2009 | Nishihara |
| 2010/0022040 A1 | 1/2010 | Konishi et al. |
| 2010/0039704 A1 | 2/2010 | Hayashi et al. |
| 2010/0118511 A1 | 5/2010 | Wegat |
| 2010/0134879 A1 | 6/2010 | Yoshihara et al. |
| 2010/0231830 A1 | 9/2010 | Hirakata et al. |
| 2011/0019269 A1 | 1/2011 | Dirk |
| 2011/0043486 A1 | 2/2011 | Hagiwara et al. |
| 2011/0157546 A1 | 6/2011 | Ishak et al. |
| 2011/0176325 A1 | 7/2011 | Sherman et al. |
| 2011/0234079 A1 | 9/2011 | Eom et al. |
| 2011/0267801 A1 | 11/2011 | Tong et al. |
| 2011/0289654 A1 | 12/2011 | Williams et al. |
| 2011/0291132 A1 | 12/2011 | Liu et al. |
| 2011/0299168 A1 | 12/2011 | Combs |
| 2011/0299284 A1 | 12/2011 | Ven et al. |
| 2011/0315939 A1 | 12/2011 | Okayasu et al. |
| 2012/0021152 A1 | 1/2012 | Glaser et al. |
| 2012/0038861 A1 | 2/2012 | Lieshout et al. |
| 2012/0075577 A1 | 3/2012 | Ishak et al. |
| 2012/0113672 A1 | 5/2012 | Dubrow et al. |
| 2012/0120515 A1 | 5/2012 | Ishak et al. |
| 2012/0162106 A1 | 6/2012 | Choi et al. |
| 2012/0162752 A1 | 6/2012 | Kitano et al. |
| 2012/0217865 A1 | 8/2012 | Cabalu et al. |
| 2012/0300447 A1 | 11/2012 | Maxik et al. |
| 2012/0307194 A1 | 12/2012 | Croft et al. |
| 2013/0009059 A1 | 1/2013 | Caruso |
| 2013/0063493 A1 | 3/2013 | House |
| 2013/0156999 A1 | 6/2013 | Braesch et al. |
| 2013/0239874 A1 | 9/2013 | Smith et al. |
| 2013/0278134 A1 | 10/2013 | Ko et al. |
| 2013/0282115 A1 | 10/2013 | Ishak et al. |
| 2014/0009061 A1 | 1/2014 | Itoga et al. |
| 2014/0009912 A1 | 1/2014 | Wheatley et al. |
| 2014/0022779 A1 | 1/2014 | Su et al. |
| 2014/0049700 A1 | 2/2014 | Chen et al. |
| 2014/0078420 A1 | 3/2014 | Liu et al. |
| 2014/0093661 A1 | 4/2014 | Trajkovska et al. |
| 2014/0175505 A1 | 6/2014 | Yamazaki et al. |
| 2014/0233105 A1 | 8/2014 | Schmeder et al. |
| 2014/0350146 A1 | 11/2014 | Tsubouchi |
| 2014/0355106 A1 | 12/2014 | Laluet et al. |
| 2014/0363767 A1 | 12/2014 | Murakami et al. |
| 2015/0036379 A1 | 2/2015 | Lee |
| 2015/0098058 A1 | 4/2015 | De et al. |
| 2015/0124188 A1 | 5/2015 | Kadowaki et al. |
| 2015/0160478 A1 | 6/2015 | Ishak et al. |
| 2015/0187987 A1 | 7/2015 | Sim et al. |
| 2015/0212238 A1 | 7/2015 | Chang |
| 2015/0212352 A1 | 7/2015 | Guo et al. |
| 2015/0238308 A1 | 8/2015 | Ishak et al. |
| 2015/0248033 A1 | 9/2015 | Zhu et al. |
| 2015/0253653 A1 | 9/2015 | Fujita et al. |
| 2015/0268396 A1 | 9/2015 | Weber et al. |
| 2015/0277003 A1 | 10/2015 | Sanchez et al. |
| 2015/0311402 A1 | 10/2015 | Ven |
| 2015/0329684 A1 | 11/2015 | Kamimoto et al. |
| 2015/0338561 A1 | 11/2015 | Moe et al. |
| 2015/0378217 A1 | 12/2015 | Kim et al. |
| 2016/0126428 A1 | 5/2016 | Hosokawa et al. |
| 2017/0037308 A1 | 2/2017 | Römer et al. |
| 2017/0062529 A1* | 3/2017 | Paek ...................... H10K 59/38 |
| 2017/0309235 A1 | 10/2017 | Garcia |
| 2017/0315405 A1 | 11/2017 | Masuda et al. |
| 2017/0363884 A1 | 12/2017 | Hallock et al. |
| 2018/0052362 A1 | 2/2018 | Kang et al. |
| 2018/0064616 A1 | 3/2018 | Ishak et al. |
| 2018/0107050 A1 | 4/2018 | Barrett et al. |
| 2018/0113327 A1 | 4/2018 | Ishak et al. |
| 2018/0284609 A1* | 10/2018 | Kandanarachch ...... G03F 7/162 |
| 2019/0004223 A1 | 1/2019 | Sanchez et al. |
| 2019/0103523 A1 | 4/2019 | Choi et al. |
| 2019/0121176 A1 | 4/2019 | Lee et al. |
| 2019/0196071 A1 | 6/2019 | Barrett et al. |
| 2019/0219751 A1 | 7/2019 | Barrett et al. |
| 2019/0285941 A1 | 9/2019 | Liu et al. |
| 2019/0312185 A1 | 10/2019 | Zhang et al. |
| 2020/0124781 A1 | 4/2020 | Tseng et al. |
| 2020/0166798 A1* | 5/2020 | Garbar ................... H05B 47/11 |
| 2020/0174168 A1 | 6/2020 | Barrett |
| 2020/0249520 A1 | 8/2020 | Barrett et al. |
| 2020/0286962 A1 | 9/2020 | Lee et al. |
| 2020/0303598 A1 | 9/2020 | Kim et al. |
| 2020/0357836 A1* | 11/2020 | Miyata ............. H01L 27/14685 |
| 2021/0043807 A1 | 2/2021 | Harris et al. |
| 2021/0095200 A1 | 4/2021 | Youn et al. |
| 2021/0097943 A1 | 4/2021 | Wyatt |
| 2021/0098661 A1 | 4/2021 | Harris et al. |
| 2021/0116612 A1 | 4/2021 | Barrett et al. |
| 2021/0165276 A1 | 6/2021 | Garbar et al. |
| 2021/0273141 A1 | 9/2021 | Harris et al. |
| 2021/0311354 A1 | 10/2021 | Garbar et al. |
| 2022/0011627 A1 | 1/2022 | Barrett et al. |
| 2022/0019006 A1* | 1/2022 | Sasaki ............... G02F 1/133617 |

FOREIGN PATENT DOCUMENTS

| | | | |
|---|---|---|---|
| CN | 101216611 A | 7/2008 |
| CN | 101899222 A | 12/2010 |
| CN | 201666985 U | 12/2010 |
| CN | 102879920 A | 1/2013 |
| CN | 102898800 A | 1/2013 |
| CN | 202847016 U | 4/2013 |
| CN | 203410122 U | 1/2014 |
| CN | 103941320 A | 7/2014 |
| CN | 204213761 U | 3/2015 |
| CN | 104614786 A | 5/2015 |
| CN | 104950515 A | 9/2015 |
| CN | 105788474 B | 7/2016 |
| CN | 103448312 B | 10/2016 |
| CN | 106324908 B | 1/2017 |
| CN | 106950632 A | 7/2017 |
| CN | 107808919 A | 3/2018 |
| CN | 209782327 U | 12/2019 |
| CN | 110955113 A | 4/2020 |
| CN | 111624853 A | 9/2020 |
| CN | 111638629 A | 9/2020 |
| CN | 113376959 A | 9/2021 |
| CN | 114815503 A | 7/2022 |
| DE | 202014000982 U1 | 3/2014 |
| EP | 0509727 A2 | 10/1992 |
| EP | 0855602 A2 | 7/1998 |
| EP | 0965034 B1 | 5/2007 |
| EP | 2085798 A1 | 8/2009 |
| EP | 2095177 A1 | 9/2009 |
| EP | 2096471 A1 | 9/2009 |
| EP | 2128889 A1 | 12/2009 |
| EP | 2260348 A2 | 12/2010 |
| EP | 1794240 B1 | 1/2013 |
| EP | 2874001 A1 | 5/2015 |
| EP | 3026485 A2 | 6/2016 |
| ES | 1094781 U | 12/2013 |
| FR | 2909779 A1 | 6/2008 |
| JP | 2001315240 A | 11/2001 |
| JP | 2003149605 A | 5/2003 |
| JP | 2003279988 A | 10/2003 |
| JP | 2006031030 A | 2/2006 |
| JP | 2006278980 A | 10/2006 |
| JP | 2007150228 A | 6/2007 |
| JP | 2007317896 A | 12/2007 |
| JP | 2010511205 A | 4/2010 |
| JP | 2010261986 A | 11/2010 |
| JP | 2011039093 A | 2/2011 |
| JP | 2013067811 A | 4/2013 |
| JP | 2013222212 A | 10/2013 |
| JP | 2013238634 A | 11/2013 |
| JP | 2014000819 A | 1/2014 |
| JP | 2014225030 A | 12/2014 |
| JP | 2016126064 A | 7/2016 |
| JP | 2016128931 A | 7/2016 |
| JP | 2017017317 A | 1/2017 |
| KR | 20030097143 A | 12/2003 |
| KR | 20050042004 A | 5/2005 |

(56)                References Cited

FOREIGN PATENT DOCUMENTS

| KR | 1020060048986 A | 5/2006 |
|---|---|---|
| KR | 20150075215 A | 7/2015 |
| KR | 20160066707 A | 6/2016 |
| KR | 101815619 B1 | 1/2018 |
| KR | 20210008314 A | 1/2021 |
| KR | 20230076830 A | 5/2023 |
| TW | I618753 B | 3/2018 |
| TW | I646394 B | 1/2019 |
| TW | I657116 B | 4/2019 |
| TW | I657311 B | 4/2019 |
| TW | 201927911 A | 7/2019 |
| TW | 201931009 A | 8/2019 |
| TW | 202024137 A | 7/2020 |
| TW | 202113401 A | 4/2021 |
| TW | 202140684 A | 11/2021 |
| TW | 202200593 A | 1/2022 |
| TW | 202200694 A | 1/2022 |
| TW | 202204327 A | 2/2022 |
| TW | 202206556 A | 2/2022 |
| TW | 202222987 A | 6/2022 |
| TW | 202225202 A | 7/2022 |
| TW | 202233716 A | 9/2022 |
| TW | 202244191 A | 11/2022 |
| TW | 202244194 A | 11/2022 |
| TW | I785791 B | 12/2022 |
| TW | 202311443 A | 3/2023 |
| WO | 1988002871 A1 | 4/1988 |
| WO | 2002101695 A1 | 12/2002 |
| WO | 03010569 A2 | 2/2003 |
| WO | 2004090589 A1 | 10/2004 |
| WO | 2005034066 A1 | 4/2005 |
| WO | 2005106542 A1 | 11/2005 |
| WO | 2007075520 A2 | 7/2007 |
| WO | 2007109202 A2 | 9/2007 |
| WO | 2007146933 A2 | 12/2007 |
| WO | 2008024414 A2 | 2/2008 |
| WO | 2008067109 A1 | 6/2008 |
| WO | 2008068353 A1 | 6/2008 |
| WO | 2008106449 A1 | 9/2008 |
| WO | 2009123754 A2 | 10/2009 |
| WO | 2010111499 A1 | 9/2010 |
| WO | 2012006265 A1 | 1/2012 |
| WO | 2013123592 A1 | 8/2013 |
| WO | 2013176888 A1 | 11/2013 |
| WO | 2013188825 A1 | 12/2013 |
| WO | 2014055513 A1 | 4/2014 |
| WO | 2014077166 A1 | 5/2014 |
| WO | 2014096475 A1 | 6/2014 |
| WO | 2014155787 A1 | 10/2014 |
| WO | 2014196638 A1 | 12/2014 |
| WO | 2015179761 A1 | 11/2015 |
| WO | 2016179906 A1 | 11/2016 |
| WO | 2016205260 A1 | 12/2016 |
| WO | 2017039024 A1 | 3/2017 |
| WO | 2017077359 A1 | 5/2017 |
| WO | 2018137262 A1 | 8/2018 |
| WO | 2019099554 A1 | 5/2019 |
| WO | 2021108105 A1 | 6/2021 |
| WO | 2021108107 A1 | 6/2021 |
| WO | 2022234774 A1 | 11/2022 |

OTHER PUBLICATIONS

1 Office Action pertaining to corresponding Korean Patent Application No. 10-2022-7015456, issued May 22, 2024.
International Search Report and Written Opinion pertaining to PCT/US2024/052350, mailed Dec. 18, 2024.
Office Action pertaining to U.S. Appl. No. 18/933,564, dated Jan. 2, 2025.
Giovannetti, Rita. "The Use of Spectrophotometry UV-Vis for the Study of Porphyrins." Macro to Nano Spectroscopy, Uddin, Jamal (Ed.), IntechOpen Limited, 2012, pp. 87-108, www.intechopen.com/books/macro-to-nano-spectroscopy/the-use-of-spectrophotometry-uv-vis-for-thestudy-of-porphyrins. Retrieved Apr. 12, 2019.

Illuminant D65, 4 pp.
International Patent Application No. PCT/US2021/052904, filed Sep. 30, 2021.
International Search Report and Written Opinion for International Application No. PCT/US2015/032175, date of mailing: Aug. 28, 2015; date of filing: May 22, 2015; 10 pp.
International Search Report and Written Opinion for International Application No. PCT/US2016/037457, date of mailing: Sep. 16, 2016; date of filing: Jun. 14, 2016; 7 pp.
International Search Report and Written Opinion for International Application No. PCT/US2018/061103, date of mailing: Jan. 24, 2019; date of filing: Nov. 14, 2018; 6 pp.
International Search Report and Written Opinion for International Application No. PCT/US2020/059208, date of mailing: Feb. 5, 2020; date of filing: Nov. 5, 2020; 9 pp.
International Search Report and Written Opinion for International Application No. PCT/US2020/059308, date of mailing: Dec. 18, 2020; date of filing: Nov. 6, 2020; 8 pp.
International Search Report and Written Opinion for International Application No. PCT/US2021/052904, date of mailing: Dec. 27, 2021; date of filing: Sep. 30, 2021.
International Search Report and Written Opinion for International Application No. PCT/US2022/031930, mailed Sep. 23, 2022.
International Search Report and Written Opinion for International Application No. PCT/US2022/050950, mailed Mar. 9, 2023.
Japanese Office Action pertaining to corresponding Japanese Patent Application No. 2022-091653, mailed Jan. 9, 2024.
Japanese Office Action pertaining to corresponding Japanese Patent Application No. 2022-520547, mailed on May 23, 2023.
Kim, Boris F. and Bohandy, Joseph. "Spectroscopy of Porphyrins." Johns Hopkins APL Technical Digest, vol. 2, No. 1, 1981, pp. 153-163, www.jhuapl.edu/techdigest/views/pdfs/V02_N3.../V2_N3_1981_Kim. Retrieved Apr. 12, 2019.
Kodak advertisement. Buchsbaum, Ralph. Animals Without Backbones. The University of Chicago Press, 1948.
Li, Wei, "Solar Cell Materials and Applications Thereof", University of Electronic Science and Technology of China Press, Jan. 31, 2014, pp. 255-257.
Non-Final Office Action for U.S. Appl. No. 14/719,604; date of mailing: Aug. 24, 2016; date of filing: May 22, 2015; 41 pp.
Non-Final Office Action for U.S. Appl. No. 14/719,604; date of mailing: Aug. 30, 2017; date of filing: May 22, 2015; 59 pp.
Non-Final Office Action for U.S. Appl. No. 15/813,010; date of mailing: Nov. 6, 2020; date of filing: Nov. 14, 2017; 9 pp.
Non-Final Office Action for U.S. Appl. No. 15/844,109; date of mailing: Sep. 4, 2019; date of filing: Dec. 15, 2017; 49 pp.
Non-Final Office Action for U.S. Appl. No. 16/360,599; date of mailing: Jun. 28, 2019; date of filing: Mar. 21, 2019; 11 pp.
Non-Final Office Action for U.S. Appl. No. 16/695,983; date of mailing: Aug. 20, 2020; date of filing: Nov. 26, 2019; 15 pp.
Non-Final Office Action for U.S. Appl. No. 16/695,983; date of mailing: Jun. 30, 2020; date of filing: Nov. 26, 2019; 24 pp.
Non-Final Office Action for U.S. Appl. No. 16/696,516; date of mailing: Feb. 1, 2021; date of filing: Nov. 26, 2019; 9 pp.
Non-Final Office Action for U.S. Appl. No. 16/855,497; date of mailing: Jul. 1, 2020; date of filing: Apr. 22, 2020; 13 pp.
Non-Final Office Action for U.S. Appl. No. 17/121,695; date of mailing: Feb. 2, 2021; date of filing: Dec. 14, 2020; 11 pp.
Non-Final Office Action for U.S. Appl. No. 17/177,920; date of mailing: Apr. 15, 2021; date of filing: Feb. 17, 2021; 10 pp.
Office Action pertaining to corresponding Canadian Patent App. No. 3152206, mailed Apr. 22, 2022.
Office Action pertaining to corresponding Canadian Patent App. No. 3154694, mailed Apr. 27, 2022.
Office Action pertaining to corresponding Chinese Patent Application No. 201680048240.6, dated Sep. 13, 2021, 16 pages.
Office Action pertaining to corresponding Japanese Patent App. No. 2021-541465, mailed Jun. 28, 2022.
Office Action pertaining to corresponding Japanese Patent App. No. 2021-542506, mailed Jun. 21, 2022.
Office Action pertaining to corresponding Korean Patent Application No. 10-2021-7021453, mailed Dec. 22, 2021.

(56) References Cited

OTHER PUBLICATIONS

Office Action pertaining to corresponding U.S. Appl. No. 17/091,152, mailed Mar. 2, 2023.

Office Action pertaining to corresponding U.S. Appl. No. 17/348,570, mailed Apr. 14, 2022.

Office Action pertaining to corresponding U.S. Appl. No. 17/465,216, mailed Jun. 8, 2022.

Office Action pertaining to Japanese Patent Application No. 2021-542506, mailed Dec. 20, 2022.

Office Action pertaining to Korean Patent Application No. 10-2021-7021455, issued Feb. 16, 2023.

Office Action pertaining to corresponding Chinese Patent Application No. 201680048240.6, dated Jul. 9, 2020.

Office Action pertaining to corresponding Chinese Patent Application No. 201680048240.6, dated Sep. 13, 2021, 16 pp.

Office Action pertaining to corresponding Chinese Patent Application No. 201680048240.6, dated Jan. 18, 2021.

Office Action pertaining to corresponding Korean Patent Application No. 20-2020-7000024, dated Aug. 19, 2021; 3 pp.

Perovich, B. W. "Black and White Filters Tutorial." Freestyle Photographic Supplies. www.freestylephoto.biz/black-and-white-filters-tutorial. Retrieved Apr. 12, 2019.

Richards, Bryce S. "Up- and Down-Conversion Materials for Photovoltaic Devices" Proceedings of SPIE—The International Society for Optical Engineering, 9 pp. Apr. 2012.

Search Report and Examination Opinion for European Application No. 15796219.2; date of mailing: Dec. 8, 2017; date of filing: May 22, 2015; 7 pp.

Search Report and Examination Opinion for European Application No. 15796219.2; date of mailing: Mar. 26, 2019; date of filing: May 22, 2015; 5 pp.

Second Office Action for C.N. Application No. 201580040377.2 (national phase of PCT/US2015/032175); date of mailing: Jan. 2, 2019; date of filing: May 22, 2015; 12 pp.

Second Office Action for Chinese Application No. 201880073490.4 (English Translation); date of mailing: Apr. 20, 2021; date of filing: May 13, 2020; 8 pp.

Second Office Action for J.P. Application No. 2017-032775 (national phase of PCT/US2015/032175); date of mailing: Feb. 4, 2020; date of filing: May 22, 2015; 22 pp.

Second Office Action for Japanese Application No. 2020-526348 (English Translation); date of mailing: Aug. 3, 2021; date of filing: May 13, 2020; 6 pp.

Simmons, Adam "The Evolution of LED Backlights." PC Monitors www.pcmonitorsinfo/articles. Retrieved May 1, 2017.

Sun, Shunqing, "Research on Organic Optical Information Storage Materials—Optical, Thermal and Thin Film Optical Properties of Indoles Cyanine Dyes", Post-doctoral Research Report of Institute of Photographic Chemistry of the Chinese Academy of Sciences, Dec. 31, 1993, pp. 6-7.

Sunstone Luminescent UCP Nanocrystals, sigmaaldrich.com, 7 pp. Retrieved Apr. 17, 2017.

Supplementary European Search Report and Written Opinion for EP Application No. 18879246.9, date of mailing: Dec. 18, 2020; date of filing: Nov. 14, 2018; 5 pp.

Van Der Lely, et al., "Blue Blocker Glasses as a Countermeasure for Alerting Effects of Evening Light-Emitting Diode Screen Exposure in Male Teenagers," Journal of Adolescent Health, Aug. 2014, 7 pp.

Final Rejection pertaining to corresponding U.S. Appl. No. 17/348,570, mailed Aug. 8, 2022.

Sumitomo Chemical, DyBright, Trademark, https://www.sumitomo-chem.co.jp/english/products/detail/en_d03014.html, accessed Dec. 22, 2023.

"1002 nm NIR Dye", Technical Data Sheet, Product Code: NIR1002A, QCR Solutions Corp, Version 2011.NIR Dyes, www.qcrsolutions. com, 1 page.

"ADS640PP Product Specification", American Dye Source, Inc., Retrieved at <>, Retrieved on May 18, 2015, 1 page.

"Filters for Color Photomicrography," Olympus America Inc., Olympus Microscopy Resource Center, http://www.olympusmicro.com/primer/photomicrography/colorfilters.html, Mar. 2012, 7 pp.

"Kentek Laser Safe Window Protection", Retrieved at <>, 1 pp. Retrieved on Apr. 28, 2014.

"Laser and fluorescent dyes, UV and NIR dyes, security inks and other optically functional materials", Retrieved at http://www.fabricolorholding.com/product, 2 pp. Retrieved May 18, 2015.

"LUM690 Near Infrared Dye", Moleculum, moleculum.com, Jan. 2015, 2 pages.

"LUM995 Near Infrared Dye", Moleculum, moleculum.com, Jan. 2015, 2 pages.

"Near Infrared Dye: LUM1000A", Moleculum, moleculum.com, Jan. 2015, 1 page.

"Reticare, the first ocular protector for electronic device screens to launch at CES 2014"; https://www.reticare.com/tienda/en/blog/post/3-reticare-the-first-ocular-protector-for-electronic-device-screens-to-launch-at-ces-2014; Jan. 10, 2014; 7 pp. Retrieved Nov. 30, 2017.

"Tinuvin P Benzotriazole UV Absorber", Ciba Specialty Chemicals, Inc., Printing Date: Aug. 1998, 2 pages.

"XGear Krystal Sapphire Screen Protector Film Shield For Apple IPhone 4 4S", Retrieved at <>, 3 pp. Retrieved Apr. 28, 2014.

"1031 nm NIR Dye", Technical Data Sheet, Product Code: NIR1031M, QCR Solutions Corp, Version: 2011.NIR Dyes, www.qcrsolutions. com, 1 page.

"1072 nm NIR Dye", Technical Data Sheet, Product Code: NIR1072A, QCR Solutions Corp, Version: 2011.NIR Dyes, www.qcrsolutions. com, 1 page.

"1073nm NIR Dye", Technical Data Sheet, Product Code: IR Dye 1151, Adam Gates & Company, LLC, www.adamgatescompany. com, 1 page.

"290 nm UV Dye", Technical Data Sheet, Product Code: UV290A, QCR Solutions Corp, Version: 2011.UV Dyes, www.qcrsolutions. com, 1 page.

"530 nm Visible Dye", Technical Data Sheet, Product Code: VIS530A, QCR Solutions Corp, Version: 2011.VIS Dyes, www.qcrsolutions. com, 1 page.

"675 nm Visible Dye", Technical Data Sheet, Product Code: VIS675F, QCR Solutions Corp, Version: 2011 VIS Dyes, www.qcrsolutions. com, 1 page.

"ABS 668: Visible Narrow Band Absorber", Exciton, Inc., www.exciton.com, 1 page.

"ABS 691: Visible Narrow Band Absorber", Exciton, Inc., www.exciton.com, 1 page.

"Capturing All the Light: Panchromatic Visible Absorption for Solar Photoconversion." U.S. Department of Energy, Basic Energy Sciences, Jun. 1, 2014, science.energy.gov/bes/highlights/2014/bes-2014-06-g/. Retrieved Apr. 12, 2019.

"DYE VIS 347", Adam Gates & Company, LLC, www.adamgatescompany.com, 1 page.

"DYE VIS 670", Adam Gates & Company, LLC, www.adamgatescompany.com, 1 page.

"DYE VIS 671", Adam Gates & Company, LLC, www.adamgatescompany.com, 1 page.

"Infrared Dye 1422", Adam Gates & Company, LLC, www.adamgatescompany.com, 1 page.

"New ANSI/ISEA Z87. 1-2010 Standard", Uvex by Sperian, 2 pages.

"Spectral-Transmittance Bar Charts for Selected Kodak Wratten Filters." google search (www.google.com), search terms: kodak wratten filters bar chart, second image (wratten filter specs, iclane. net). Retrieved May 16, 2019.

A-594-5 Invisible Blue Pigment, dayglo.com, 1 page. Retrieved Jun. 2, 2019.

Abramowitz, Mortimer and Davidson, Michael W. "Kodak Color Compensating Filters Yellow." Olympus Microscopy Resource Center. olympus-lifescience.com. Retrieved May 16, 2019.

Andres Cantarero; Raman scattering applies to materials science; ScienceDirect; 2015; pp. 113-122; vol. 9; Elsevier.

ANSI Z80.3-2015, Nonprescription Sunglass and Fashion Eyewear Requirements, 41 pp.

(56)  References Cited

OTHER PUBLICATIONS

ASTM International E 313-05; Standard Practice for Calculating Yellowness and Whiteness Indices from Instrumentally Measured Color Coordinates; Article; 6 pp.

Doeffinger, Derek, editor. Using Filters. Eastman Kodak Company, 1988. The Kodak Workshop Series, pp. 11, 13, 17, 46, 68-69.

ebay.com, screenshot of ebay purchase of Apr. 23, 2019. Retrieved May 16, 2019.

Examination Report pertaining to corresponding Australian Patent App. No. 2020392315, mailed Mar. 31, 2022.

Examination Report pertaining to corresponding Australian Patent App. No. 2020393812, mailed Mar. 30, 2022.

Examination Report pertaining to corresponding European Patent Application No. 20891730.2, mailed May 2, 2023.

Extended European Search Report pertaining to European Patent Application No. 20891730.2, mailed Dec. 14, 2021.

Extended European Search Report pertaining to European Patent Application No. 20893018.0, mailed Dec. 20, 2022.

Final Office Action for U.S. Appl. No. 14/719,604; date of mailing: Mar. 28, 2017; date of filing: May 22, 2015; 66 pp.

Final Office Action for U.S. Appl. No. 15/844,109; date of mailing: Jan. 16, 2020; date of filing: Dec. 15, 2017; 12 pp.

Final Office Action for U.S. Appl. No. 16/855,497; date of mailing: Sep. 22, 2020; date of filing: Apr. 22, 2020; 12 pp.

Final Rejection pertaining to corresponding U.S. Appl. No. 17/465,216, mailed Sep. 30, 2022.

First Office Action for C.N. Application No. 201580040377.2 (national phase of PCT/US2015/032175); date of mailing: Feb. 24, 2018; date of filing: May 22, 2015; 5 pp.

First Office Action for C.N. Application No. 201680048240.6 (national phase of PCT/US2016/037457); date of mailing: Jan. 16, 2020; date of filing: Jun. 14, 2016; 10 pp.

First Office Action for Chinese Application No. 201880073490.4 (English Translation); date of mailing: Feb. 1, 2021; date of filing: May 13, 2020; 9 pp.

First Office Action for J.P. Application No. 2017-032775 (national phase of PCT/US2015/032175); date of mailing: May 15, 2019; date of filing: May 22, 2015; 6 pp.

First Office Action for Japanese Application No. 2020-526348 (English Translation); date of mailing: Mar. 11, 2021; date of filing: May 13, 2020; 6 pp.

Fonseca, "Apple patents a virtual reality headset for iPhone," http://vr-zone.com/articles/apple-patents-virtual-reality-headset-iphone/87267.html, Jun. 22, 2015, 4 pp.

Fritz, Norman L. "Filters: An Aid in Color-Infrared Photography." Photogrammetric Engineering and Remote Sensing, vol. 43, No. 1, Jan. 1977, pp. 61-72, www.asprs.org/wp-content/uploads/pers/1977journal/.../1977_jan_61-72. Retrieved Apr. 4, 2019.

Gallas, Jim and Eisner, Mel; Chapter 23—Eye protection from sunlight damage; Journal; 2001; 437, 439-455; vol. 3. Comprehensive Series in Photosciences, Elvesier, abstract only.

Office Action pertaining to corresponding Chinese Patent Application No. 202111279444.X, mailed Jul. 27, 2024.

Examination Report pertaining to corresponding European Patent Application No. 18879246.9, dated Jul. 12, 2024.

* cited by examiner

Display's SPD with Simulation of Dye Absorption on Color Filter, after Green Dye Modification Dye #6 Application on CF
CFM-G5

- - - - Spectrum: Model Acer XV340CK White
———— Measured Acer XV340CK Remeasure White Display's SPD with Simulation of Dye Absorption at the BLU Level, after Green Dye Modification Dye #6 Application on Blu —— Measured Acer XV340CK Remeasure White ---- Predicted After Modeling Actual

CFM-G6

Red CF. Original Vs Modified.

---- Red CF ———— M Red CF

Red. Thickness has been Reduced.
185HE Dye Added.

Green CF. Original Vs Modified.

---- Green CF ———— M Green CF

Green. Thickness has been Reduced.
P491 and 181HE Dyes Added.

Blue CF. Original Vs Modified.

---- Blue CF ———— M Blue CF

Blue. Thickness has been Reduced.
252HE and P509 Dyes Added.

CIE 1931 Gamut Chart

Transmission of Blue Color Filter Ink with Dye and Dye Enhancement Compound

COLOR FILTER ENHANCEMENTS FOR DISPLAY DEVICES

FIELD

The present disclosure relates to backlight modules for electronic display systems that include light management materials.

BACKGROUND

Blue light has become a health concern with the emergence of light-emitting diodes (LEDs) and their increasing use in electronic display products such as LCD displays. Short-wavelength blue light or high energy natural blue light has been linked to photo retinal damage and thought to be a causal component in the onset of macular degeneration following a long-term exposure to daylight. With daily screen time continuing to increase, especially since the beginning of the COVID-19 pandemic, users are being increasingly exposed to high-energy blue light emitted by their devices. Long-term health implications are now being studied, but eye strain and other immediate effects of display use affect people daily, with an increase in ocular symptoms such as asthenopia and dry eyes, in addition to the recognized impacts of devices' use on circadian rhythms and sleep patterns. Lowering the emission of high energy blue light from devices is thus of great importance, and selective solutions can be implemented within the components of the display panels.

Handhelds, tablets, computers, and other device displays have trended toward higher resolutions and truer color balance. While a variety of methods can be used to achieve resolution and color, many high-performance displays include LEDs that can result in high levels of blue within the output spectrum. Many of these devices are battery-powered and users, typically, desire long battery life. Longer battery life generally calls for low power consumption, as well as various means for light conservation. Frequently these displays have not prioritized eye safety as a design goal. A growing body of medical research indicates that a "toxic" blue portion of the color spectrum can have adverse effects on the eye, in such a way that in the longer term, vision troubles and impairment could result. In addition, a new body of knowledge is showing that adverse effects can occur on the natural circadian rhythm of individuals from certain portions of the optical spectrum. The present disclosure describes materials and incorporation of these materials in mobile phones, tablets or monitors built with an LED backlit system, that are highly selective in their ability to reduce exposure to harmful blue and UV light. These materials can be optimized as a function of wavelength and quantity to maintain color white point. Many of these materials reduce total light transmission. However, some of these materials, as described in the present disclosure, can reduce harmful portions of the spectrum to a range of optical wavelengths that are less harmful. In this manner, a balance of reduction of harmful color frequencies, maintenance of optical clarity, and maintenance of true white color balance can be achieved with minimal loss in display brightness. In light of recent medical findings, increasingly ubiquitous displays, and consumer demand for high quality in displays, systems of the present disclosure solve multiple needs in a unique way.

Described herein are approaches to blue light emission mitigation that are based upon absorption of light. In some instances, removal of light or conversion of light, without subsequent emission of light in the visible region of the electromagnetic spectrum, can generally result in a decrease in the brightness (measured and/or perceived) of a display, as compared with an otherwise identical reference display without such absorption features. In some cases, to compensate for such an absorption-related brightness decrease, the power input to a display is increased. This may be relative to the power input to a reference display. Generally, increases in display power consumption can be undesirable, particularly in portable devices where they may negatively impact battery life.

In this present disclosure, the selective application of color absorption dyes within each color of the display color filters presents great benefits, in terms of reduction of blue light hazard, minimizing negative impacts on luminance change and of the increase in the total color gamut. This is particularly notable when compared to the resulting effects obtained with an implementation at the backlight unit (hereinafter "BLU") level.

SUMMARY

To address eye safety, display systems are provided that incorporate materials into mobile, tablet, or personal computer displays that can reduce exposure to harmful or toxic blue and ultraviolet light. The instant disclosure provides backlight modules (units) for display systems that include materials that can convert or recycle harmful portions of the visible electromagnetic spectrum into optical wavelengths that are less harmful while maintaining a balance of reduction in harmful color frequencies, maintenance of optical clarity, and maintenance of true white color balance with minimum loss in display brightness.

The present disclosure provides a modification of the resulting spectral emission of systems with LCD displays, or LED back lit systems, which includes the use of dyes or combination of dyes at the level of the color filters of these display systems. These dyes can absorb harmful portions of the visible electromagnetic spectrum, while maintaining a balance of reduction in harmful color frequencies, maintenance of optical clarity, and maintenance of true white color balance with minimum loss in display brightness.

The disclosure improves color transmittance and may improve color as well. With improvements in the color filter layer of the display system, the transmittance luminance brightness and color gamut may improve. In one embodiment, there is a high transmission or low color gamut filter. In another embodiment, the color filter may cause improved transmission. The color filter layer may include specific dyes, pigments or compounds that impact certain wavelengths, and may reduce blue light toxicity. The dyes may also cause a narrowing in the color value ranges of emission in order to reduce overlap/leakage between subpixels, improving the color gamut of resulting emitted light.

In one aspect, a display system is disclosed that includes a backlight unit having a light emitting array; a liquid crystal panel; and a color filter having one or more absorbing dyes, wherein the one or more absorbing dyes are located in at least one color set of subpixels in the color filter. The system can further include light emitting diodes incorporated into the light emitting array, a reflector adjacent to the light emitting array, a diffuser opposite the reflector, a thin film transistor array layer, and a layer of cover glass. The liquid crystal panel can be adjacent to the color filter and can be comprised of a liquid crystal layer disposed between two panel plates.

In some cases, the system can further include a first brightness enhancing layer and at least one polarizer, wherein a first polarizer is located adjacent the color filter. Further, a second brightness enhancing layer may be adjacent to the first brightness enhancing layer. Additionally, a second polarizer may be located next to the backlight unit.

In some cases, the one or more absorbing dyes can be a soluble, blue light absorbing dye included in blue subpixels of the color filter, and the blue light absorbing dye can absorb blue light and reduce transmission in a wavelength range of 415-435 nm. The system can further include a short wavelength side absorber that absorbs light at wavelengths below 415 nm. Alternatively, or in addition, the system can further include a long wavelength side absorber that absorbs light at wavelengths above 480 nm. In some cases, the blue light absorbing dye can reduce blue light toxicity factor by up to 20%.

In some cases, the one or more absorbing dyes can be a soluble, green light absorbing dye included in green subpixels of the color filter, and the green light absorbing dye can absorb green light and reduce transmission in a wavelength range of 490-570 nm. Further, the one or more absorbing dyes can include a short wavelength side absorber that absorbs light at wavelengths below 500 nm, a long wavelength side absorber that absorbs light at wavelengths above 575 nm, or both.

In some cases, the one or more absorbing dyes can be a soluble, red light absorbing dye included in red subpixels of the color filter, and the red light absorbing dye can absorb red light and reduce transmission of wavelengths less than 620 nm. Further, the one or more absorbing dyes can include a short wavelength side absorber that absorbs light at wavelengths below 590 nm.

In some cases, the one or more absorbing dyes can be at least one of a soluble blue dye, which absorbs in the wavelength ranges 415-435 nm, a soluble green dye, which absorbs in the wavelength range of 520-550 nm, and any combination thereof. The one or more absorbing dyes can be at least one of organic dyes, metal complex dyes, porphyrin-based compounds, coumarins, retinal pigments, and phthalocyanine compounds.

In some cases, there can be a reduction in luminance of no more than 10% compared to a display system without the one or more absorbing dyes. Alternatively, or additionally, there can be a change in color gamut of no more than 5%.

In some cases, the one or more absorbing dyes can be located in at least one of blue subpixels, red subpixels, green subpixels, and any combination thereof.

In another aspect, a method of using a color filter in a display system is disclosed that includes lighting a backlight unit having a light emitting array; emitting light through a liquid crystal panel; and absorbing light in a color filter having one or more absorbing dyes, wherein the one or more absorbing dyes are located in at least one color set of subpixels in the color filter.

In the present disclosure, the term, "light absorbing material" or "light absorbing layer" refers to an optical management material that only absorbs light in a particular wavelength range;

the term, "light conversion material" or "light conversion layer" refers to an optical management material that absorbs light at one wavelength range and reemits light at a different (for example, higher) wavelength range;

the term, "optical film" refers to a layer of light absorbing material or light conversion material that may be near or may be disposed upon a transparent carrier layer;

the term, "adjacent" refers to layers that are either directly next to one another or are separated, at most, by one additional layer;

the terms, "blue light" or "toxic blue light" refer to light having wavelength ranges of about 400 nm to about 500 nm or about 415 nm to about 455 nm respectively;

the term, "disposed upon" refers to a layer that is either directly in contact with another layer or is adjacent to the other layer;

the term, "light-emitting diode array" refers to one or more light-emitting diodes in a matrix, usually two-dimensional;

the term, "color filter" refers to an array of blue, red, and green subpixels arranged in a single layer in the optical stack;

the term, "optical stack" refers to the layers in a backlight unit that emit light, are optically transparent to that light, or modify the properties of that light. These layers can be adjacent to one another;

the term "blue light ratio" refers to the ratio of display emission light in the range from 415-455 nm to the display emission of 400-500 nm shall be less than 50%

$$\text{Blue light ratio} = \int_{415}^{455} L(\lambda) \cdot \Delta\lambda / \int_{400}^{500} L(\lambda) \cdot \Delta\lambda$$

Where: $L(\lambda)$ is the spectral irradiance in $\mu W \cdot cm^{-2} \cdot nm^{-1}$;

the term "blue light toxicity factor" (BLTF) refers to the weighted hazardous blue ratio compared to display luminance calculated according to the toxicity weighting factor $B(\lambda)$ $$BLTF = \frac{100}{683} * \int_{380}^{780} L(\lambda) \times B(\lambda) \times \Delta\lambda / \int_{380}^{780} L(\lambda) \times g(\lambda) \times \Delta\lambda,$$

in which:

$\Delta\lambda = 1$ $L(\lambda)$: spectral radiance in $\mu W \cdot cm^{-2} \cdot nm^{-1}$ $B(\lambda)$: Blue-Light Hazard Function $g(\lambda)$: CIE 1931 RGB luminosity function 683—maximum spectral luminous efficacy constant (683 lumens per Watt at 555 nm);

the term "color gamut" refers to the entire range of colors available for a particular device; and the term "luminance" refers to the intensity of light emitted from a surface per unit area in a given direction.

Features and advantages of the present disclosure will be more readily understood from the following detailed description which should be read in conjunction with the accompanying drawings.

BRIEF DESCRIPTION OF THE DRAWINGS

The drawings are schematic illustrations and are not intended to limit the scope of the disclosure in any way. The drawings are not necessarily to scale.

DETAILED DESCRIPTION

Figure 1:
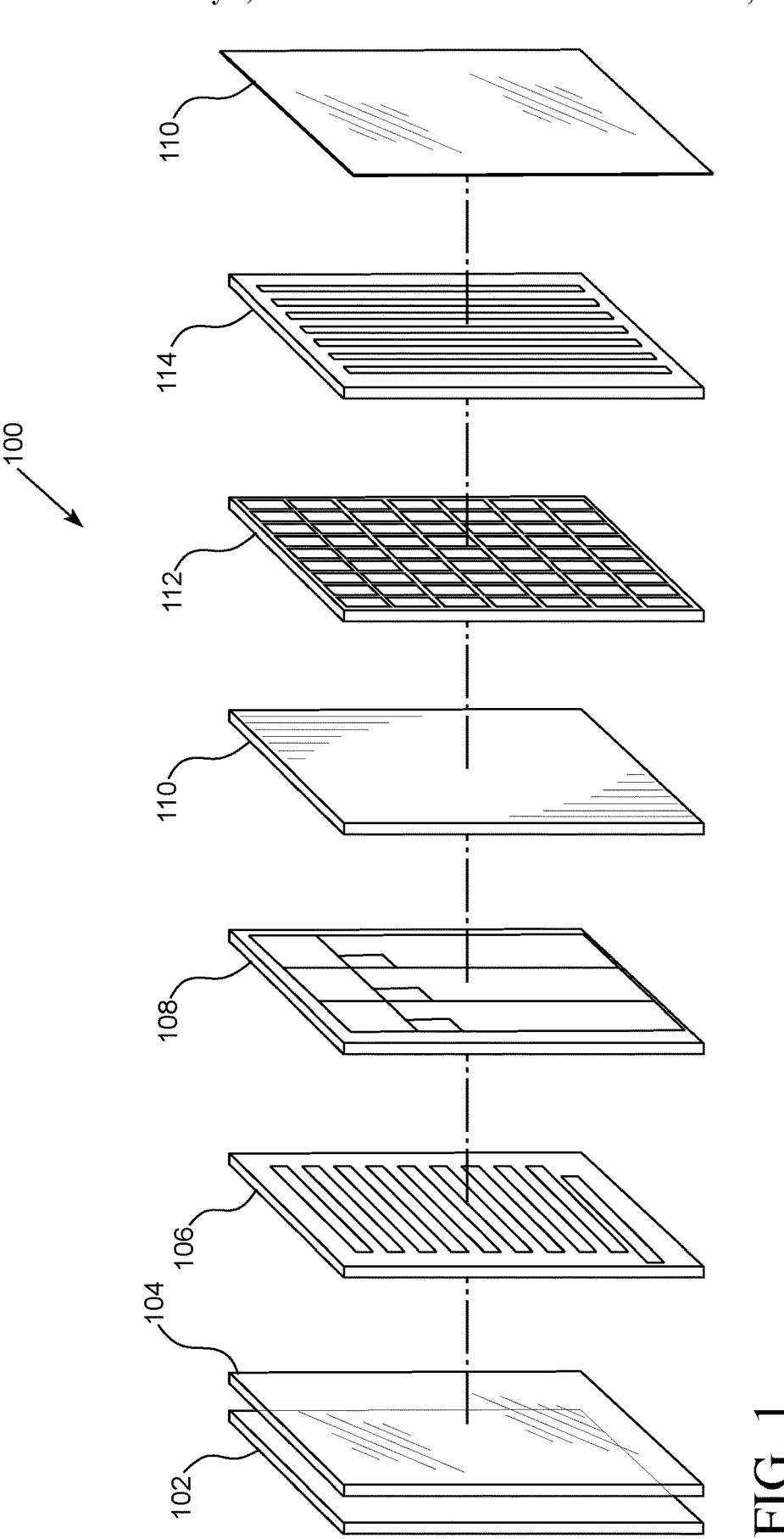
FIG. 1 is a non-limiting illustration of an exploded view of the different layers of a display panel.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

This disclosure relates to the application of light-filtering materials on the color filters of a panel display. The color filter is a key component in color reproduction of LCD TVs, computer monitors, and mobile devices such as smartphones and tablets. In a typical display panel, the light emitted by an LED is distributed by a backlight unit (BLU) through a series of functional layers and through the color filter layer, which is comprised of an array of three primary light colors: red, blue, and green. In this disclosure, dyes can be added to a color filter or color filter layer to allow tailored filtration of light (in particular, high-energy blue light), thereby producing a less harmful and more color efficient blue light. Further, dyes added to a color filter or color filter layer can improve color gamut while having minimal luminance loss. Additional changes to the color filter are described herein that can result in additional benefits to color gamut and selectivity.

The disclosed color filter enhancements include dyes, or one or more light-absorbing materials, capable of absorbing light at specific wavelengths and used to modify elements of an LCD display panel, in particular the color filter or the backlight unit (BLU). The wavelength ranges of interest are comprised from 415 nm to about 435 nm, for the blue light range, from 490 to 570 nm for the green light range and over 620 nm for red light range. Therefore, various dyes with selected wavelengths absorption properties are disclosed in this application. These selected dyes can modify the emission of an LED display panel, allowing for a reduced amount of blue light or even toxic blue light, and this with a minimal effect on color characteristics such as luminance and color gamut. Examples of dyes with such properties can be, but are not limited to, porphyrin-based compounds, as well as coumarins, retinal pigments, phthalocyanine compounds, and other possible additives.

This disclosure describes the selective reduction in toxic blue light and color enhancement with organic or metal complex dyes at the level of color filter, primarily with dyes and/or pigments. The unique characteristics of the organic and metal complex dyes chosen have excellent absorption in the desired wavelengths. There are, however, secondary and unwanted absorption in other parts of the spectrum from these same dyes. The ability to filter in the desired locations and avoid the undesired absorption and/or filtration is particularly suited to the color filter and unique to this disclosure. More specifically, the disclosure may reduce blue light toxicity and may reduce color emission overlap. The color filter may also improve the color gamut of resulting emitted light.

The disclosed backlight unit with light management material can absorb light in a first wavelength range and reemit light in a second wavelength range having a different (for example, higher) wavelength. In the instant disclosure, light management materials are contemplated that absorb blue light, particularly toxic blue light. Useful light conversion materials and light absorbing materials are described, for example, in applicants' co-owned U.S. Pat. No. 10,901,125 and entitled LIGHT EMISSION REDUCING COMPOUNDS FOR ELECTRONIC DEVICES, which is herein incorporated by reference.

The embodiment of FIG. 1 is a possible illustration of an exploded view of the different layers of a display system made of panels, including the color filter 112 and backlight unit ("BLU") 102, and each of the respective panels in each panel's relative positions. FIG. 1 is one embodiment of the schematic of embodiments of a display system according to the present disclosure that indicates positions where a light conversion or light absorbing (blue-filtering) layer can be inserted, in addition to a possible color filter layer. In the illustration, the color filter system 100 may include a backlight unit 102, and in some embodiments, the backlight unit may include at least one other BLU component 104, such as a light-guide plate, reflector, diffuser, brightness enhancement film(s), polarization control layer, etc. Typically, a light-guide plate is a transparent, or semi-transparent colorless, block of material (glass or polymer) that can conduct light. Light-guide plates can be made of many materials such as glass, polyacrylate (acrylic), polycarbonate, or other clear polymers. The other possible display components are for dispersing and can spread light across the backlight unit 102-104 (and any other components that make up the backlight unit).

Figure 26:
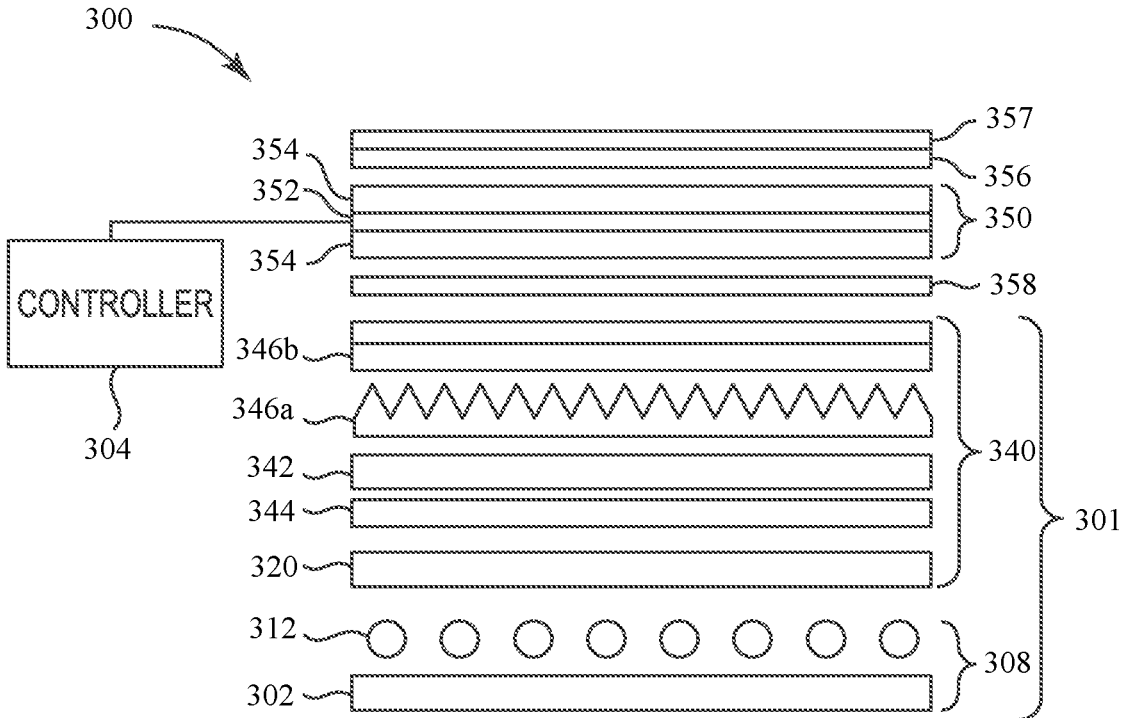
FIG. 26 is a schematic cross-sectional view of a display system according to this disclosure.

More specifically, FIG. 26 illustrates an example display system that incorporates a backlight unit. Display system 300 can include liquid crystal (LC) panel 350 and illumination assembly 301 positioned to provide illumination light to LC panel 350. LC panel 350 includes LC layer 352 disposed between panel plates 354. Plates 354 can include electrode structures and alignment layers on their inner surfaces for controlling the orientation of the liquid crystals in the LC layer 352. These electrode structures can be arranged so as to define LC panel pixels. A color filter can also be included with one or more of plates 352 for imposing color on the image displayed by LC panel 350.

LC panel 350 can be positioned between upper absorbing polarizer 356 and lower absorbing polarizer 358. Absorbing polarizers 356, 358 and LC panel 350 in combination can control the transmission of light from illumination assembly 301 to a viewer, the viewer generally being positioned toward the top of FIG. 26 and looking generally downward (relative to FIG. 26) at display system 300. Controller 304 can selectively activate pixels of LC layer 352 to form an image seen by the viewer. One or more optional layers 357, can be provided over upper absorbing polarizer 356, for example, to provide optical function and/or mechanical and/or environmental protection to the display.

Illumination assembly 301 can include backlight 308 and one or more light management films 340 positioned between backlight 308 and LC panel 350. Backlight 308 of display system 300 can include light sources 312 that generate the light that illuminates LC panel 350. Light sources 312 can include any suitable lighting technology. In some embodiments, light sources 312 can be light-emitting diodes (LEDs), and in some cases, can be white LEDs. Backlight 308 as illustrated can be a "direct-lit" backlight in which an array of light sources 312 are located behind LC panel 350 substantially across much or all of the panel's area. Backlight 308 as illustrated is merely schematic, however, and many other backlight configurations are possible. Some display systems, for example, can include a "side-lit" backlight with light sources (such as LEDs) located at one or more sides of a light-guide that can distribute the light from the light sources substantially across much or all of the area of LC panel 350. Backlight 308 also includes reflective substrate 302 for reflecting light from light sources 312 propagating in a direction away from LC panel 350. Reflective substrate 302 may also be useful for recycling light within display system 300.

Arrangement 340 of light management films, which may also be referred to as a film stack, a backlight film stack, or a light management unit, can be positioned between backlight 308 and LC panel 350. Light management films 340 can affect the illumination light propagating from backlight 308 so as to improve the operation of display system 300. Light management films 340 need not necessarily include all components as illustrated and described herein.

Arrangement of light management films 340 can include diffuser 320. Diffuser 320 can diffuse the light received from light sources 312, which can result in increased uniformity of the illumination light incident on LC panel 350. Diffuser layer 320 may be any suitable diffuser film or plate.

Light management unit 340 can include reflective polarizer 342. Light sources 312 typically produce unpolarized light, but lower absorbing polarizer 358 may only transmit a single polarization state; therefore, about half of the light generated by light sources 312 may not be transmitted through to LC layer 352. Reflective polarizer 342, however, may be used to reflect the light that would otherwise be absorbed in lower absorbing polarizer 358. Consequently, this light may be recycled by reflection between reflective polarizer 342 and underlying display components, including reflective substrate 302. At least some of the light reflected by reflective polarizer 342 may be depolarized and subsequently returned to reflective polarizer 342 in a polarization state that is transmitted through reflective polarizer 342 and lower absorbing polarizer 358 to LC layer 352. In this manner, reflective polarizer 342 can be used to increase the fraction of light emitted by light sources 312 that reaches LC layer 352, thereby providing a brighter display output. Any suitable type of reflective polarizer may be used for reflective polarizer 342.

In some embodiments, polarization control layer 344 can be provided between diffuser plate 320 and reflective polarizer 342. Polarization control layer 344 can be used to change the polarization of light that is reflected from reflective polarizer 342 so that an increased fraction of the recycled light is transmitted through reflective polarizer 342.

Arrangement of light management films 340 can also include one or more brightness enhancing layers. A brightness enhancing layer can include a surface structure that redirects off-axis light in a direction closer to the axis of the display. This can increase the amount of light propagating on-axis through LC layer 152, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers include BEF prismatic films available from 3M Company. Other varieties of brightness enhancing layers can incorporate non-prismatic structures.

The embodiment illustrated in FIG. 26 shows first brightness enhancing layer 346a disposed between reflective polarizer 342 and LC panel 350. Prismatic brightness enhancing layer 346a typically provides optical gain in one dimension. An optional second brightness enhancing layer 346b may also be included in arrangement 340 of light management layers, having its prismatic structure oriented orthogonally to the prismatic structure of first brightness enhancing layer 346a. Such a configuration provides an increase in the optical gain of display system 300 in two dimensions. In other exemplary embodiments, brightness enhancing layers 346a, 346b may be positioned between backlight 308 and reflective polarizer 342.

It is to be understood that as a schematic diagram, the components of display system 300 are not illustrated to scale, and generally are shown with greatly exaggerated thickness (along the up-down direction of FIG. 26) compared to their lateral extent (along the left-right direction). Many elements of display system 300, including (but not necessarily limited to) 302, 320, 342, 344, 346a, 346b, 352, 354, 356, and 357 can extend in two dimensions generally orthogonal to their thickness (i.e., perpendicular to the plane of FIG. 26) over an area approximately equal to a viewable area of the display, which may be referred to as a "display area."

Returning to FIG. 1, the BLU 102 may be adjacent or near one or more polarizer filters 106 that lets light of a specific polarization pass through while blocking light waves of other polarizations. In some embodiments, polarizer filters 106 can help reduce reflections and glare by filtering out light that has become polarized due to reflection from non-metallic surfaces. The goal of color filter backlight unit system 100 is to absorb light transmitted through the system using color dyes in at least one layer and to distribute light uniformly across the two-dimensional plane of a portion of the BLU, such as the light-guide plate, thus providing light to display images across the entirety of the display.

In one embodiment, a thin film transistor (hereinafter referred to as "TFT") array 108 may be adjacent or near polarizer layer 106. TFT array layer 108 may be in a layer or thin arrangement and may have a photosensitive array made up of small pixels, and/or a detector element. The pixels may contain photodiodes that absorb electrons generating electrical charges (or charge collector electrodes and sometimes storage capacitors), as well as other possible elements. TFT array layer 108 may be controlled and help to control the redrawn output of the display seen by the user, and in some instances, can be controlled to help reduce light transmission and color.

Near or adjacent to TFT array layer 108 of display system 100 may include a liquid crystal panel 110. Display system 100 can include a liquid crystal (LC) panel 110 in some instances and illumination assembly positioned to provide illumination light to LC panel (not shown). LC panel may include an LC layer disposed between panel plates, which may include electrode structures and alignment layers on their inner surfaces for controlling the orientation of the liquid crystals in LC panel 110. These light fixtures can be arranged so as to define LC panel pixels. A color filter 112 can also be included with one or more plates for imposing color on the image displayed by LC panel 110. In some embodiments, additional or existing plate(s) may include dyes. Dyes, or in some instances pigments, may be included to selectively improve light absorption and/or emission and transmission of light seen by the user of the display system. Depending on the dye or pigment included in the layer or plate, the X % reduction of luminance or light transmission may reduce related to the material or compound used and the amount used. This improves the resulting color, glare, luminance and other resulting display light.

Display system 100 of FIG. 1 is merely exemplary, however, and the systems of the present disclosure are not limited to use with systems like or similar to display system 100. The systems of the present disclosure may be beneficially employed in other varieties of displays systems that do not necessarily include liquid crystal display technology.

The display system may include another layer that is a color filter. Color filter layer 112 can include an array of pixels wherein each pixel is comprised of colored subpixels (for example, red subpixels, green subpixels, and blue subpixels). A black matrix can demarcate the space between each of the subpixels, as illustrated in FIG. 1. The red, green, and blue subpixels can obtain their color through the use of inks and pigments that are suspended in a matrix. While the term pigment is more frequently used in this disclosure to describe the color provided to the subpixel, it is anticipated to include what is also known in the art as "ink". Therefore, unless otherwise described herein, pigment and ink both refer to the coloration used to create a specific-colored subpixel.

Figure 27:
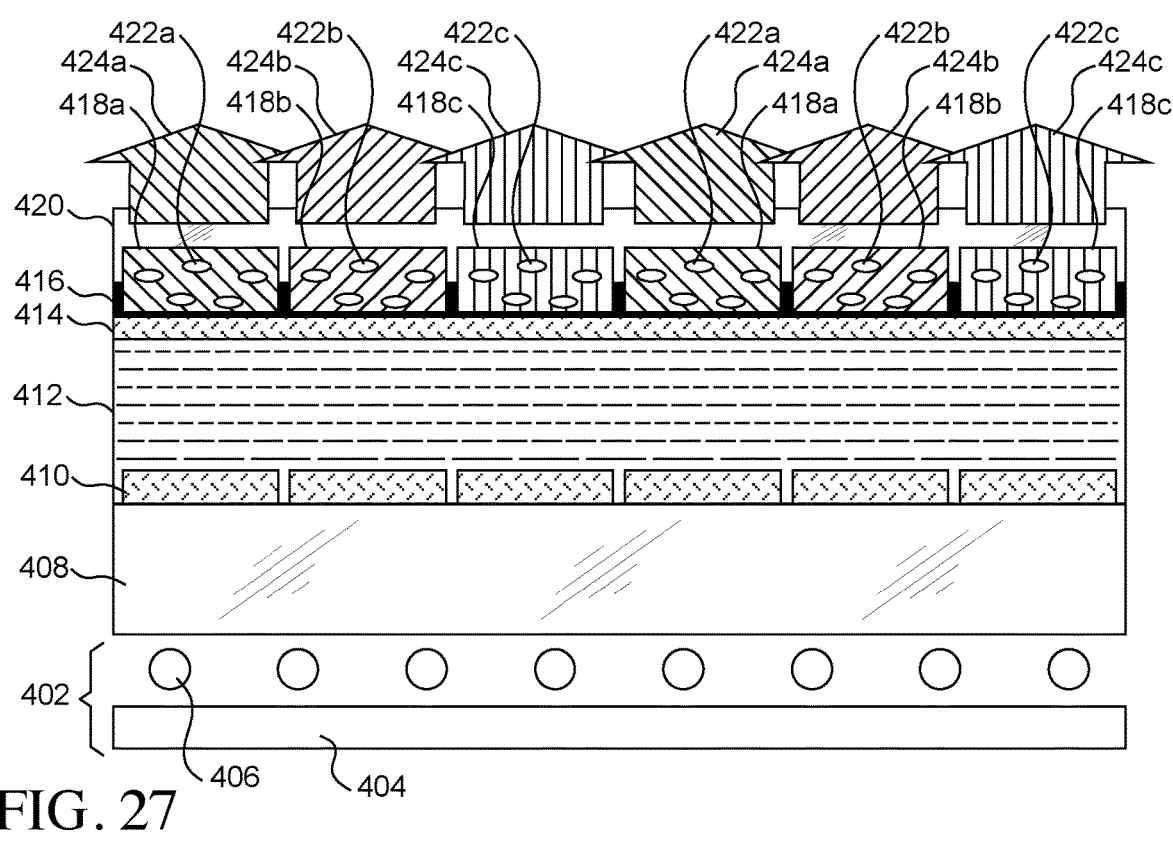
FIG. 27 is a schematic cross-sectional view of a display system illustrating standard pigments in each of the subpixel sets of a color display.

For example, FIG. 27 illustrates a schematic cross-sectional view of a display system illustrating standard pigments in each of the subpixel sets of a color display. Specifically, a display system can include backlight unit 402 having reflective substrate 404 and light source 406. Adjacent backlight unit 402 can be glass substrate 408 followed by electrodes 410. Liquid crystal layer 412 can be positioned between electrodes 410 and electrodes 414. Adjacent to electrodes 414 can be a color filter having black matrix 416 demarcating the space between subpixels 418. In some cases, and as illustrated in FIGS. 27-34, black matrix 416 may be interspersed between at least portions of subpixels 418. In other cases, however, black matrix 416 may be a separate layer positioned adjacent subpixels 418. Adjacent to black matrix 416 and/or subpixels 418 can be glass substrate 420 through which transmitted light 424 can make its way to a user's eyes. In some embodiments, additional layers may be present such as, but not limited to, one or more polarizer layers, a diffuser layer, one or more brightness enhancing layers, or other optional display layers.

As illustrated in FIG. 27, each subpixel 418 can be comprised of a matrix having a colored pigment/ink 422 suspended in the matrix that provides the color for that specific subpixel. For example, a red subpixel 418*a* can have a red pigment/ink 422*a* suspended in its matrix, a green subpixel 418*b* can have a green pigment/ink 422*b* suspended in its matrix, and a blue subpixel 418*c* can have a blue pigment/ink 422*c* suspended in its matrix.

Color filter layer 112 may additionally include dyes (such as soluble dyes), pigments, compounds, or any combination thereof, that may have an effect on the color transmission through color filter layer 112. The effect depends on the type of dye, pigment or compounds and the amount present. In one instance, blue light toxicity may be reduced. The colors impact the resulting display where blue dyes may reduce the value of blue light transmission, green dye may reduce the value of green light transmission, and red dye may reduce the value of red light transmission.

Incorporating dyes into color filter 112 may improve the color gamut and efficiently reduce blue light toxicity because of the inherent nature of color filter 112. In some instances, color filter 112 may modify the emission at the level of light. In the instance of dyes added, such as blue dye(s), there may be secondary absorption, and in adding blue dyes to color filter 112, blue can then be mostly impacted. Also applicable, the three subpixels (such as red, green, and blue) within each pixel may be addressed, or impacted, depending on the dye selected and its placement.

In some embodiments, blue dye may be added to layers, such as color filter 112, and/or to pixels or subpixels with layers to prevent secondary absorption among other light regions. Dyes improve display quality and light transmission because dyes reduce light leakage (such as letting green light into blue pixels and/or blue light into green pixels), reducing the color gamut, so dyes past 500 nm wavelengths in blue pixel reduce light leakage into green, and dyes around 491 nm in green pixel reduce light leakage into blue wavelengths 575 nm. Likewise, dye may be added to red pixels to prevent green light from leaking into red light. Additionally, the control or limits of color may reduce toxicity without luminance loss and by increasing color gamut.

Dye(s) may be added in certain locations and layer(s) respective of the display stack. In one embodiment, blue light filtering dye may be added to a blue subpixel (to get rid of toxic blue light). A blue dye may filter light on the short wavelength side of the blue range, a blue dye may filter light on the long wavelength side of the blue range, a green dye may filter light on the short wavelength side of the green range, a green dye may filter light on the long wavelength side of the green range, and a red dye may filter light in the red wavelength range. This can all function to increase color gamut and separate color peaks. Thus, the different dye options affect the resulting wavelengths. The dye may result differently, such as: short wavelength blue, long wavelength blue, short wavelength green, long wavelength green, short wavelength red, etc.

FIGS. 28-41 illustrate various examples of dyes being incorporated directly into pixels and/or subpixels of a color filter (for example, dyes being dissolved into the matrix of the subpixel and being part of the solution on a molecular basis as opposed to adjacent to the subpixel matrices). In some embodiments, additional molecules can be added to the subpixels along with the dyes to improve the performance of the final color filter. These improvements in performance can include, but are not limited to, optimal coating viscosity to allow for better coating and/or to facilitate component compatibility, a more robust final coating that resists solvents and scratching, and improvements to the dyes to keep dyes 426*a-c*, 428, 430, and/or 432 stable in the presence of heat and light.

Figure 28:
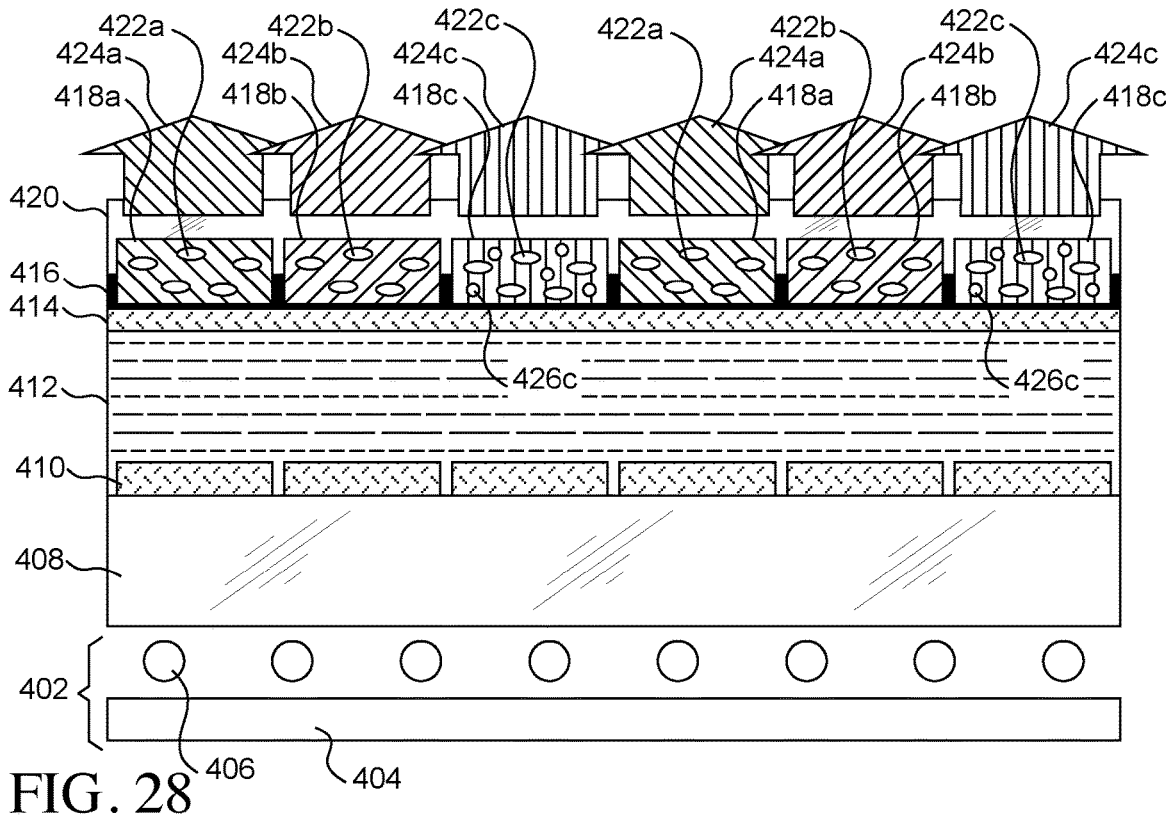
FIG. 28 is a schematic cross-sectional view of a display system of the current disclosure illustrating the additional presence of a dye in one of the subpixel color sets.

FIG. 28 illustrates subpixels 418 of a color filter, wherein each subpixel includes a corresponding pigment to give it its color (i.e., red pigments 422*a* create a red subpixel 418*a*, green pigments 422*b* create a green subpixel 418*b*, and blue pigments 422*c* create a blue subpixel 418*c*) and, further, blue subpixels 418*c* can include primary dye 426*c*, which can absorb specific wavelength ranges of light in or near the blue wavelength range such as, but not limited to, 400 nm to 430 nm, 410 nm to 430 nm, 415 nm to 435 nm, 415 nm to 455 nm, 490 nm to 520 nm, and/or 510 nm to 530 nm. In some cases, specific wavelengths may be targeted such as, but not limited to, 450 nm to clear up pigments that have extra transmittance and may hurt the color gamut. Therefore, as illustrated in FIG. 28, blue subpixels 418*c* can include blue pigments 422*c* that give the subpixel its color as well as primary dyes 426*c* that absorb at least portions of the spectrum of blue light. Blue pigments 422*c* may be suspended in the matrix of the blue subpixel 418*c* whereas primary dyes 426*c* may be dissolved in the matrix and be part of the matrix solution.

Figures 29, 30:
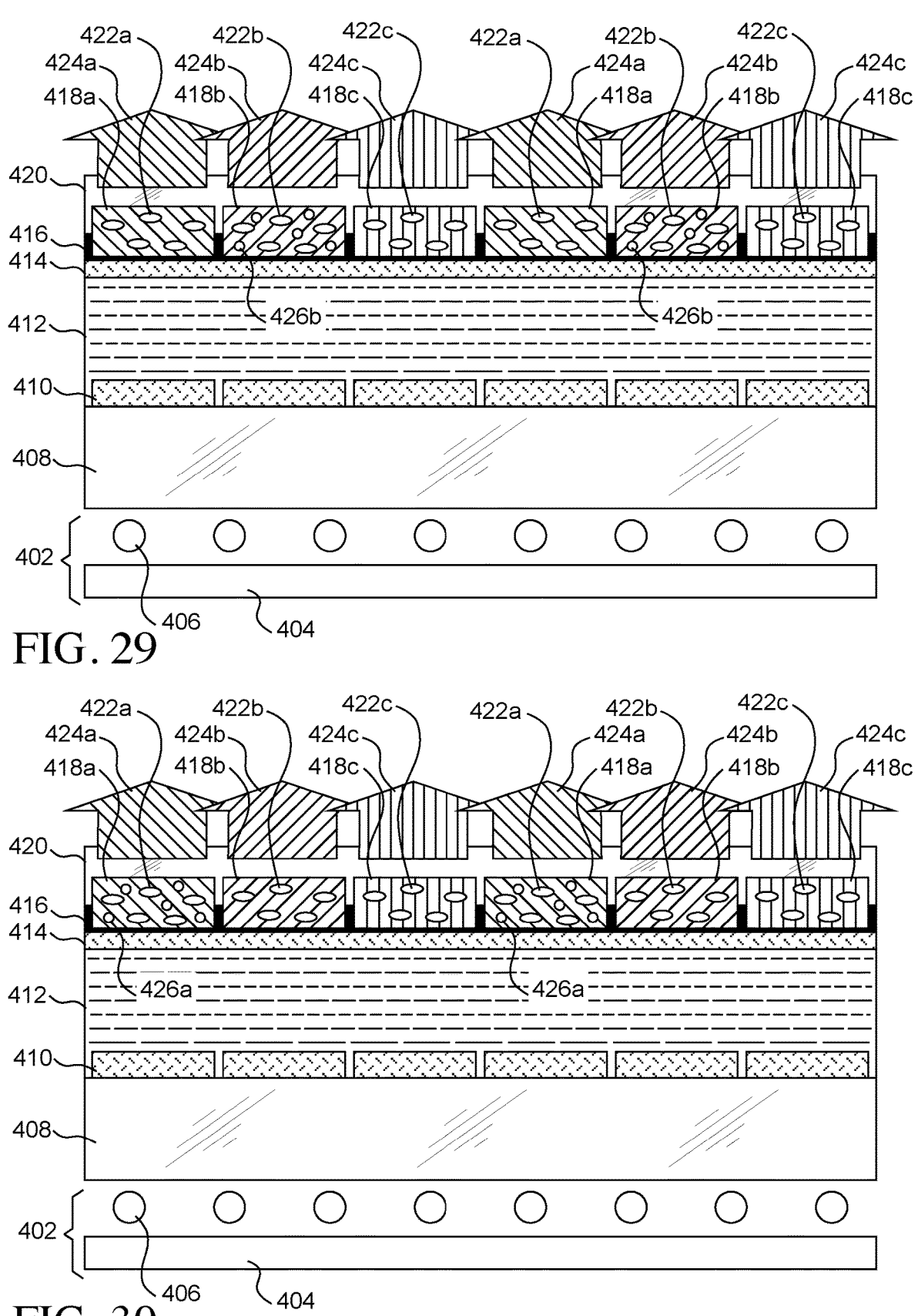
FIG. 29 is a schematic cross-sectional view of a display system of the current disclosure illustrating the additional presence of a dye in one of the subpixel color sets.
FIG. 30 is a schematic cross-sectional view of a display system of the current disclosure illustrating the additional presence of a dye in one of the subpixel color sets.

Similarly, FIG. 29 illustrates subpixels 418 of a color filter, wherein each subpixel includes a corresponding pigment to give it its color (as described above) and, further, green subpixels 418*b* can include primary dye 426*b*, which can absorb specific wavelength ranges of light in or near the green wavelength range such as, but not limited to, 445 nm to 455 nm, 470 nm to 495 nm, 470 nm to 500 nm, 490 nm to 570 nm, 520 nm to 550 nm, 590 nm to 640 nm, and/or 600 nm to 640 nm. In some cases, specific wavelengths may be targeted such as, but not limited to, 530 nm to clear up pigments that have extra transmittance and may hurt the color gamut. Therefore, as illustrated in FIG. 29, green subpixels 418*b* can include green pigments 422*b* that give the subpixel its color as well as primary dyes 426*b* that absorb at least portions of the spectrum of green light. Green pigments 422*b* may be suspended in the matrix of the green subpixel 418*b* whereas primary dyes 426*b* may be dissolved in the matrix and be part of the matrix solution.

Likewise, FIG. 30 illustrates subpixels 418 of a color filter, wherein each subpixel includes a corresponding pigment to give it its color (as described above) and, further, red subpixels 418*a* can include primary dye 426*a*, which can absorb specific wavelength ranges of light in or near the red wavelength range such as, but not limited to, 440 nm to 460 nm, 520 nm to 540 nm, 570 nm to 600 nm, 580 nm to 600 nm, and/or 580 nm to 620 nm. Therefore, as illustrated in FIG. 30, red subpixels 418*a* can include red pigments 422*a* that give the subpixel its color as well as primary dyes 426*a* that absorb at least portions of the spectrum of red light. Red pigments 422*a* may be suspended in the matrix of the red subpixel 418*a* whereas primary dyes 426*a* may be dissolved in the matrix and be part of the matrix solution.

Figure 31:
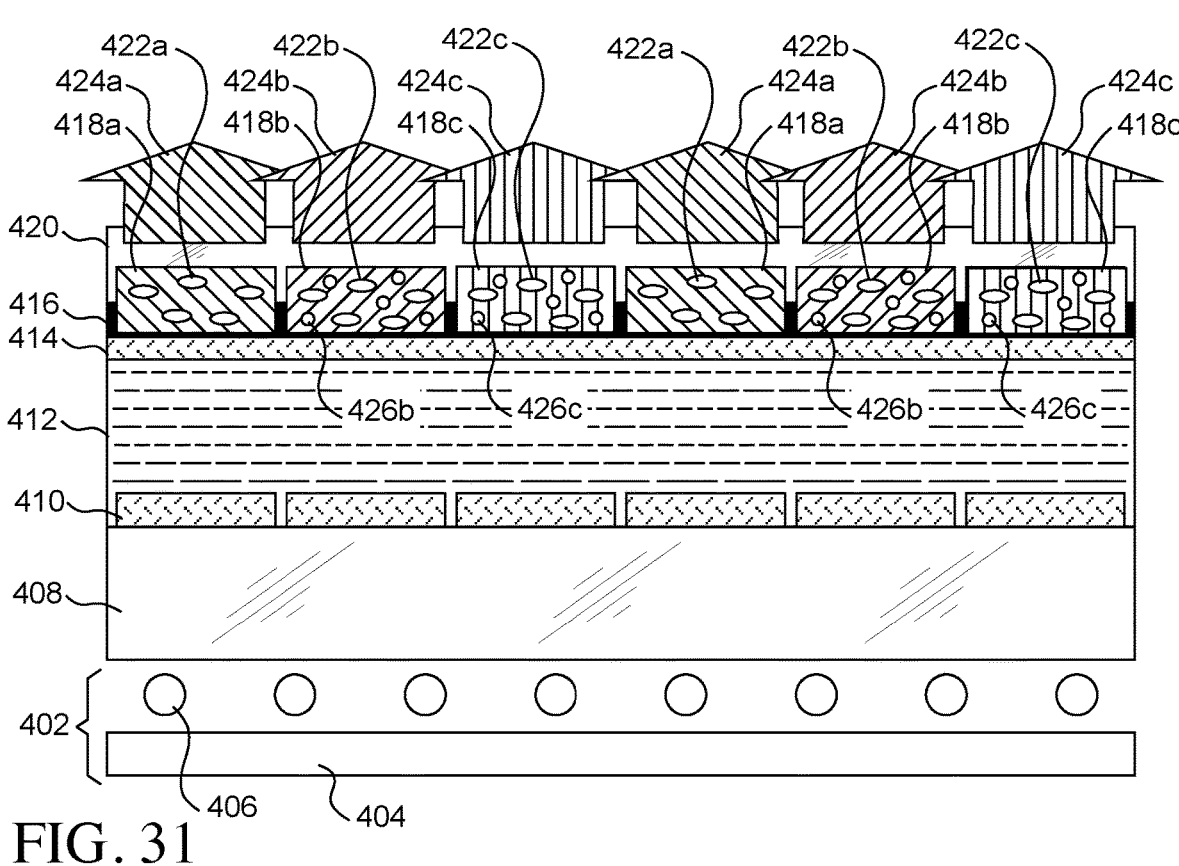
FIG. 31 is a schematic cross-sectional view of a display system of the current disclosure illustrating the additional presence of dyes in two of the subpixel color sets.
Figure 32:
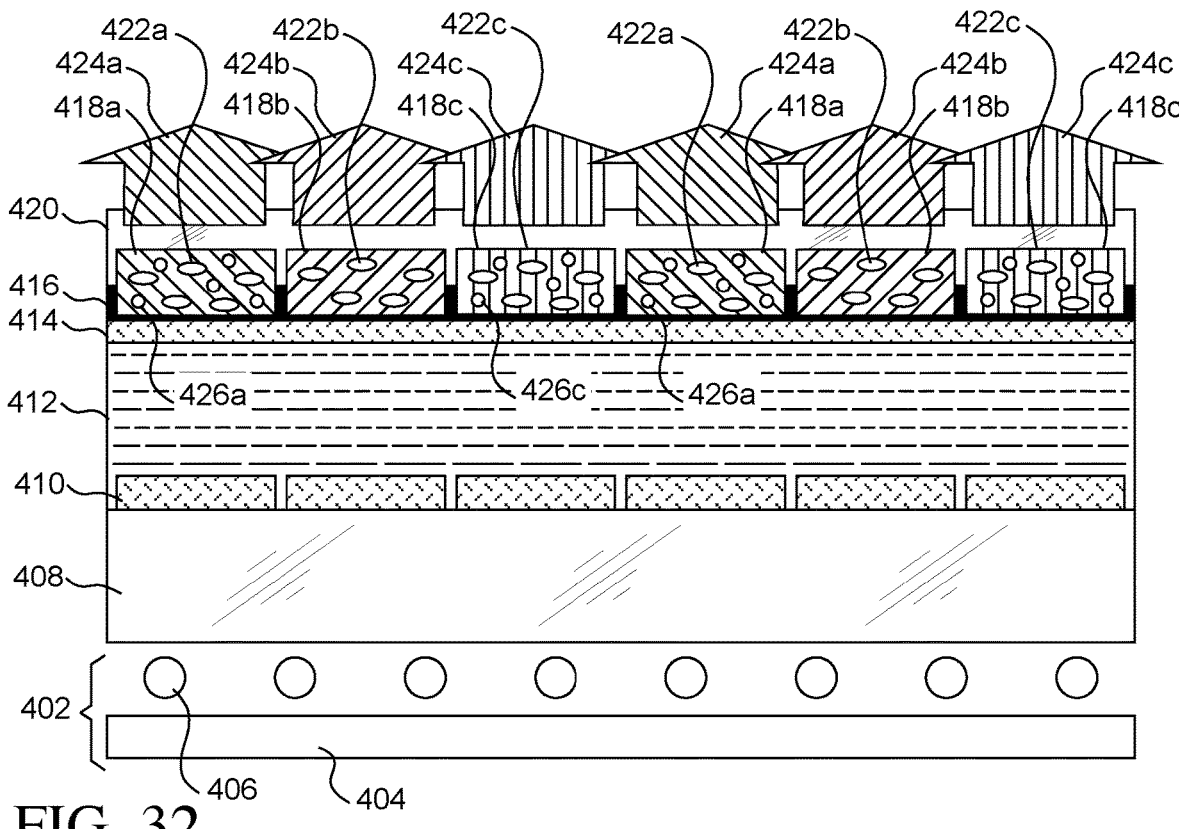
FIG. 32 is a schematic cross-sectional view of a display system of the current disclosure illustrating the additional presence of dyes in two of the subpixel color sets.
Figure 33:
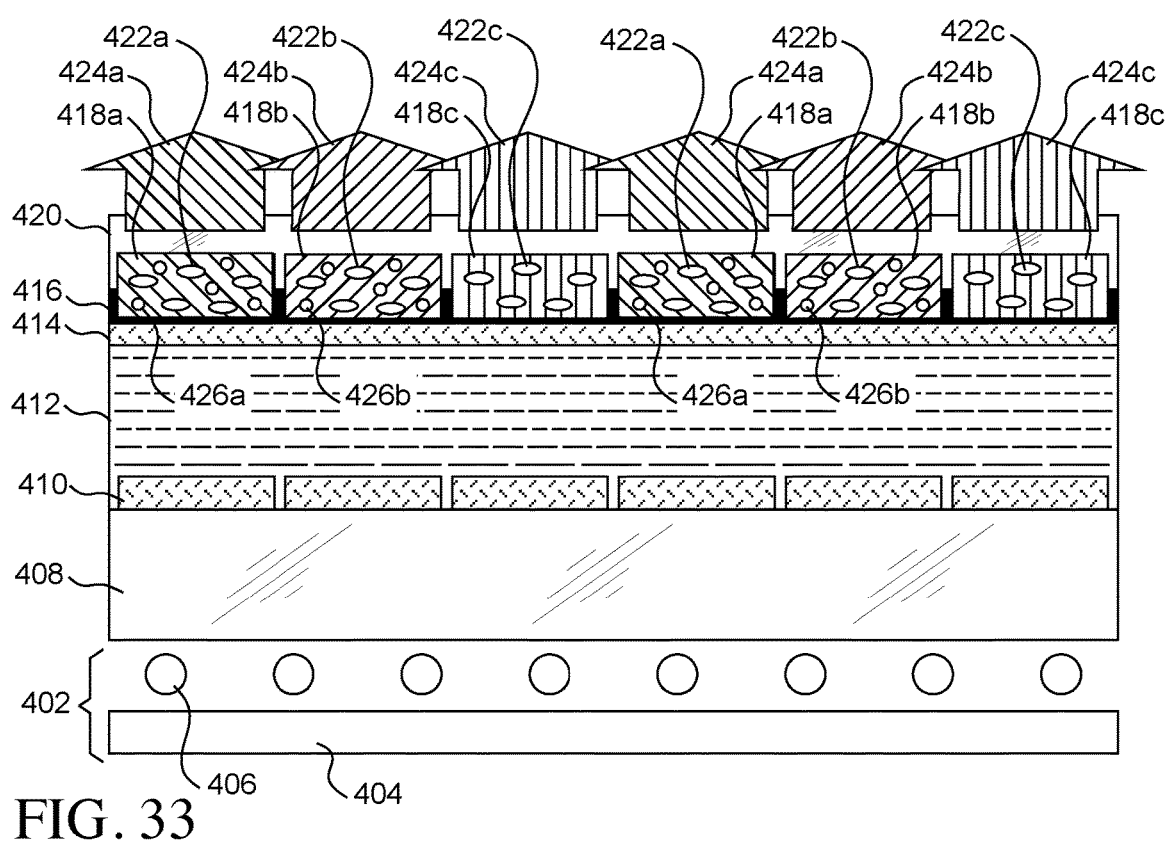
FIG. 33 is a schematic cross-sectional view of a display system of the current disclosure illustrating the additional presence of dyes in two of the subpixel color sets.
Figure 34:
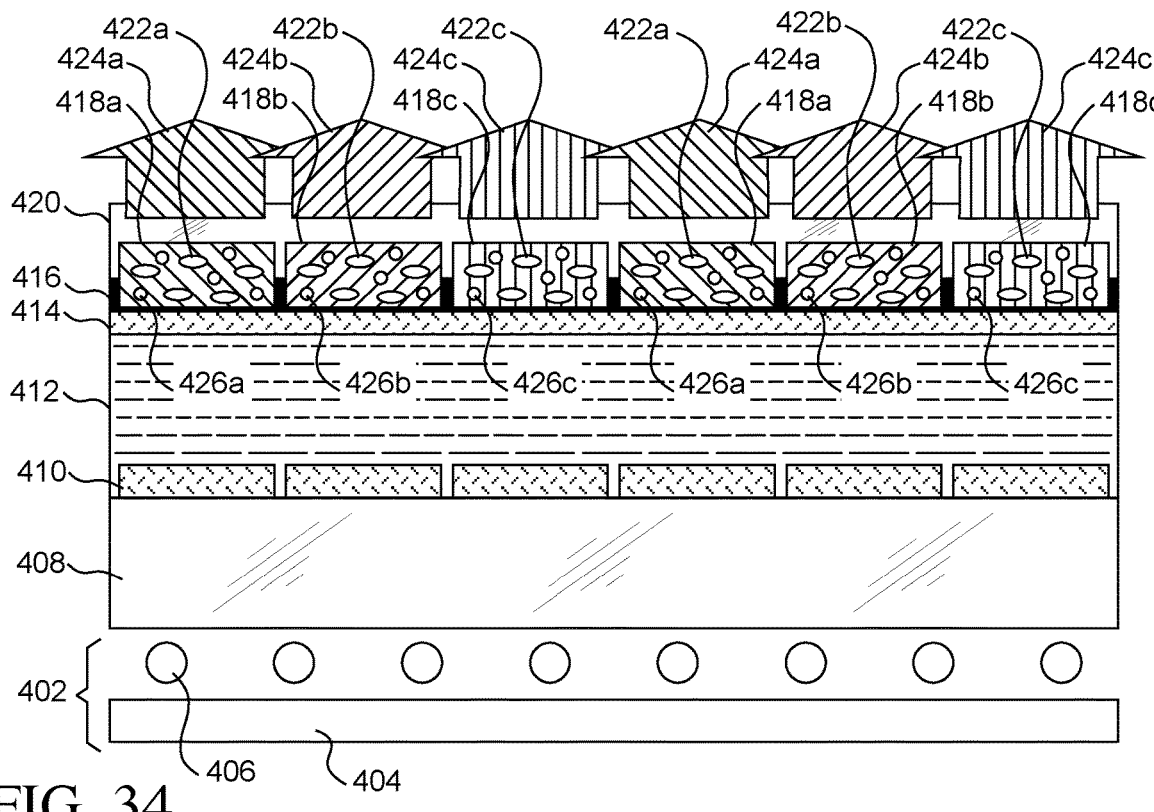
FIG. 34 is a schematic cross-sectional view of a display system of the current disclosure illustrating the additional presence of dyes in all of the subpixel color sets.

As illustrated in FIGS. 31-34, some embodiments of the disclosed color filter may include dyes in two or more of the corresponding subpixels. For example, as illustrated in FIG. 31, blue subpixels 418*c* may include primary dyes 426*c*, and green subpixels 418*b* may include primary dyes 426*b*. In another example, illustrated in FIG. 32, blue subpixels 418*c* may include primary dyes 426*c*, and red subpixels 418*a* may include primary dyes 426*a*. As illustrated in FIG. 33, green subpixels 418*b* may include primary dyes 426*b*, and red subpixels 418*a* may include primary dyes 426*a*. And as illustrated in FIG. 34, all three subpixels 418*a-c* may include primary dyes such that blue subpixels 418*c* may include primary dyes 426*c*, green subpixels 418*b* may include primary dyes 426*b*, and red subpixels 418*a* may include primary dyes 426*a*. The ranges of absorption for these primary dyes 426*a-c* may be similar to those described above, and the ranges of absorption that are selected can allow primary dyes 426*a-c* to reduce transmission of hazardous/toxic blue light (blue light between 415 nm and 435 nm), improve the color gamut of the resulting emitted light, and reduce light leakage/color emission overlap between subpixels (i.e., blue subpixels won't leak green or red light, green subpixels won't leak blue or red light, red subpixels won't leak blue or green light, etc.) to help separate the color peaks and sharpen the primary colors. Specific examples of these improvements are explained in more detail below and illustrated further in the figures.

Figure 35:
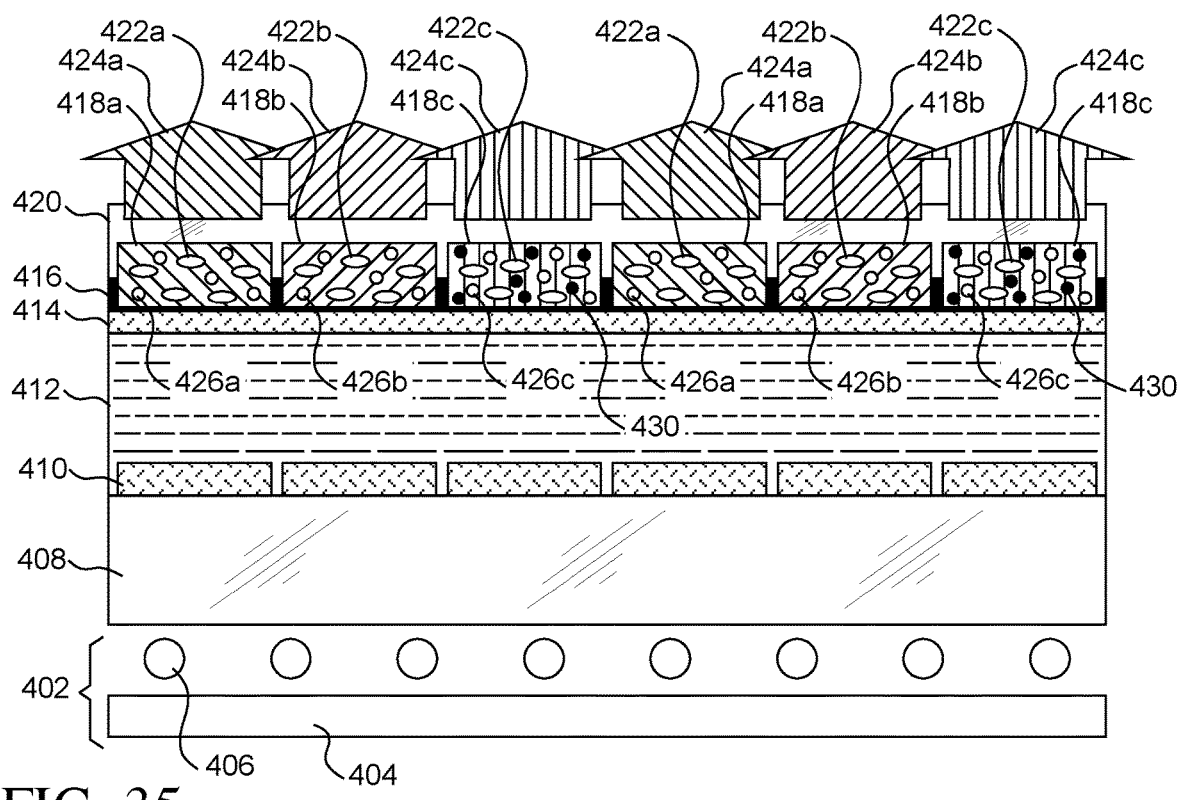
FIG. 35 is a schematic cross-sectional view of a display system of the current disclosure illustrating the additional presence of primary dyes in all of the subpixel color sets and a secondary dye in one of the subpixel color sets.

In some embodiments, one or more of subpixels 418*a-c* may include corresponding primary dyes 426*a-c* and, additionally, one or more of subpixels 418*a-c* may include secondary dyes. For example, as illustrated in FIG. 35, blue subpixels 418*c* may include primary dye 426*c* as well as secondary dye 430, wherein both dyes 426*c* and 430 are dissolved in the subpixel matrix and are part of the solution that creates the blue subpixels 418*c*. Secondary dye 430 can be a dye that absorbs in a different wavelength range compared to the primary dye 426*c* that absorbs near or within the blue wavelength range. More specifically, primary dye 426*c* may absorb in a short wavelength blue range such as 400 nm to 430 nm, whereas secondary dye 430 may absorb in a longer wavelength blue range such as 490 nm to 520 nm to assist with color correction or reducing leakage. Alternatively, secondary dye 430 may absorb in a different color wavelength, such as green, to aid in reducing the leakage of non-blue light through the blue subpixel 418*c*. Therefore, secondary dye 430 can help separate color peaks between the blue, green, and/or red color peaks. While secondary dye 430 is occasionally referred to herein in the singular, it is envisioned that one or more dyes may constitute the secondary dye.

Figure 36:
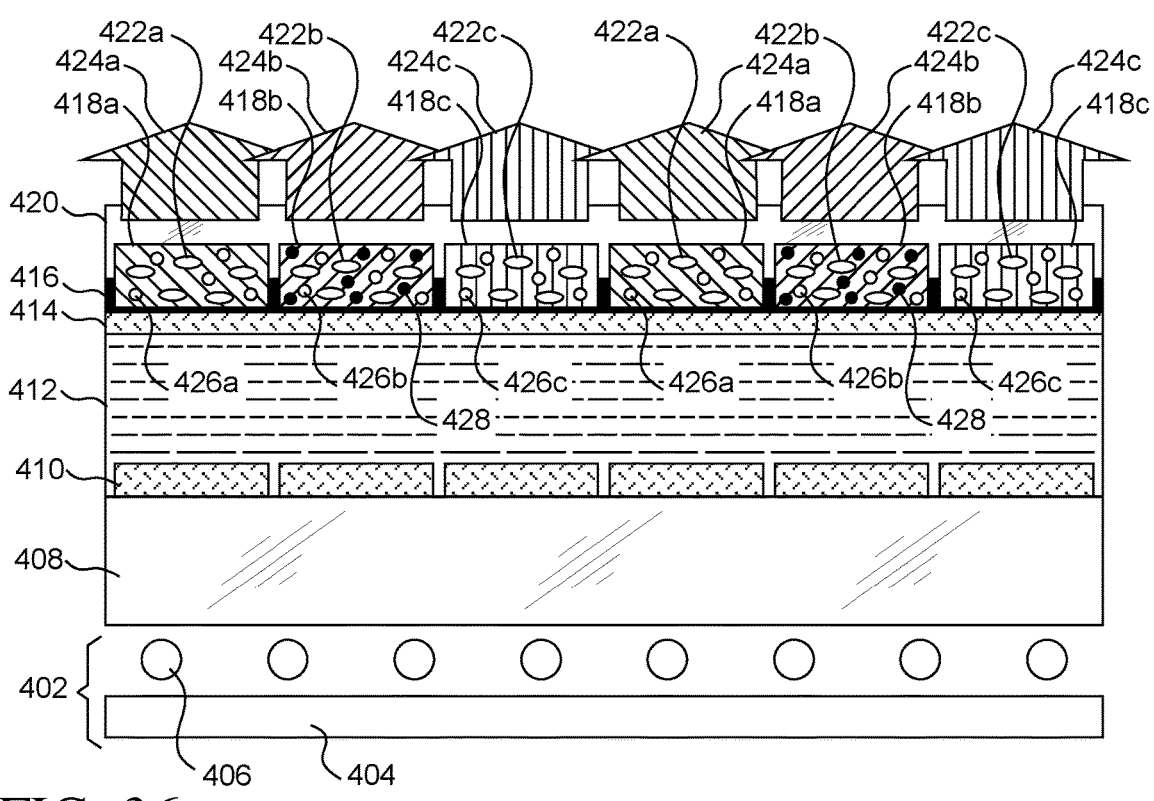
FIG. 36 is a schematic cross-sectional view of a display system of the current disclosure illustrating the additional presence of primary dyes in all of the subpixel color sets and a secondary dye in one of the subpixel color sets.

In another example, as illustrated in FIG. 36, green subpixels 418*b* may include primary dyes 426*b* as well as secondary dyes 428, wherein both dyes 426*b* and 428 are dissolved in the subpixel matrix and are part of the solution that creates the green subpixels 418*b*. Secondary dye 428 can be a dye that absorbs in a different wavelength range compared to the primary dye 426*b* that absorbs near or within the green wavelength range. More specifically, primary dye 426*b* may absorb in a short wavelength green range such as 470 nm to 500 nm, whereas secondary dye 428 may absorb in a longer wavelength green range such as 565 nm to 590 nm or 600 nm to 640 nm to assist with color correction or reducing leakage. Alternatively, secondary dye 428 may absorb in a different color wavelength, such as blue or red, to aid in reducing the leakage of non-green light through the green subpixel 418*b*. Therefore, secondary dye 428 can help separate color peaks between the blue, green, and/or red color peaks. While secondary dye 428 is occasionally referred to herein in the singular, it is envisioned that one or more dyes may constitute the secondary dye.

Figure 37:
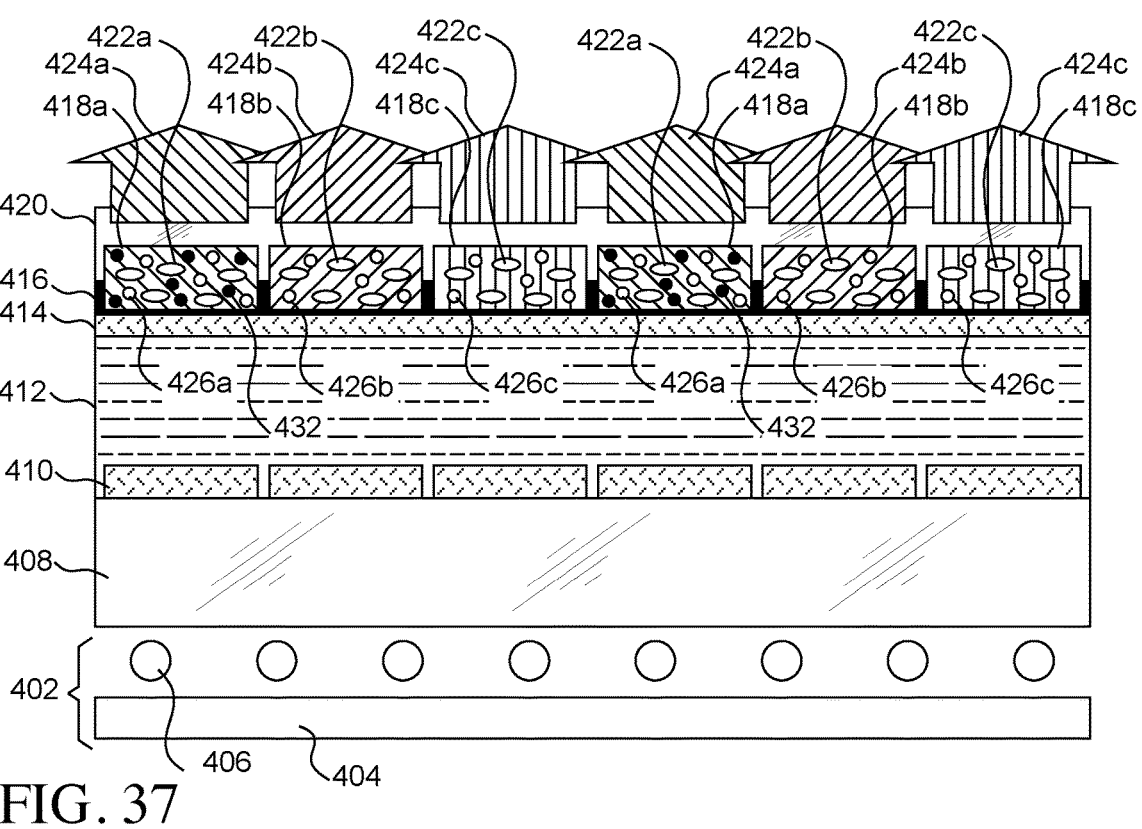
FIG. 37 is a schematic cross-sectional view of a display system of the current disclosure illustrating the additional presence of primary dyes in all of the subpixel color sets and a secondary dye in one of the subpixel color sets.

Further, as illustrated in FIG. 37, red subpixels 418*a* may include primary dyes 426*a* as well as secondary dyes 432, wherein both dyes 426*a* and 432 are dissolved in the subpixel matrix and are part of the solution that creates the red subpixels 418*a*. Secondary dye 432 can be a dye that absorbs in a different wavelength range compared to the primary dye 426*a* that absorbs near or within the red wavelength range. More specifically, primary dye 426*a* may absorb in a short wavelength red range such as 570 nm-600 nm, whereas secondary dye 432 may absorb in a longer wavelength red range such as 620 nm-600 nm to assist with color correction. Alternatively, secondary dye 432 may absorb in a different color wavelength, such as blue or green, to aid in reducing the leakage of non-red light through the red subpixel 418*a*. For example, many red color filter inks seem to permit light through in the wavelength range of 440 nm to 460 nm, so the secondary dye 432 can be incorporated into the subpixel to block that wavelength range and sharpen the color emission from the display. Therefore, secondary dye 432 can help separate color peaks between the blue, green, and/or red color peaks. While secondary dye 432 is occasionally referred to herein in the singular, it is envisioned that one or more dyes may constitute the secondary dye.

While examples are illustrated here with secondary dyes 430, 428, 432 present in a color filter having all three of primary dyes 426*a-c*, secondary dyes may be present in a color filter regardless of whether primary dyes are present in the non-corresponding subpixels 418*a-c*. For example, secondary dye 430 can be present in blue subpixels 418*c* even if the red 418*a* and/or green subpixels 418*b* do not have corresponding primary dyes 426*a* or 426*b*. Similarly, secondary dye 428 can be present in green subpixels 418*b* even if the red 418*a* and/or blue subpixels 418*c* do not have corresponding primary dyes 426*a* or 426*c*, and secondary dye 432 can be present in red subpixels 418*a* even if the green 418*b* and/or blue subpixels 418*c* do not have corresponding primary dyes 426*b* or 426*c*.

Figure 38:
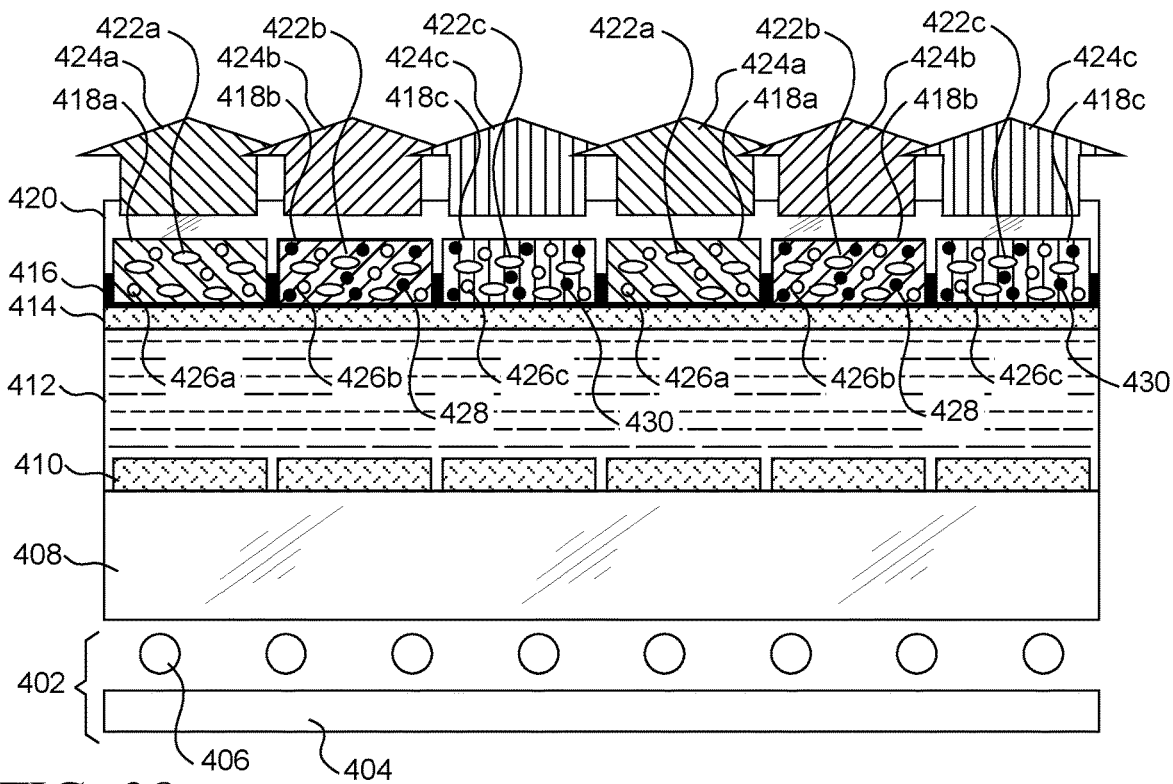
FIG. 38 is a schematic cross-sectional view of a display system of the current disclosure illustrating the additional presence of primary dyes in all of the subpixel color sets and secondary dyes in two of the subpixel color sets.
Figure 39:
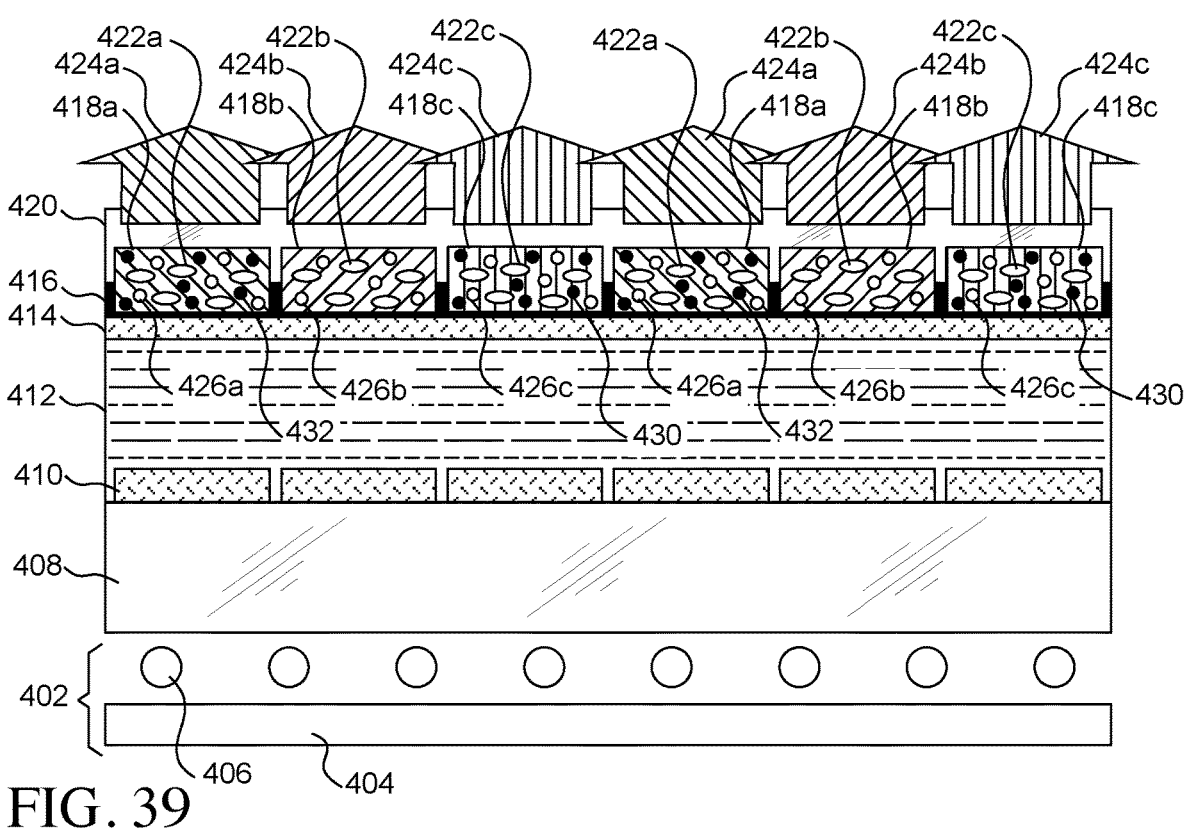
FIG. 39 is a schematic cross-sectional view of a display system of the current disclosure illustrating the additional presence of primary dyes in all of the subpixel color sets and secondary dyes in two of the subpixel color sets.
Figure 40:
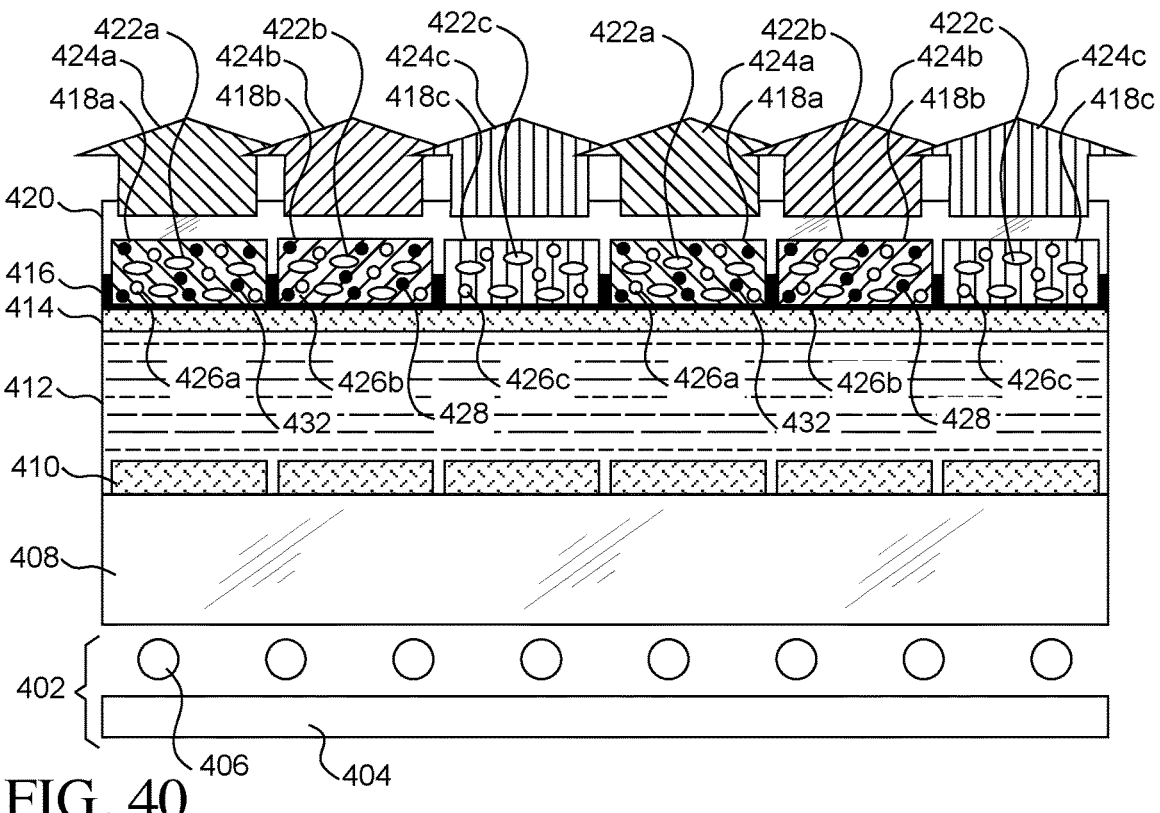
FIG. 40 is a schematic cross-sectional view of a display system of the current disclosure illustrating the additional presence of primary dyes in all of the subpixel color sets and secondary dyes in two of the subpixel color sets.
Figures 41, 42:
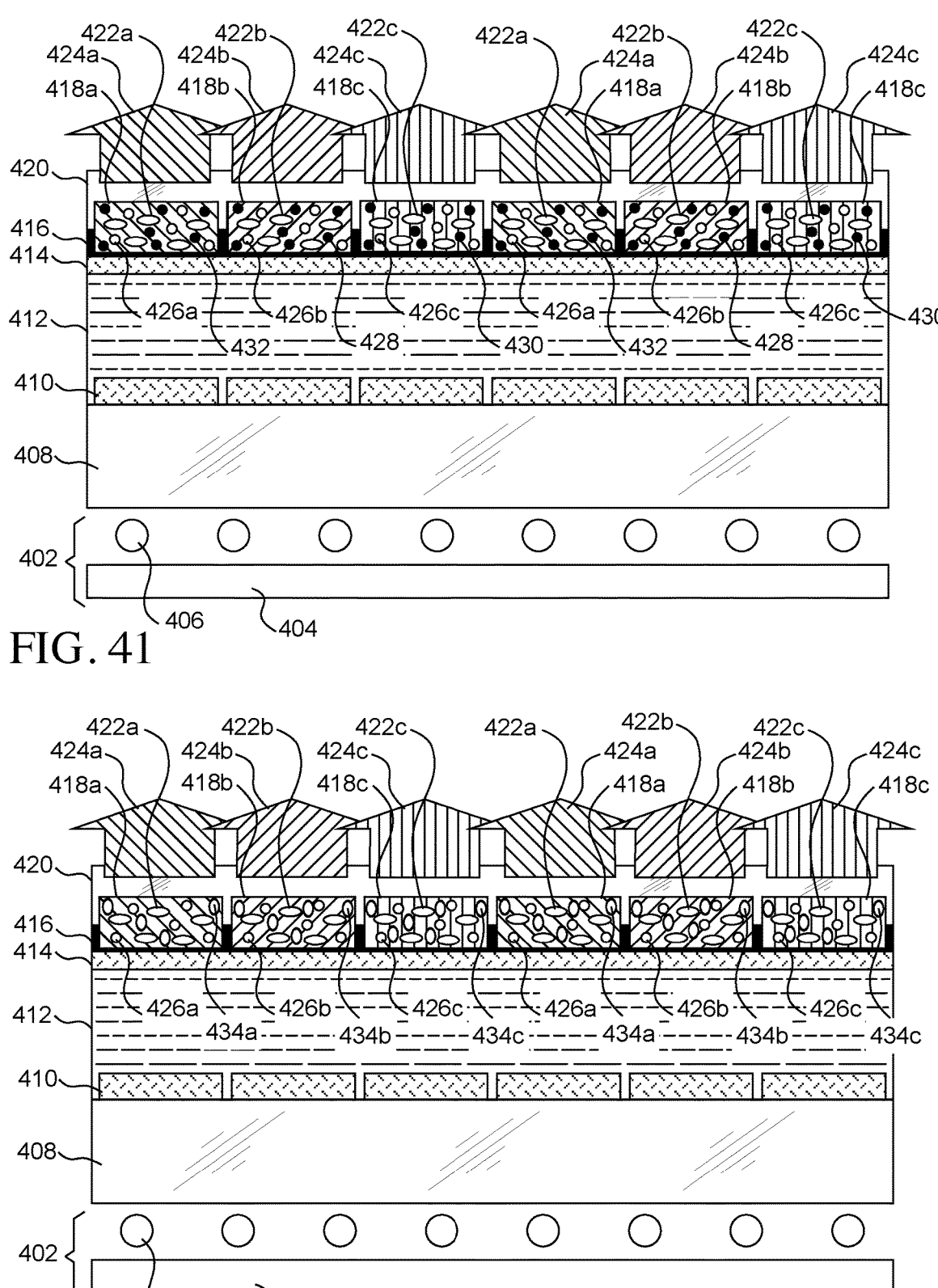
FIG. 41 is a schematic cross-sectional view of a display system of the current disclosure illustrating the additional presence of primary dyes in all of the subpixel color sets and secondary dyes in all of the subpixel color sets.
FIG. 42 is a schematic cross-sectional view of a display system of the current disclosure illustrating the additional presence of primary dyes in all of the subpixel color sets and dye enhancement compounds in all of the subpixel color sets.

Additionally, as illustrated in FIGS. 38-41, some embodiments of the disclosed color filter may include secondary dyes in two or more of the corresponding subpixels. For example, as illustrated in FIG. 38, blue subpixels 418*c* may include secondary dyes 430, and green subpixels 418*b* may include secondary dyes 428. In another example, illustrated in FIG. 39, blue subpixels 418*c* may include secondary dyes 430, and red subpixels 418*a* may include secondary dyes 432. As illustrated in FIG. 40, green subpixels 418*b* may include secondary dyes 428, and red subpixels 418*a* may include secondary dyes 432. And as illustrated in FIG. 41, all three subpixels 418*a-c* may include secondary dyes such that blue subpixels 418*c* may include secondary dyes 430, green subpixels 418*b* may include secondary dyes 428, and red subpixels 418*a* may include secondary dyes 432.

In some embodiments, the dyes that are added to the subpixels of the color filter can be heat resistant/stable, such that they maintain their ability to absorb their intended wavelength ranges even after being exposed to high temperatures (for example, 200 to 250 degrees Celsius) for extended periods of time (for example, two to three hours). More specifically, the light that is transmitted from the display when it incorporates the disclosed color filter with dyes 426*a-c* and/or secondary dyes 430, 428, 432 can minimally change position on a color gamut chart such that the X- and Y-coordinates/values may only move up to 1% along the X-axis and up to 1% along the Y-axis. In some cases, the movement along either or both axes is no more than 0.6%. For example, movement along the Y-axis for blue subpixels may be between 0.2 and 0.3%. Movement along the Y-axis for red subpixels may be between 0.5 and 0.6%.

As mentioned above, additional molecules can be added to the subpixels along with the dyes to improve the performance of the final color filter. These molecules/additives are referred to herein as dye enhancement compounds, and they can include photoinitiators, polymerization initiation aids, monomers, stabilizers, and co-initiators.

Photoinitiators can include, but are not limited to, oxime compounds, ketones, triazine compounds, phophine oxide compounds, biimidazole compounds, benzoin compounds, quinone compounds, thioxanthone compounds, triazine-based photopolymerization initiators, and coumarin compounds.

Polymerization initiation aids can include, but are not limited to, amine compounds, alkoxyanthracene compounds, thioxanthone compounds, carboxylic acid compounds, amide compounds, triethyl benzyl ammonium chloride, imidazole compounds, triphenylphophine, and triazine compounds.

Monomers are made up of unsaturated monocarboxylic acid and can include, but are not limited to, acrylic acid, methacrylic acid, crotonic acid, alpha-chloroacrylic acid, cinnamic acid, dicarboxylic acid diesters, bicyclo compounds, etc. The unsaturated dicarboxylic acid can comprise, for example, maleic acid, fumaric acid, itaconic acid, citraconic acid, mesaconic acid, and the like. The unsaturated polyvalent carboxylic acid can be an acid anhydride of an acid. Further, the unsaturated polyvalent carboxylic acid can be a mono ester thereof. Further, the unsaturated polyvalent carboxylic acid can be a mono acrylate having a polymer dicarboxylic group at both ends thereof. In some embodiments, other types of multifunctional monomers can include, but are not limited to, one or more polyfunctional monomers of trimethylolpropane tri (meth) acrylate, ethoxylated trimethylolpropane tri (meth) acrylate, propoxylated trimethylolpropane tri (meth) acrylate, pentaerythritol tetra (meth) acrylate, dipentaerythritol penta (meth) acrylate, ethoxylated dipentaerythritol hexa (meth) acrylate, propoxylated dipentaerythritol hexa (meth) acrylate, and dipentaerythritol hexa (meth) acrylate.

Stabilizers can include, but are not limited to, antioxidants such as hindered phenols, hindered amines, phosphorous antioxidants, sulfide-based antioxidants, or combinations thereof. Present in the disclosed subpixels may be one or more primary and/or one or more secondary antioxidants. In some cases, the antioxidant can have a phenolic antioxidant functional group and a phosphorous-based antioxidant functional group in one molecule, or both a phenolic antioxidant functional group and a sulfur-based antioxidant functional group. It is anticipated that a phenolic antioxidant may be used independently or may use two or more types together. Similarly, an amine-based antioxidant may be used independently or may use two or more types together. Any negative effects due to the inclusion of stabilizers can be counteracted by photoinitiators or co-initiators.

In some embodiments, the dyes may not be heat stable on their own and, therefore, the dye enhancement compounds can be added to the subpixels of the color filter to increase heat resistance/stability of the dye(s). The dye enhancement compound(s) can protect the dye(s) so that the dye(s) can maintain their ability to absorb the intended wavelength ranges even after being exposed to high temperatures (for example, 200 to 250 degrees Celsius) for extended periods of time (for example, two to three hours).

Figure 45:
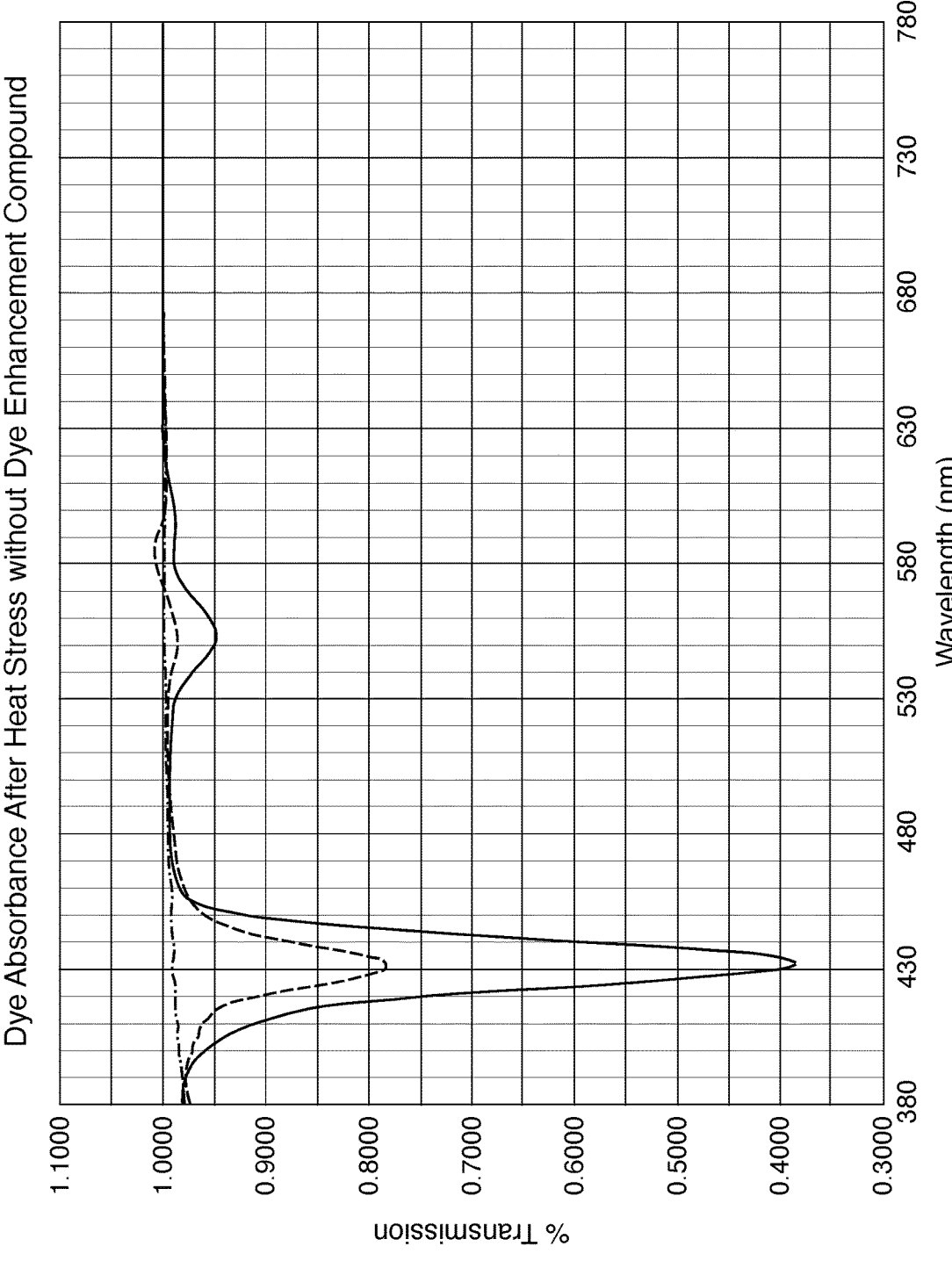
FIG. 45 is a non-limiting graphical illustration of dye absorbance after heat stress when a dye enhancement compound is not present.
Figure 48:
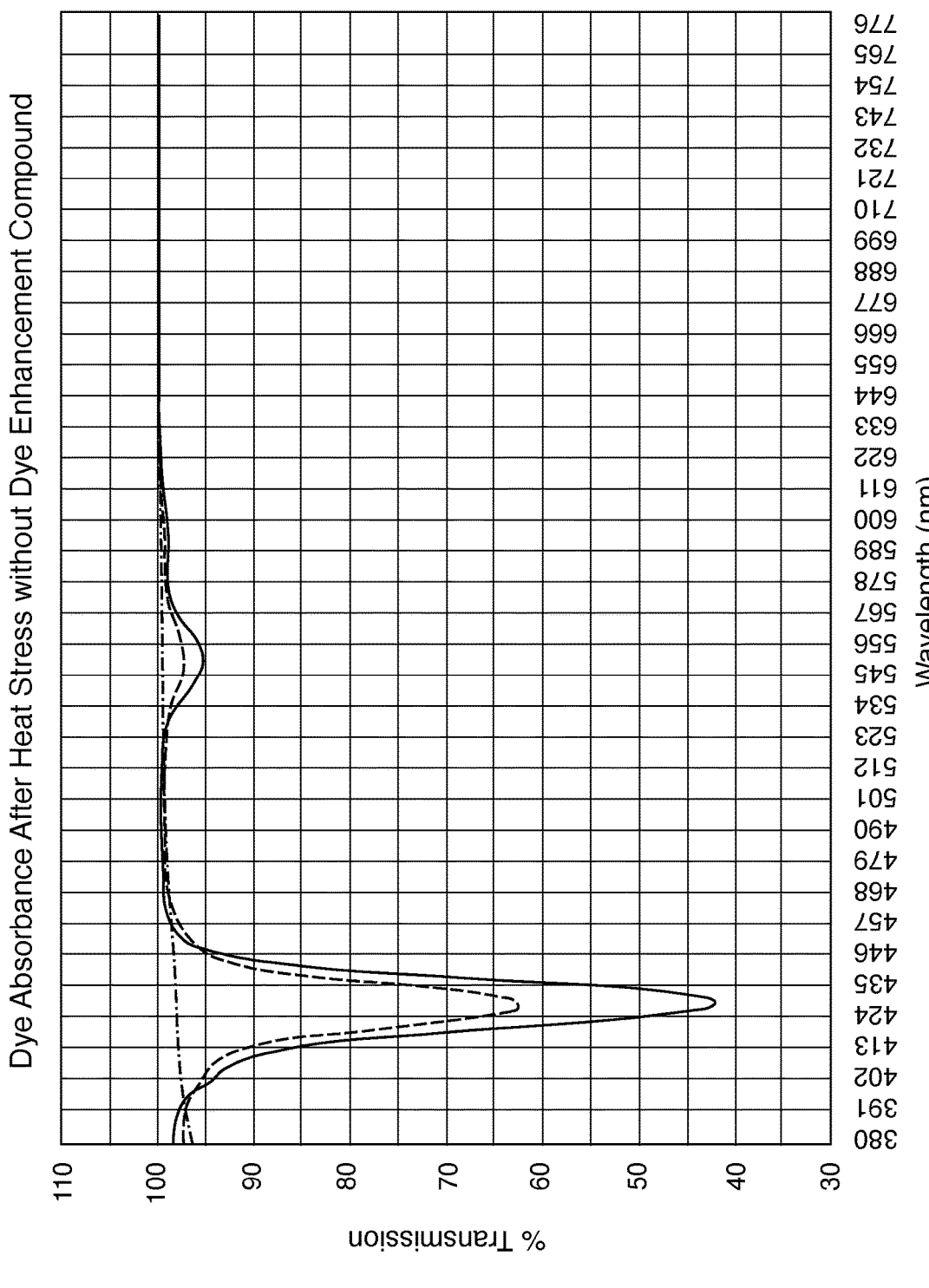
FIG. 48 is a non-limiting graphical illustration of dye absorbance after heat stress when a dye enhancement compound is not present.

More specifically, many dyes are not heat resistant and, over time, their level of light absorption may decrease. For example, as illustrated in FIGS. 45 and 48, after only 30 minutes of heat stress, dyes that typically have strong absorption peaking around 435 nm (for example, dyes with an absorption range between 400 nm-450 nm, a full width half max of 50 nm or less, peak absorbance between 425-440 nm, and allowing transmission at the peak absorbance being between as low as 35-45%) may permit transmission values at the peak absorbance point that are 20-40% greater (i.e., dyes that may cause light transmission from a device to be at 35-40% near 435 nm before heat stress, may allow transmission at 75-80% after heat stress; dyes that may cause light transmission from a device to be at 40-45% near 435 nm before heat stress, may allow transmission at 60-65% after heat stress). Further, as illustrated in FIGS. 45 and 48, after 180 minutes of heat stress, those same dyes may no longer have any noticeable blue light absorbance such that their transmission curves are relatively flat (i.e., less than 5% transmission variability) along the entire visible light spectrum. In some cases, these dyes may have secondary absorption peaks between 530-580 nm (with full width half max of 50 nm or less and a peak near 545-560 nm) that are also negatively affected by heat stress. These dyes may cause light transmission from a device to be around 95% at these green absorbance peaks before heat stress, transmission near 97-99% after 30 minutes of heat stress, and transmission near 100% after 180 minutes of heat stress.

Figure 46:
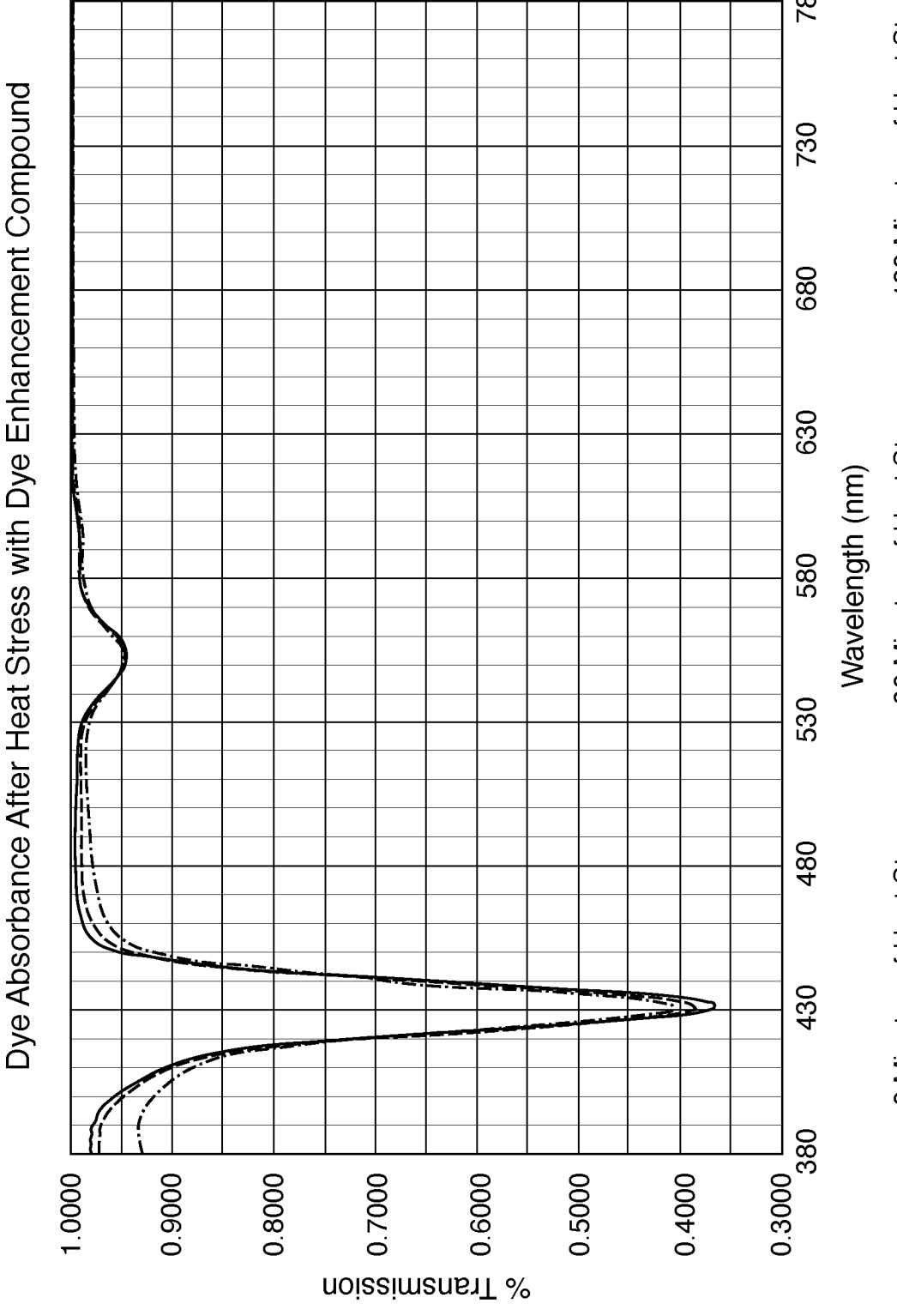
FIG. 46 is a non-limiting graphical illustration of dye absorbance after heat stress when a dye enhancement compound is present.
Figure 49:
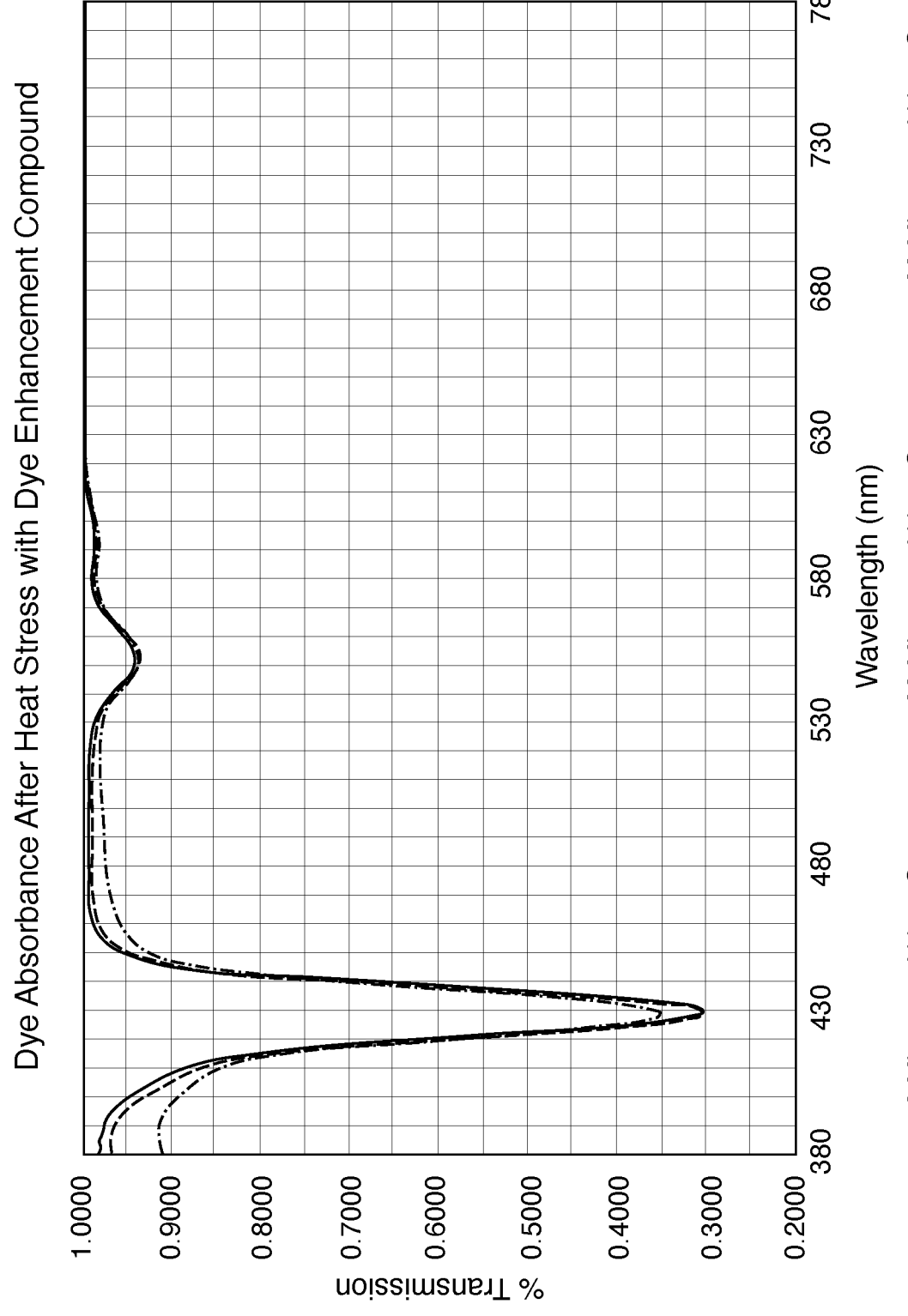
FIG. 49 is a non-limiting graphical illustration of dye absorbance after heat stress when a dye enhancement compound is present.

Therefore, as mentioned above, to mitigate the decrease in absorption ability of the dyes, dye enhancement compounds can be added. As illustrated in FIGS. 46 and 49, transmission and absorption properties of the dyes remain relatively unchanged when comparing transmission and absorption properties before and after heat testing when dye enhancement compounds are added. For example, as illustrated in FIG. 46, transmission from a device having the combined dye and dye enhancement compound in the color filter can be between 35-40% before heat stress (with full width half max of 50 nm or less, peak absorbance between 425-440 nm, and absorption range between 400-450 nm) and can remain between 35-40% after 30 minutes of heat stress. After 180 minutes of heat stress, transmission from a device having the combined dye and dye enhancement compound in the color filter can minimally move to 40-45%. Therefore, overall transmission in the blue range from a device having the combined dye and dye enhancement compound in the color filter may change no more than 10% between original values and values after heat stress. As illustrated in FIG. 46, transmission in the green range from a device having the combined dye and dye enhancement compound in the color filter (absorption between 530-580 nm with full width half max of 50 nm or less and a peak near 545-560 nm) can be between 93-97% prior to heat stress and can remain between 93-97% after 30 minutes and 180 minutes of heat stress. As illustrated, absorption levels in the green range may not change at all.

In another example, as illustrated in FIG. 49, transmission from a device having the combined dye and dye enhancement compound in the color filter can be between 30-35% before heat stress (with full width half max of 50 nm or less, peak absorbance between 425-440 nm, and absorption range between 400-450 nm) and can remain between 30-35% after 30 minutes of heat stress. After 180 minutes of heat stress, transmission from a device having the combined dye and dye enhancement compound in the color filter can minimally move to 35-40%. Therefore, overall transmission in the blue range from a device having the combined dye and dye enhancement compound in the color filter may change no more than 10% between original values and values after heat stress. As illustrated in FIG. 49, transmission in the green range from a device having the combined dye and dye enhancement compound in the color filter (absorption between 530-580 nm with full width half max of 50 nm or less and a peak near 545-560 nm) can be between 92-96% prior to heat stress and can remain between 92-96% after 30 minutes and 180 minutes of heat stress. As illustrated, absorption levels in the green range may not change at all.

Figure 47:
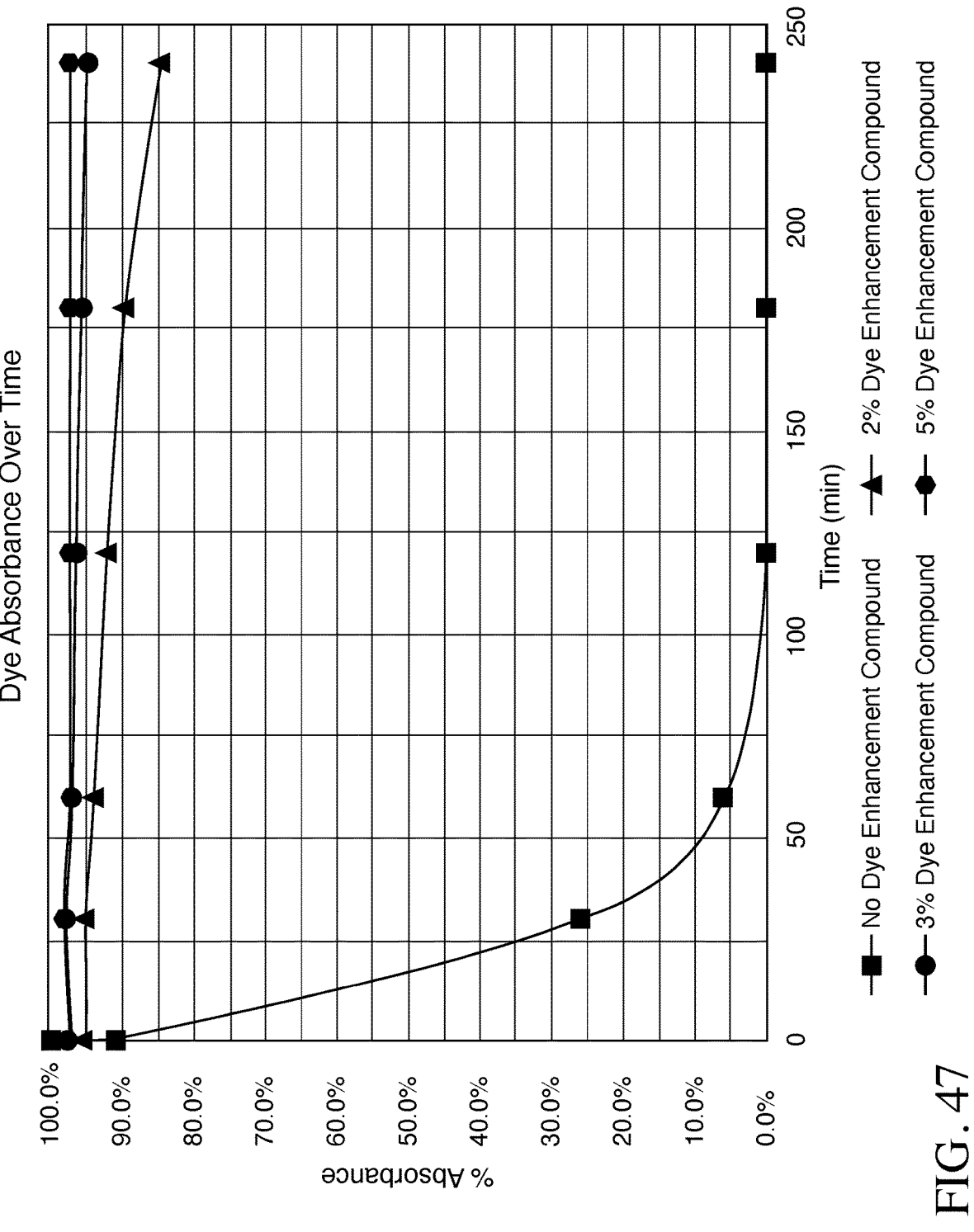
FIG. 47 is a non-limiting graphical illustration of dye absorbance over time when varying quantities of a dye enhancement compound are present.
Figure 50:
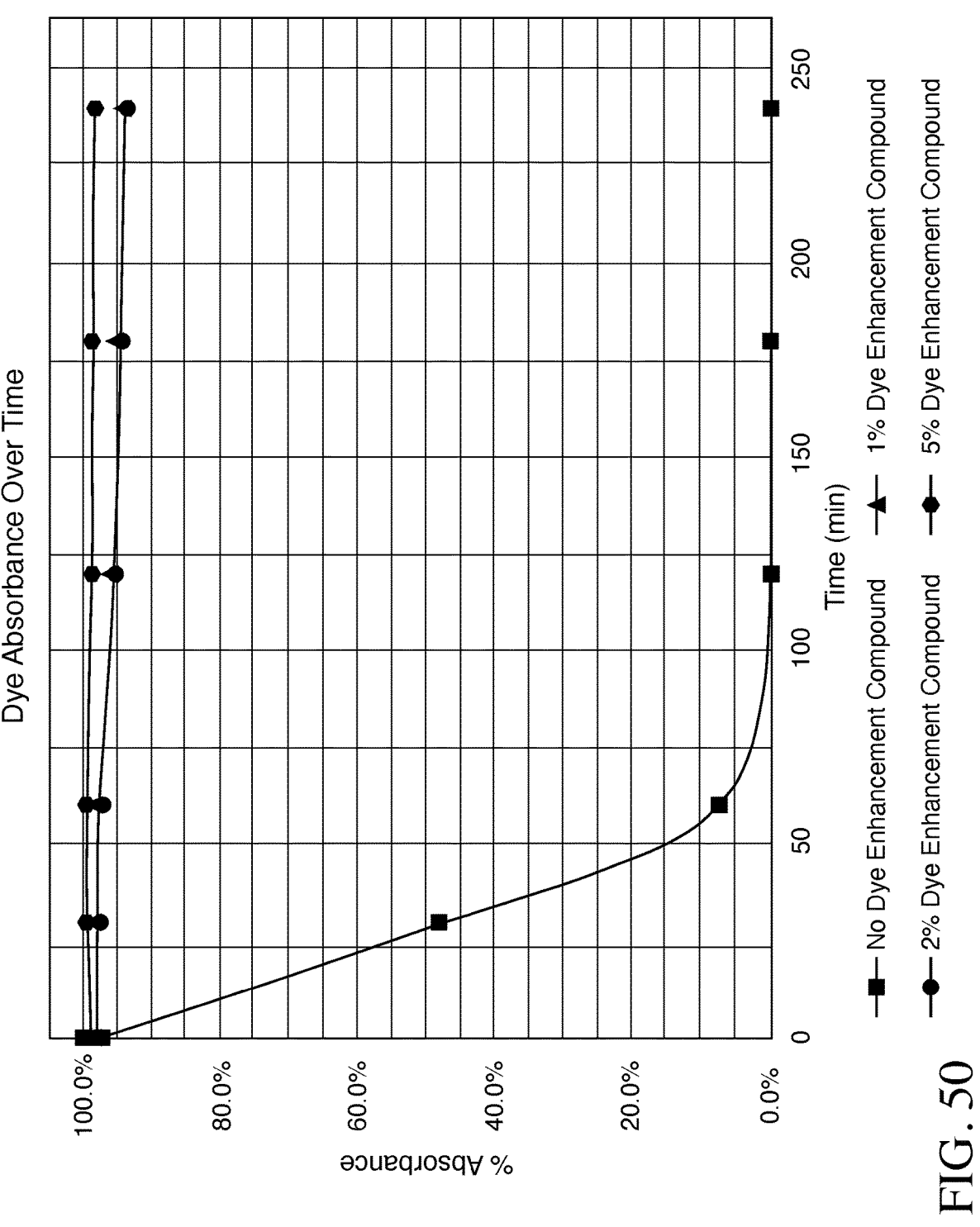
FIG. 50 is a non-limiting graphical illustration of dye absorbance over time when varying quantities of a dye enhancement compound are present.

To achieve protection against decreased absorption values, the amount of dye enhancement compound(s) incorporated into a subpixel can be between 2-5%. While additional dye enhancement compound(s) (for example, 5%) improves the ability of the dye(s) to continue to absorb, amounts as low as 2% continue to have a positive effect. For example, as illustrated in FIG. 47, 2% of one embodiment of dye in combination with the dye enhancement compound(s) enables the dye to lose around 10-15% of its absorption power, 3% can enable the dye to lose less than 6% of its absorption power, and 5% can result in less than 3% loss of its absorption power. As illustrated in FIG. 50, even as little as 1% of another embodiment of the dye enhancement compound(s) in combination with the dye enables the dye to lose about 4-7% of its absorption power. Similarly, 2% of the dye enhancement compound(s) in combination with that embodiment of dye can enable the dye to lose around 4-7% of its absorption power, and 5% can result in less than 3% loss of its absorption power. As illustrated in both FIGS. 47 and 50, the absence of dye enhancement compound(s) may result in the dye losing all absorption ability after 100-150 minutes (for example, after 125 minutes).

Figure 51:
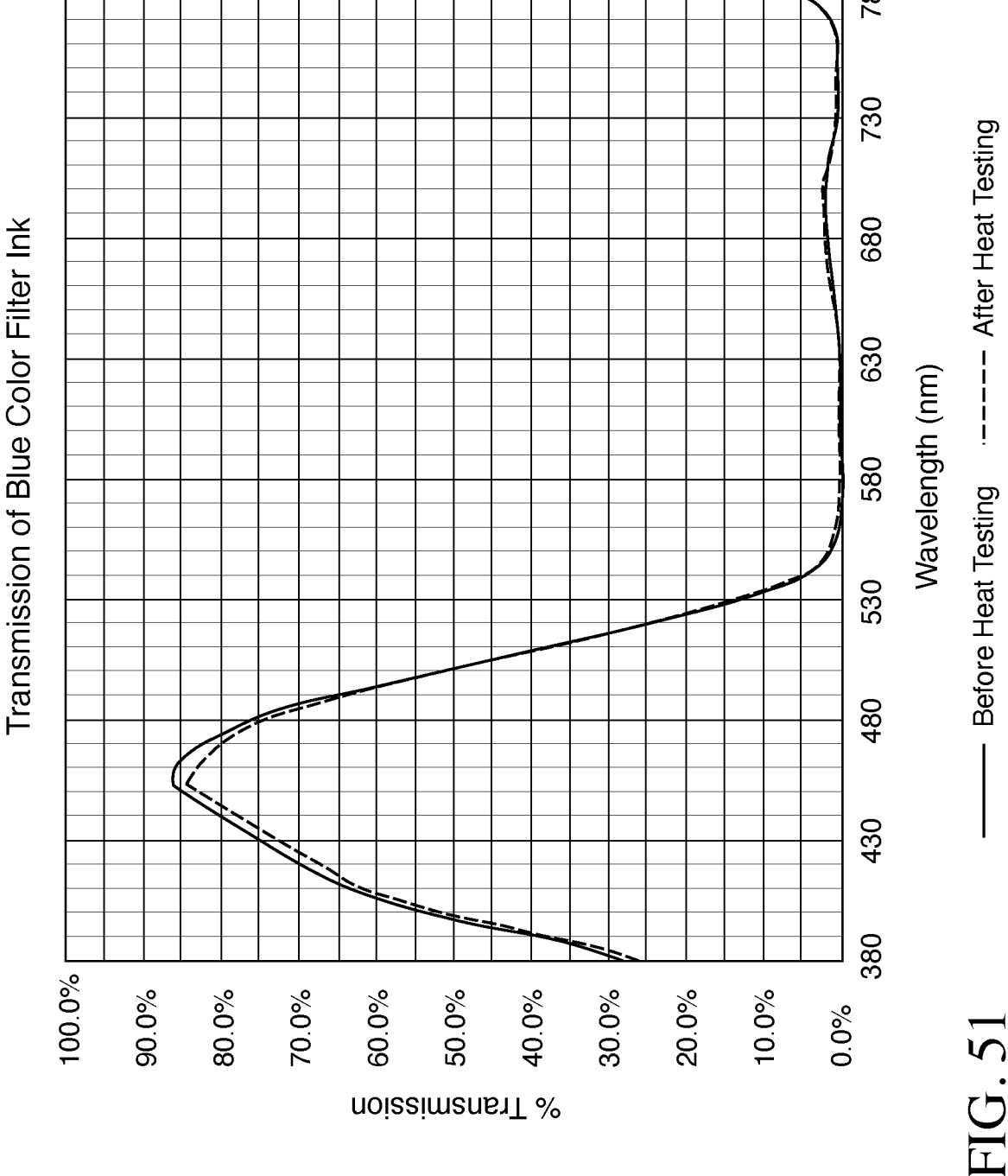
FIG. 51 is a non-limiting graphical illustration of transmission values across a wavelength spectrum from a device containing blue color filter ink from before and after being heat stressed.
Figure 52:
FIG. 52 is a non-limiting graphical illustration of transmission values across a wavelength spectrum from a device containing blue color filter ink, dye, and a dye enhancement compound from before and after being heat stressed.
Figure 54:
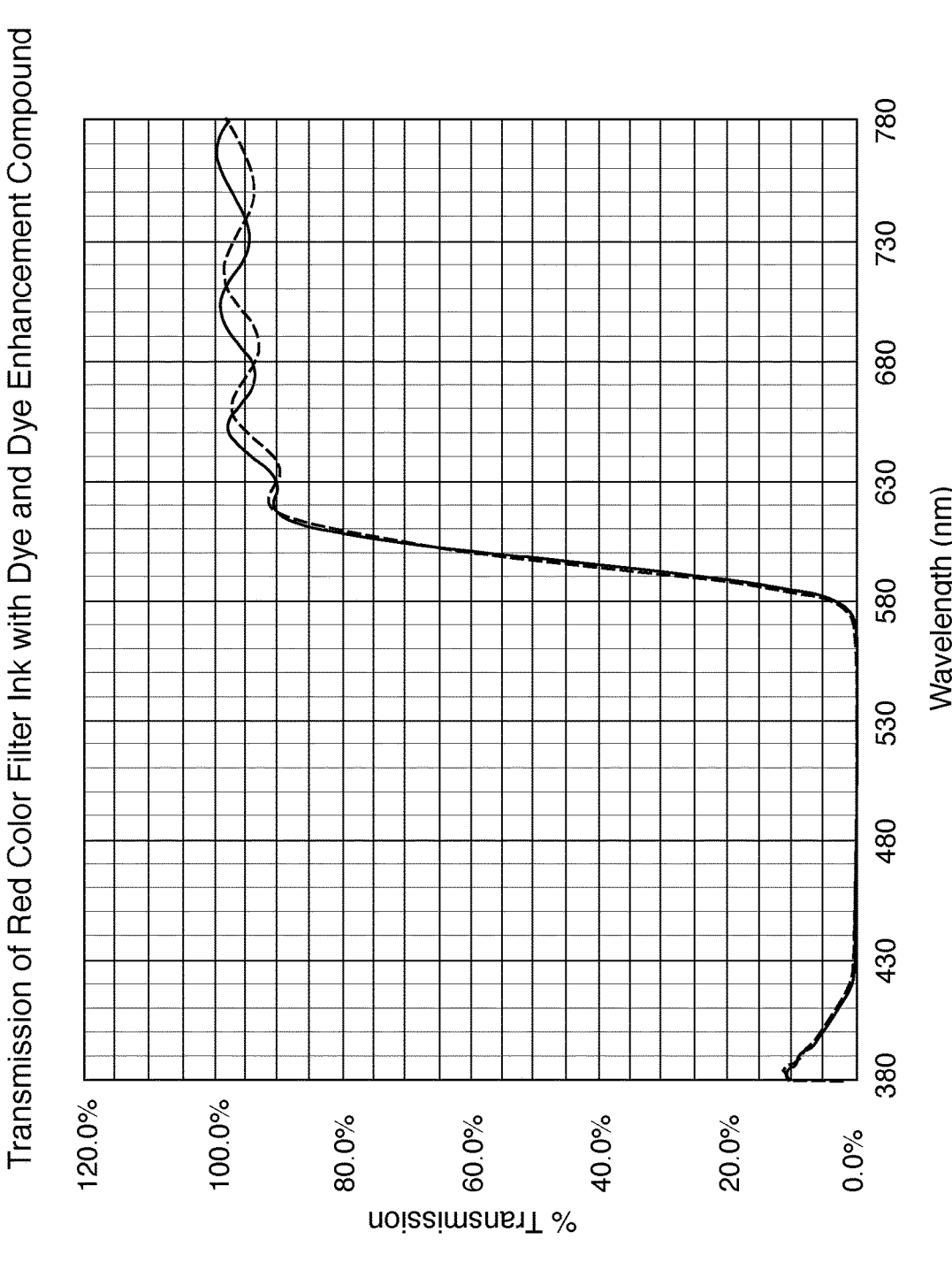
FIG. 54 is a non-limiting graphical illustration of transmission values across a wavelength spectrum from a device containing red color filter ink, dye, and a dye enhancement compound from before and after being heat stressed.

While FIGS. 45-50 illustrate the absorption effectiveness of dyes combined with dye enhancement compounds even after heat stress, FIGS. 52 and 54 illustrate the absorption effectiveness of dyes and combined with dye enhancement compounds when they are added to color filter inks. Specifically, as illustrated in FIG. 51, the transmission of light through blue color filter ink is minimally affected after heat stress. However, blue color filter ink allows for high transmission of blue wavelengths between 400-500 nm. Therefore, as described further herein, blue dye can be added to the blue subpixels of the color filter to absorb harmful blue wavelengths. As illustrated in FIG. 52, when blue dye and dye enhancement compound(s) are added to the color filter ink in the blue subpixel, there is a significant increase in absorption of blue wavelengths between 410 nm and 460 nm. Further, after heat stress, the absorption properties of the dye are minimally affected such that there remains a similar amount of absorption in the 410-460 nm range (for example, within 5%).

Figure 53:
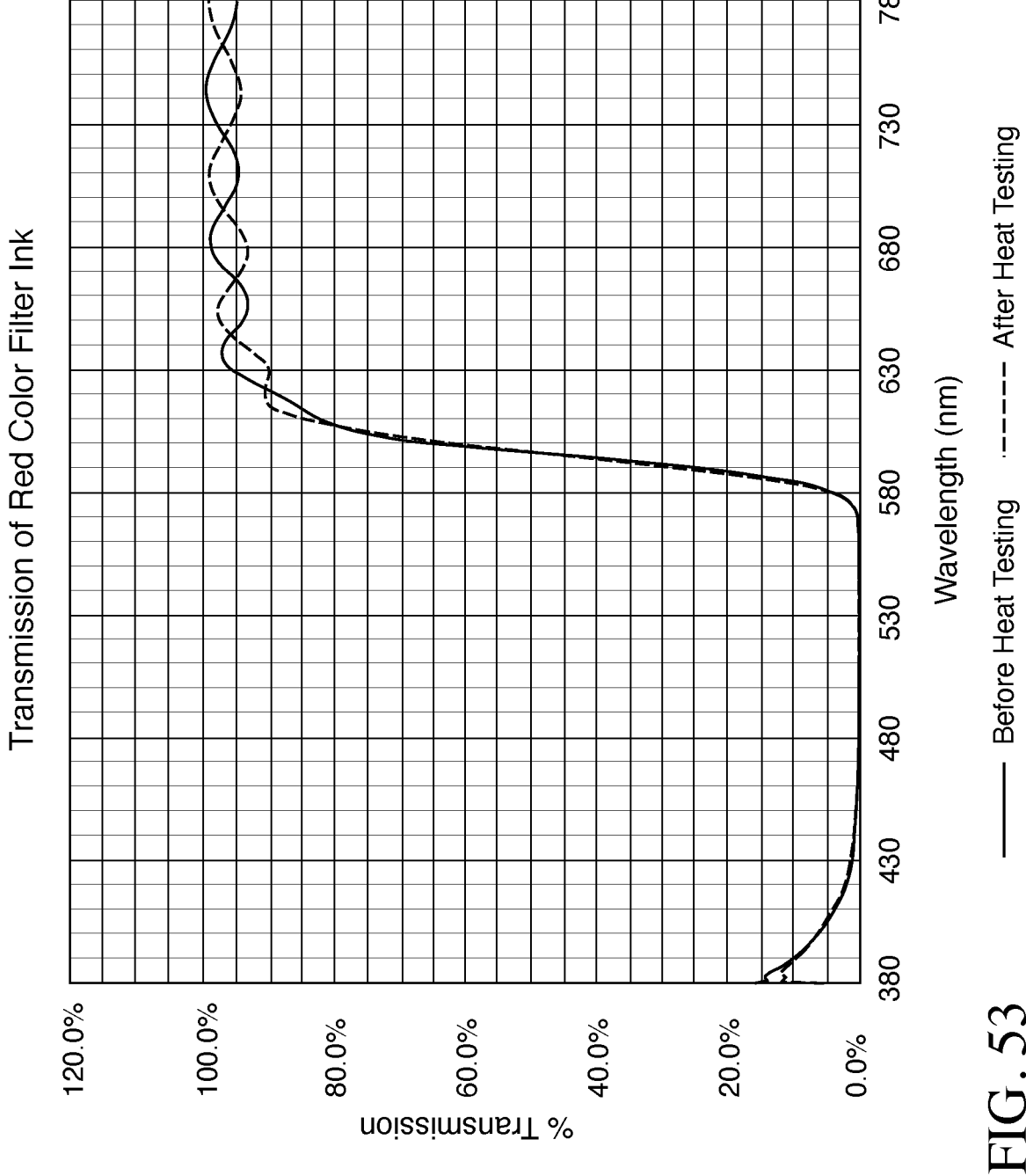
FIG. 53 is a non-limiting graphical illustration of transmission values across a wavelength spectrum from a device containing red color filter ink from before and after being heat stressed.

Similarly, as illustrated in FIG. 53, the transmission of light through red color filter ink is minimally affected in the blue wavelength range after heat stress. As further illustrated in FIG. 53, there remains transmission of some blue light through red color filter ink in the 380-460 nm wavelength range. Therefore, as described further herein, blue dye can be added to the red subpixels of the color filter to absorb blue wavelengths and reduce leakage of blue wavelengths into the red subpixels, which increases color sharpening of the colors emitted by the display. As such, it is desirable to absorb lower spectrum wavelengths in red subpixels. As illustrated in FIG. 54, when blue dye and dye enhancement compound(s) are added to the color filter ink in the red subpixel, there is an increase in absorption of blue wavelengths between 400 nm and 470 nm such that very little light (for example, less than 2%) between 420 and 470 nm is transmitted. Further, after heat stress, the absorption properties of the dye are minimally affected such that there remains a similar amount of absorption in the 420-470 nm range (for example, within 1%).

Additionally, the light that is transmitted from the display when it incorporates the disclosed color filter with dyes 426*a-c*, secondary dyes 430, 428, 432, and/or dye enhancement compounds 434*a-c* can minimally change position on a color gamut chart such that the X- and Y-coordinates/values may only move up to 0.75% along the X-axis and up to 0.75% along the Y-axis. In some cases, the movement along either or both axes is no more than 0.6%.

For example, in one embodiment of a blue subpixel 418*c* having blue ink 422*c*, incorporation of the dye enhancement compound(s) 434*c* along with a dye 426*c* and/or secondary dye 430 results in the subpixel being able to resist movement along the Y-axis of a color gamut chart after heat treatment, such that the transmitted light may move along the Y-axis no more than 0.1 to 0.5% (for example, between 0.2 and 0.3%). Additionally, the $\Delta E_{ab}$ may be between 2 and 3 (for example, between 2.2 and 2.4 or, more specifically, 2.3). In one embodiment, the dye and dye enhancement compound restrict movement in a color gamut chart such that the $\Delta x$ is 0.0002, the $\Delta y$ is 0.0030, the $\Delta Y$, % is 0.219%, and the $\Delta E_{ab}$ is 2.2986.

Similarly, in one embodiment of a red subpixel 418*a* having red ink 422*a*, incorporation of the dye enhancement compound(s) 434*a* along with a dye 426*a* and/or secondary dye 432 results in the subpixel being able to resist movement along the Y-axis of a color gamut chart after heat treatment, such that the transmitted light may move along the Y-axis no more than 0.3 to 0.8% (for example, between 0.45 and 0.55%). Additionally, the $\Delta E_{ab}$ may be between 0.5 and 1.5 (for example, between 0.75 and 0.95 or, more specifically, 0.9). In one embodiment, the dye and dye enhancement compound restrict movement in a color gamut chart such that the $\Delta x$ is −0.0020, the $\Delta y$ is 0.0008, the $\Delta Y$, % is 0.504%, and the $\Delta E_{ab}$ is 0.8637.

Figure 55:
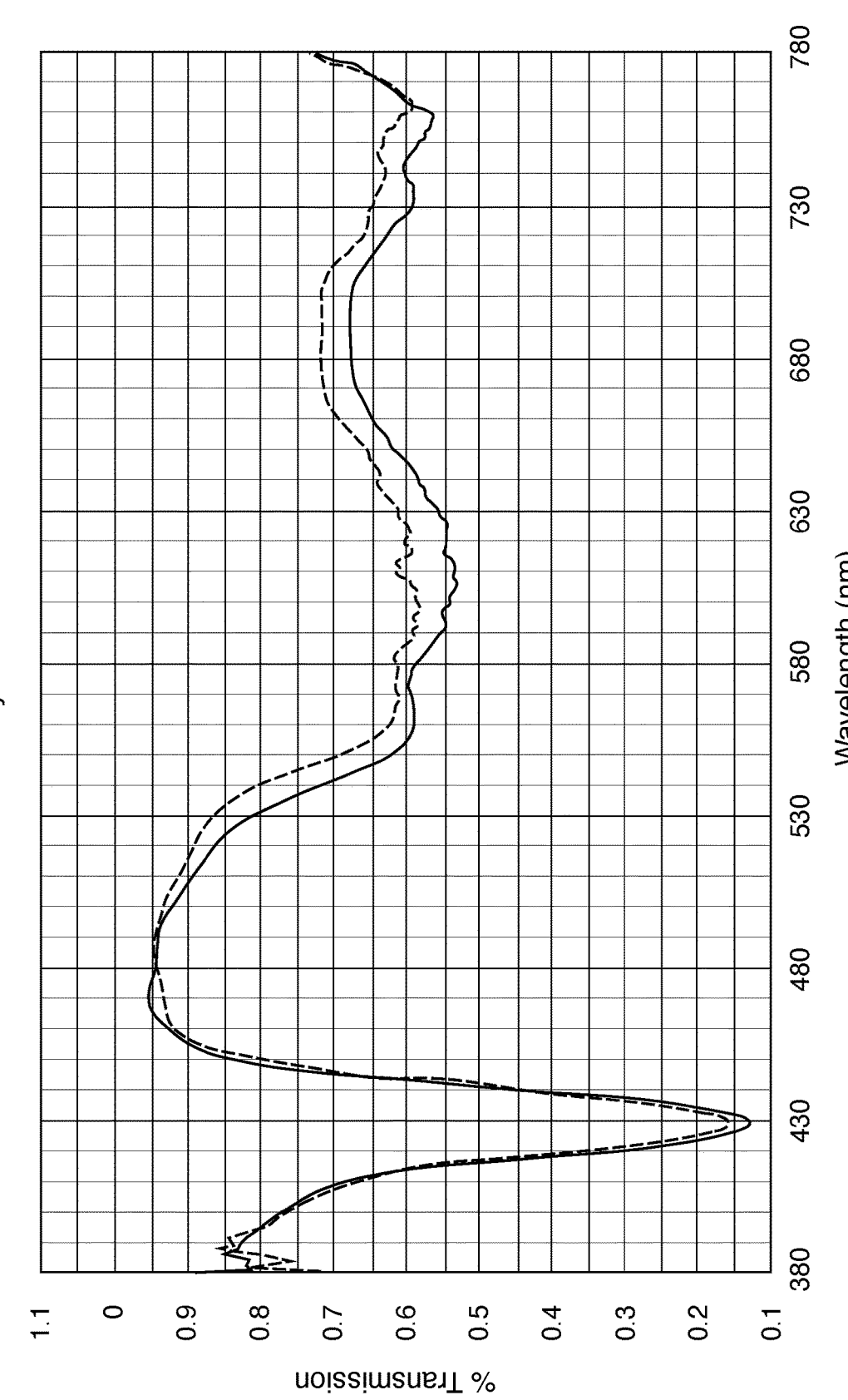
FIG. 55 is a non-limiting graphical illustration of transmission values across a wavelength spectrum due to the presence of dye in blue color filter ink from before and after being heat stressed.
Figure 56:
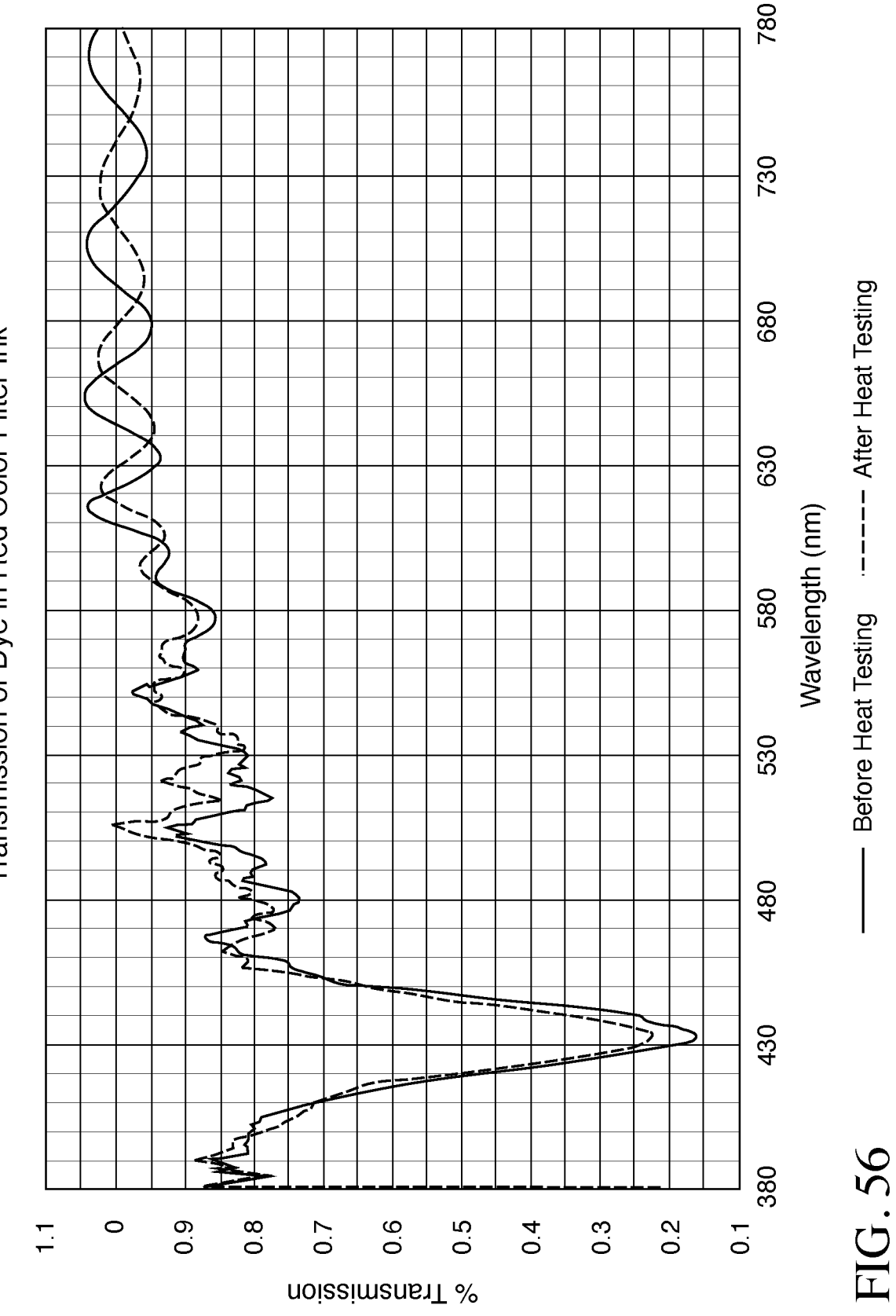
FIG. 56 is a non-limiting graphical illustration of transmission values across a wavelength spectrum due to the presence of dye in red color filter ink from before and after being heat stressed.

FIGS. 55-56 illustrate example transmission measurements when the impact of the dye on absorption is isolated from the presence of the color filter ink and dye enhancement compound(s). Therefore, FIGS. 55-56 illustrate that the dye can perform as expected, and have negligible change, after being combined with dye enhancement compound(s) and color filter ink and being exposed to heat stress. Specifically, the ability of the dye to absorb light between 400 nm and 460 nm while in blue color filter ink remains minimally changed (for example, less than 5% at peak absorption wavelengths) before and after heat testing. Similarly, the ability of the dye to absorb light between 400 nm and 460 nm while in red color filter ink remains minimally changed (for example, less than 10% at peak absorption wavelengths) before and after heat testing.

These dye enhancement compounds can be present in any subpixel that contains a light absorbing dye. For example, as illustrated in FIG. 42, each of the red, green, and blue subpixels 418*a-c* are illustrated with a pigment 422*a-c*, an absorbing dye 426*a-c*, and a dye enhancement compound 434*a-c*. It should be noted that the dye enhancement compound 434*a-c* can be one or more compounds even though it may appear in the illustrations as a single compound.

Figure 43A:
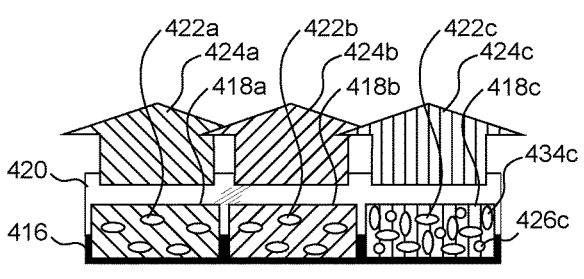
FIG. 43*a* is a schematic cross-sectional partial view of a display system of the current disclosure illustrating the additional presence of a dye and dye enhancement compound(s) in one of the subpixel color sets.
Figure 44A:
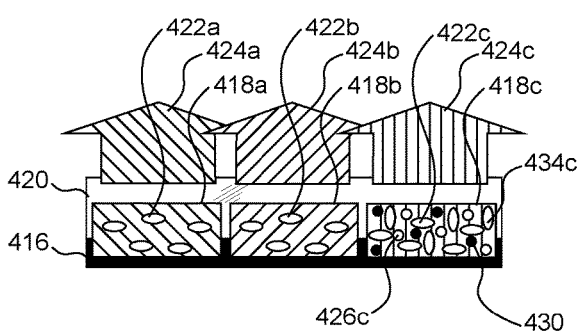
FIG. 44*a* is a schematic cross-sectional partial view of a display system of the current disclosure illustrating the additional presence of a primary dye, a secondary dye, and dye enhancement compound(s) in one of the subpixel color sets.
Figure 43B:
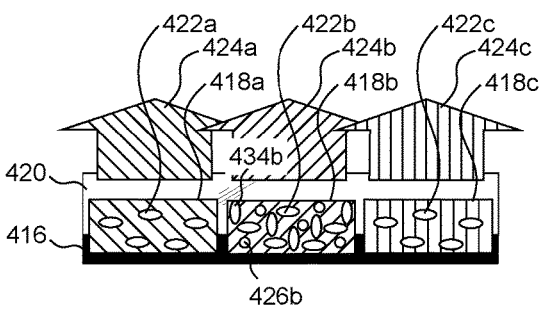
FIG. 43*b* is a schematic cross-sectional partial view of a display system of the current disclosure illustrating the additional presence of a dye and dye enhancement compound(s) in one of the subpixel color sets.
Figure 44B:
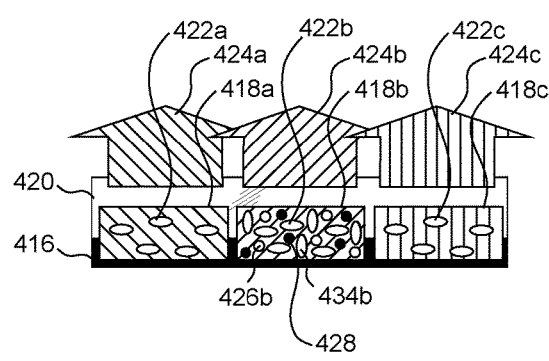
FIG. 44*b* is a schematic cross-sectional partial view of a display system of the current disclosure illustrating the additional presence of a primary dye, a secondary dye, and dye enhancement compound(s) in one of the subpixel color sets.
Figure 43C:
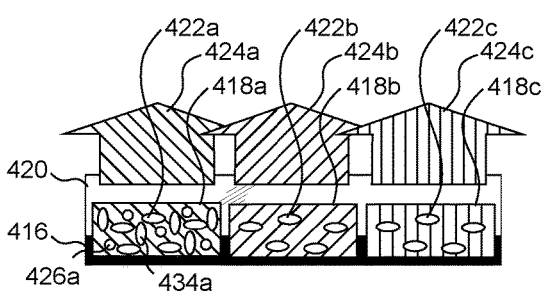
FIG. 43*c* is a schematic cross-sectional partial view of a display system of the current disclosure illustrating the additional presence of a dye and dye enhancement compound(s) in one of the subpixel color sets.
Figure 44C:
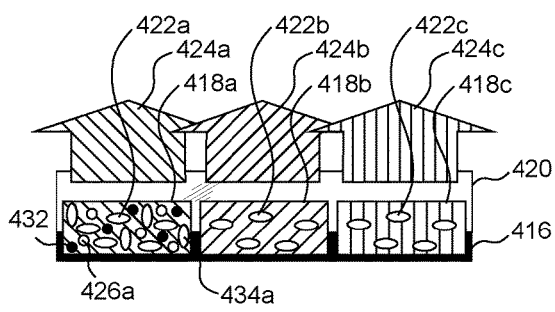
FIG. 44*c* is a schematic cross-sectional partial view of a display system of the current disclosure illustrating the additional presence of a primary dye, a secondary dye, and dye enhancement compound(s) in one of the subpixel color sets.

FIGS. 43*a-c* illustrate example embodiments where only one of the subpixel color sets (blue subpixels 418*c* in FIG. 43*a*; green subpixels 418*b* in FIG. 43*b*, and red subpixels 418*a* in FIG. 43*c*) has a corresponding absorbing dye 426*a-c* and, therefore, the dye enhancement compound 434*a-c* for that corresponding subpixel color set is the only dye enhancement compound (or combination of compounds) present in the color filter. In embodiments where two or more dyes are included in a blue, green, or red subpixel, as illustrated in FIGS. 44a-c, a dye enhancement compound (or a combination of compounds) 434a-c can also be included. While the examples illustrated in FIGS. 43-44 only show embodiments having one subpixel with dye(s) and dye enhancement compound(s), it is anticipated that some embodiments of the disclosed color filter may have multiple subpixel color sets with dye(s), in which case the dye enhancement compound(s) may be present in the one or more of the subpixel color sets in which dye(s) are located. More specifically, the embodiments illustrated in FIGS. 43a-c and 44a-c, as well as FIGS. 28-30 and 35-37, can be "mix and matched" with each other.

For example, an embodiment can incorporate the dyes and compounds illustrated in FIGS. 44a and 44b such that one or more dyes 426b-c, 430, 428 in the blue subpixels 418c and green subpixels 418b may have corresponding dye enhancement compounds 434c,b in one or both of the blue and green subpixels, and the dye enhancement compounds may be comprised of one or more different types of dye enhancement compounds. Similarly, an embodiment with dye(s) 426c,a, 430, 432 in the blue subpixels 418c and red subpixels 418a (or dye(s) 426b,a, 428, 432 in the green subpixels 418b and red subpixels 418a) may have dye enhancement compounds 434a,c in one or both of the blue and red (or dye enhancement compounds 434b, a in one or both of the green and red) subpixels, and the dye enhancement compounds may be comprised of one or more different types of dye enhancement compounds. This would effectively be a combination of FIGS. 44a with 44c (blue subpixels 418c and red subpixels 418a having dyes 426c, a and compounds 434c,a) and FIGS. 44b with 44c (green subpixels 418b and red subpixels 418a having dyes 426b,a and compounds 434b,a). In another example, one embodiment of a color filter may have blue subpixels 418c with a single dye 426c and a dye enhancement compound 434c (FIG. 43a), and a green subpixel 418b with two dyes 426b, 428 and no enhancement compounds (FIG. 36).

Additional combinations of all of FIGS. 28-30, 35-37, 43a-c, and 44a-c are envisioned for the disclosed color filter. Therefore, the embodiment of FIG. 28 can be combined with any of the embodiments in FIGS. 29-30, 36-37, 43b-c, and 44b-c; the embodiment of FIG. 29 can be combined with any of the embodiments in FIGS. 28, 30, 35, 37, 43a, 43c, 44a, and 44a; the embodiment of FIG. 30 can be combined with any of the embodiments in FIGS. 28-29, 35-36, 43a-b, and 44a-b; the embodiment of FIG. 35 can be combined with any of the embodiments in FIGS. 29-30, 36-37, 43b-c, and 44b-c; the embodiment of FIG. 36 can be combined with any of the embodiments in FIGS. 28, 30, 35, 37, 43a, 43c, 44a, and 44a; the embodiment of FIG. 37 can be combined with any of the embodiments in FIGS. 28-29, 35-36, 43a-b, and 44a-b; the embodiment of FIG. 43a can be combined with any of the embodiments in FIGS. 29-30, 36-37, 43b-c, and 44b-c; the embodiment of FIG. 43b can be combined with any of the embodiments in FIGS. 28, 30, 35, 37, 43a, 43c, 44a, and 44a; the embodiment of FIG. 43c can be combined with any of the embodiments in FIGS. 28-29, 35-36, 43a-b, and 44a-b; the embodiment of FIG. 44a can be combined with any of the embodiments in FIGS. 29-30, 36-37, 43b-c, and 44b-c; the embodiment of FIG. 44b can be combined with any of the embodiments in FIGS. 28, 30, 35, 37, 43a, 43c, 44a, and 44a; and the embodiment of FIG. 44c can be combined with any of the embodiments in FIGS. 28-29, 35-36, 43a-b, and 44a-b.

In some embodiments, a second polarizer layer (or more) 114 may be present. The polarizer layer 114 lets light, received after the color filter, of a specific polarization pass through while blocking light waves of other polarizations. In other words, it reduces the glare and may help to form the image as seen by the user of the computing device. Next to or adjacent to the polarizer layer, in some embodiments, a layer of glass or a glass cover 116 may be present. This layer protects the layers of the display as well as further controls glare and light transmission. In some embodiments, the multi-stack display configuration may not only improve the color of the display, but also reduce glare. The different layers may control the lights transmission and emission when the emitted light passes through the different stack layers. Thus, modification of color filter 112 may improve user experience and wellness by reducing the toxic blue light and improving display color quality.

In other embodiments, the light-emitting diode array (not shown) may be arranged in a strip as a light source and can be arranged so that light can enter backlight unit 102 through one edge of light-guide plates. Alternatively, a light-emitting diode array can be located below light-guide plate. Light-guide plate can have reflector (not shown) adjacent to it on one or more sides in order to direct the light from light-emitting diode array upward and through backlight unit 102. Light-guide plate can be placed between the reflector and the diffuser. The impact of this type of construction redirects light from the light source at the edge of a display screen so that it spreads uniformly across the display surface.

In embodiments where a diffuser is present (not shown), the diffuser can evenly distribute light and eliminate bright spots. Diffusers can come in types, for example, such as holographic, white diffusing glass, and ground glass. Diffusers can be semi-opaque and can reflect light in many different directions. Brightness enhancing layer or layers (not shown) may also be present and may be prismatic brightness enhancing films. Adjacent the backlight unit 102 (the top of which may be first or second brightness enhancing layer) may be a first polarizer filter 106 (polarizer filter 114 may also be present in the display stack) that lets light of a specific polarization pass through while blocking light waves of other polarizations. In some embodiments, polarizer filters can help reduce reflections and glare by filtering out light that has become polarized due to reflection from non-metallic surfaces. The goal of backlight unit 102 is to distribute light uniformly across the two-dimensional plane of light-guide plate, thus providing light to display images across the entirety of the display.

As mentioned above, the illustration of FIG. 1 is a schematic exploded view of an embodiment of an example display system 100 with which display systems of the present disclosure may be beneficially employed. Display system 100 may be used, for example, in a liquid crystal display (LCD) monitor, LCD-TV, handheld, tablet, laptop, headsets, VR/XR/AR display equipment, or other computing device. Display system 100 of FIG. 1 is merely exemplary, however, and the systems of the present disclosure are not limited to use with systems like or similar to system 100. The systems of the present disclosure may be beneficially employed in other varieties of displays systems that do not necessarily include liquid crystal display technology.

In this disclosure, several examples of dyes (see Table 1), absorbing in the blue, red, and green range, can be used to modify color filter 112. Modification of the blue, red, and green emission can be a more precise way to filter toxic blue light while ensuring a minimal loss in luminance and an improvement in the resulting color gamut.

As described further herein, blue, green and red dyes may be applied at the level of the color filter or the backlight unit (BLU). When applied to the color filter, dyes may be limited to their corresponding subpixel. More specifically, the color filter is comprised of blue, green and red subpixels, and the dyes may be correspondingly applied. Therefore, a blue dye may be applied to a blue subpixel, a green dye may be applied to a green subpixel, and a red dye may be applied to a red subpixel. There may be many combinations of applications. For example, blue and green dyes may be applied to their corresponding subpixels, blue and red dyes may be applied to their corresponding subpixels, green and red dyes may be applied to their corresponding subpixels, or all three

24

As illustrated in Table 2, the application of selective dyes and/or dye formulations on the color filter or on the backlight unit of the disclosed display panel can vary the data related to spectral emission, luminance, blue toxic ratio, blue light toxicity factor, and coverage of standard color gamut systems such as Adobe RGB, DCI-P3, sRGB, BT.2020 and NTSC. Table 2 is one embodiment of one type of display monitor measured. Many different types of monitors are available, and the values measured depending on the measured of the display light.

TABLE 2

Dye modification in the blue range on color filters and backlight unit

| Test ID | Dye | # | Dye absorption peak, nm | Toxicity Factor | Toxicity Factor Change % | Toxicity Blue Ratio % | Toxicity Blue Ratio Change % | Luminance | Luminance Δ % | Adobe RGB Coverage -% |
|---|---|---|---|---|---|---|---|---|---|---|
| Display | N/A | | N/A | 0.0899 | 0.0% | 61.5% | 0.0% | 277.8 | 0.0% | 78.89% |
| CF | 252HE | 1 | 427, 551 | 0.0789 | -12.2% | 57.4% | -6.7% | 277.1 | -0.3% | 79.47% |
| BLU | 252HE | 1 | 427, 551 | 0.0810 | -9.8% | 57.3% | -6.8% | 268.2 | -3.5% | 79.47% |
| CF | 250ES | 2 | 431, 553 | 0.0716 | -20.3% | 55.9% | -9.2% | 276.2 | -0.6% | 79.73% |
| BLU | 250ES | 2 | 431, 553 | 0.0737 | -17.9% | 55.9% | -9.2% | 265.0 | -4.6% | 80.32% |
| CF | 250ES + ABS526N | 2 + 3 | 431, 553 + 422, 526 | 0.0526 | -41.4% | 49.3% | -19.9% | 270.3 | -2.7% | 79.80% |
| BLU | 250ES + ABS526N | | 431, 553 + 422, 526 | 0.0709 | -21.1% | 50.1% | -18.6% | 188.1 | -32.3% | 69.74% |
| CF | 252HR + ABS526N | 1 + 3 | 427, 551 + 422, 526 | 0.0546 | -39.3% | 49.2% | -20.1% | 270.4 | -2.7% | 79.74% |
| BLU | 252HE + ABS526N | | 427, 551 + 422, 526 | 0.0764 | -15.2% | 49.9% | -19.0% | 181.7 | -34.6% | 68.41% |

| Test ID | Adobe RGB Coverage Change % | DCI-P3 Coverage -% | DCI-P3 Change % | sRGB Coverage -% | sRGB Change % | BT.2020 Coverage -% | BT.2020 Change % | NTSC Coverage -% | NTSC Change % |
|---|---|---|---|---|---|---|---|---|---|
| Display | — | 82.79% | — | 99.87% | — | 59.99% | — | 73.96% | — |
| CF | 0.58% | 83.10% | 0.31% | 100.00% | 0.13% | 59.81% | -0.18% | 74.48% | 0.52% |
| BLU | 0.58% | 83.32% | 0.53% | 100.00% | 0.12% | 59.97% | -0.02% | 74.66% | 0.70% |
| CF | 0.84% | 82.96% | 0.17% | 100.00% | 0.13% | 59.53% | -0.46% | 74.71% | 0.75% |
| BLU | 1.43% | 84.15% | 1.36% | 100.00% | 0.13% | 60.39% | 0.39% | 75.65% | 1.70% |
| CF | 0.91% | 83.41% | 0.61% | 100.00% | 0.13% | 60.04% | 0.04% | 74.77% | 0.81% |
| BLU | -9.16% | 74.59% | -8.20% | 90.94% | -8.94% | 53.78% | -6.21% | 65.73% | -8.23% |
| CF | 0.85% | 83.46% | 0.66% | 100.00% | 0.13% | 60.19% | 0.20% | 74.71% | 0.75% |
| BLU | -10.48% | 73.10% | -9.69% | 89.69% | -10.18% | 52.84% | -7.15% | 64.33% | -9.63% | dyes may be applied to their corresponding subpixels. Application of dyes to subpixels, and the combinations mentioned above, can help to decrease the toxic blue light emitted from the display device and may also help to improve luminance and color gamut.

TABLE 1

Dyes and the associated maximum absorption wavelengths (nm)

| Example of dyes | Dye Name | Absorbing wavelengths (nm) |
|---|---|---|
| 1 | 252HE | 427, 551 |
| 2 | 250ES | 431, 553 |
| 3 | ABS526N | 422, 526 |
| 4 | P491 | 491 |
| 5 | 185HE | 584 |
| 6 | 181HE | 594 |

In a first example, dyes selected may absorb in the toxic blue range, with a maximum absorption centered at about 430 nm (see Table 2, where absorption peaks fall between 420 and 435) but may also present a second absorption peak (see Table 2, where a second peak falls between 525 and 560) in a second color range (for example, green or red). In some cases, a single dye may be applied to a color filter or backlight unit, whereas in other cases, two or more dyes may be combined or applied together to a color filter or backlight unit to increase absorption of toxic blue light and decrease the blue light toxicity ratio. The application of these dyes on a color filter can allow for up to an approximately 20% reduction of the blue light toxicity factor, an improvement compared to the same modification within the backlight unit.

As shown in Table 2, there is a more significant decrease in blue light toxicity with the modification at the level of the color filter ("CF") than at the level of the backlight unit (BLU). Additionally, the luminance loss of the display is less marked with the modified color filter than with the modified BLU and, overall, the color gamut is improved with the changes brought by the dyes on the color filter as evidenced by the measurements in each of the standard color gamut systems included in Table 2. More specifically, the percent coverage in the color gamut are generally increased (i.e., have a positive change percentage) when the disclosed dyes are applied to a color filter.

In some embodiments, light-conversion materials (filters) placed in various locations in the backlight unit have been shown to have up to a ten to twelve times amplification of absorption which greatly increases the efficiency of selective light conversion material or light absorbing material that can, for example, filter out blue or toxic blue light.

Figure 2:
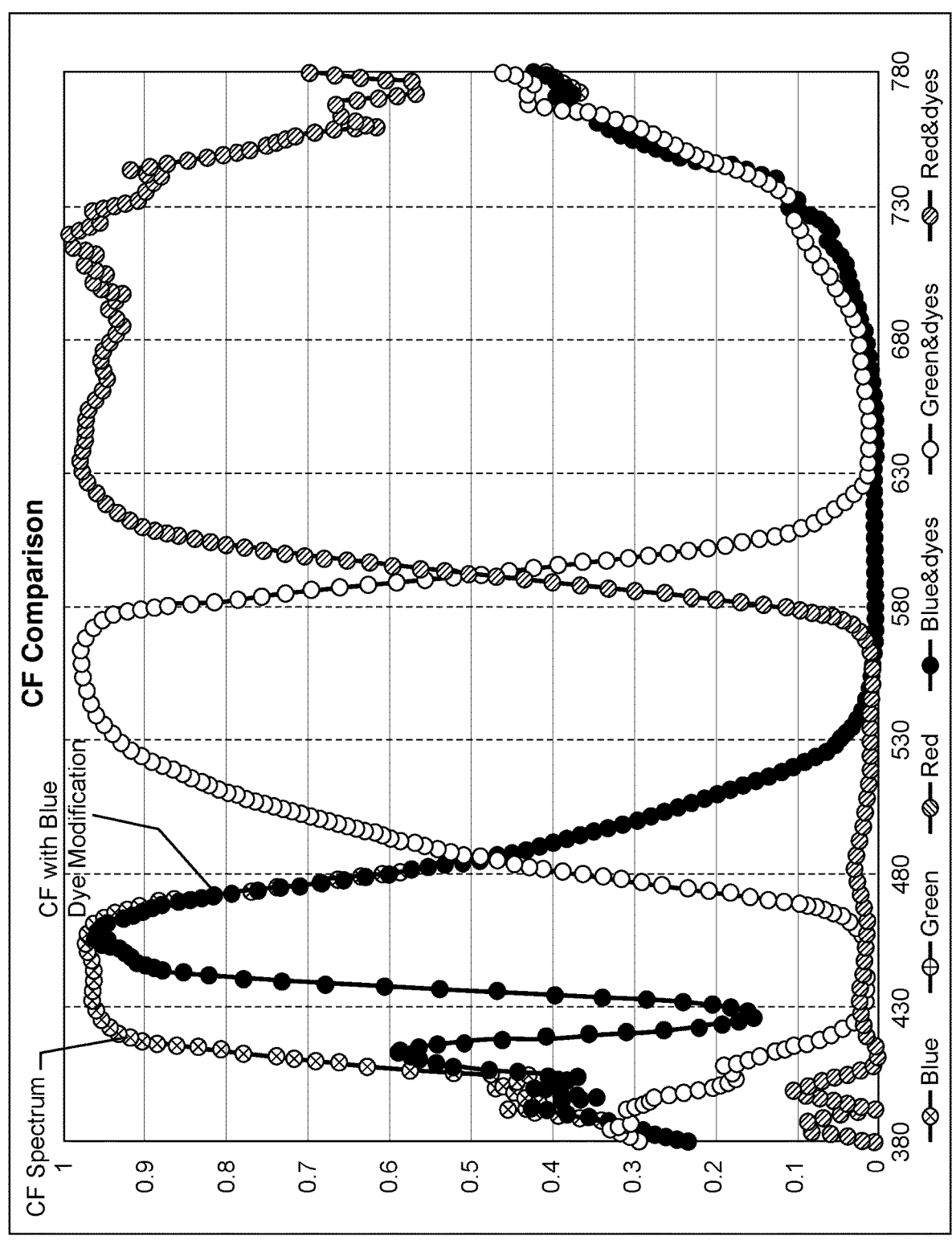
FIG. 2 is a non-limiting illustration of a possible transmittance spectra of the color filter with blue dye modification.

In FIG. 2, the graph may relate to a transmittance spectra of the color filter with blue dye modification. In FIG. 2, the blue spectrum prior to dye modification is represented as a dot with an "X" through it, and the curve made of solid black dots represents the blue spectrum from the color filter with blue dye modification. The graph shows that the blue dye modification reduces the wave height, representing transmission, absorbing the toxic blue light, as seen around wavelength 430 nm. Effectiveness of dye ranges varies based on display type and the amount of dye, as well as dye combination(s) if there are any. In the embodiment of FIG. 2, the blue subpixels may transmit in range 350-530 nm, with possibly more than one peak within this range. Green subpixels may transmit in range 460-630, with possibly more than one peak within this range. Red subpixels may transmit in range 570 nm and higher, with possibly more than one peak within this range. This can create an opportunity to amplify the impact of a selective light conversion material or light absorbing material that filters out blue or toxic blue light or any other film or layer that can modify the spectrum. These selective light-conversion materials or light absorbing materials can be included as a separate film or can be coated onto or added within any of the layers that make up the disclosed backlight unit.

FIG. 2 shows three effective transmission curves of three different subpixels of a color filter. In FIG. 2, one curve is an absorption curve of the blue dye added to a blue subpixel in the color filter of FIG. 1. A second absorption curve is a measurement of the transmission of green subpixels of the same color filter. The third absorption curve is the transmission of red subpixels of the same color filter. All three curves have peaks that lie adjacent to one another, showing light absorption of the backlight unit for all three subpixels, but in different ranges associated with the wavelengths of a certain color of light.

In some embodiments, as illustrated in FIG. 2, the addition of blue dye to a color filter can shift aspects of the transmittance spectra of the display. More specifically, FIG. 2 shows that the additive blue dye, when applied to a color filter (for example, at the level of the blue subpixels), can cause a decrease in light emitted in the toxic blue range around 430 nm (+/−30 nm). The transmittance graph may be representative of the total impact of the color filter on the light with blue dye and without blue dye. The blue dye curve between 428-500 nm shows the blue light impact on radiance may be less than the shape of the original curve without the blue dye. More specifically, with dye modification at the color filter level (the line labeled "Blue&dyes"), the resulting blue peak emission (from the measured white light emission of the display after the dye modification) may be narrower and shifted towards a longer blue wavelength than it is for the original display's blue peak emission (from the measured white light emission of the display before the dye modification) (the line labeled "Blue").

Figure 3:
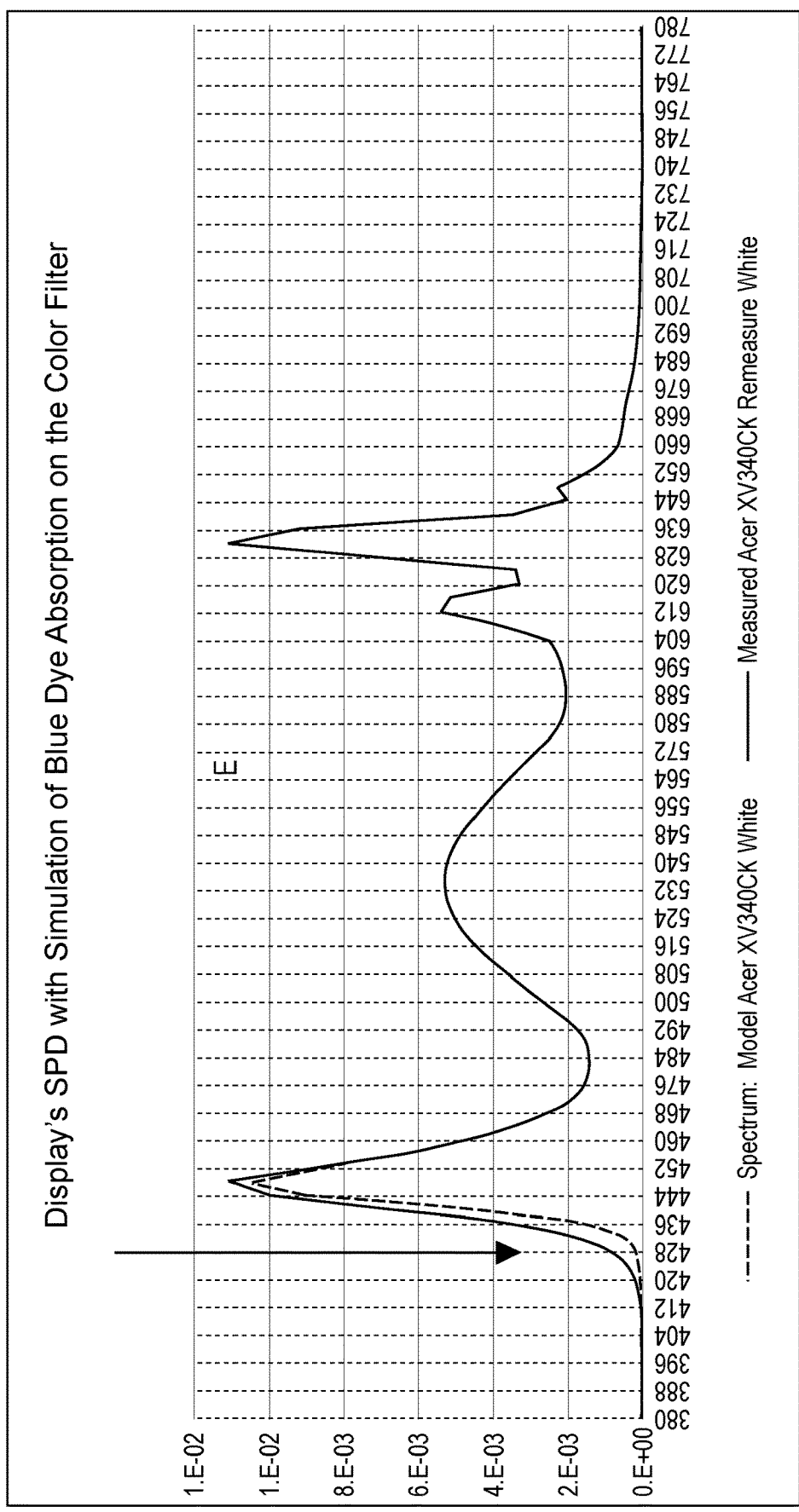
FIG. 3 is a non-limiting illustration of a display's spectral power distribution with simulation of blue dye absorption on the color filter.

FIG. 3 further illustrates the spectrum of light and the measured values (the spectral power distribution ("SPD"))

when blue dye is added to a color filter. The light of the display can be measured with a radiometer and the measured values of intensity are noted on the Y-axis. In FIG. 3, the wavelength of light from the display is noted on the X-axis. In some cases, the type of display may impact the resulting X-axis and Y-axis values. When blue dye is applied at the level of the color filter, there can be a blue light peak between 380-500 nm, a green light peak between 500-600 nm, a red light peak between 600-660 nm, and combinations thereof. The graph in FIG. 3 illustrates one embodiment of the unique spectrum with blue dye(s) added in the color filter of the display system.

FIG. 3 illustrates a display's spectral power distribution ("SPD") from a display having blue dye modification on the color filter. More specifically, FIG. 3 shows the effective transmittance of the light-conversion or absorbing material (blue-light filtering layer) across the visible spectrum as a function of where the light conversion material or light absorbing material is placed within the display (in this case, the color filter). The effective transmittance is calculated by dividing the emission from the display with the light conversion material or light absorbing material by the emission of the display without the light conversion material or light absorbing material. The different spectra shown in FIG. 3 illustrate the impact of the light conversion or light absorbing material layer when placed at different locations (positions) in the display-outside of and within the color filter. FIG. 3 may include the amplitude, associated with the absorption on the X-axis, and the wavelength values, as shown on the Y-axis.

Figure 4:
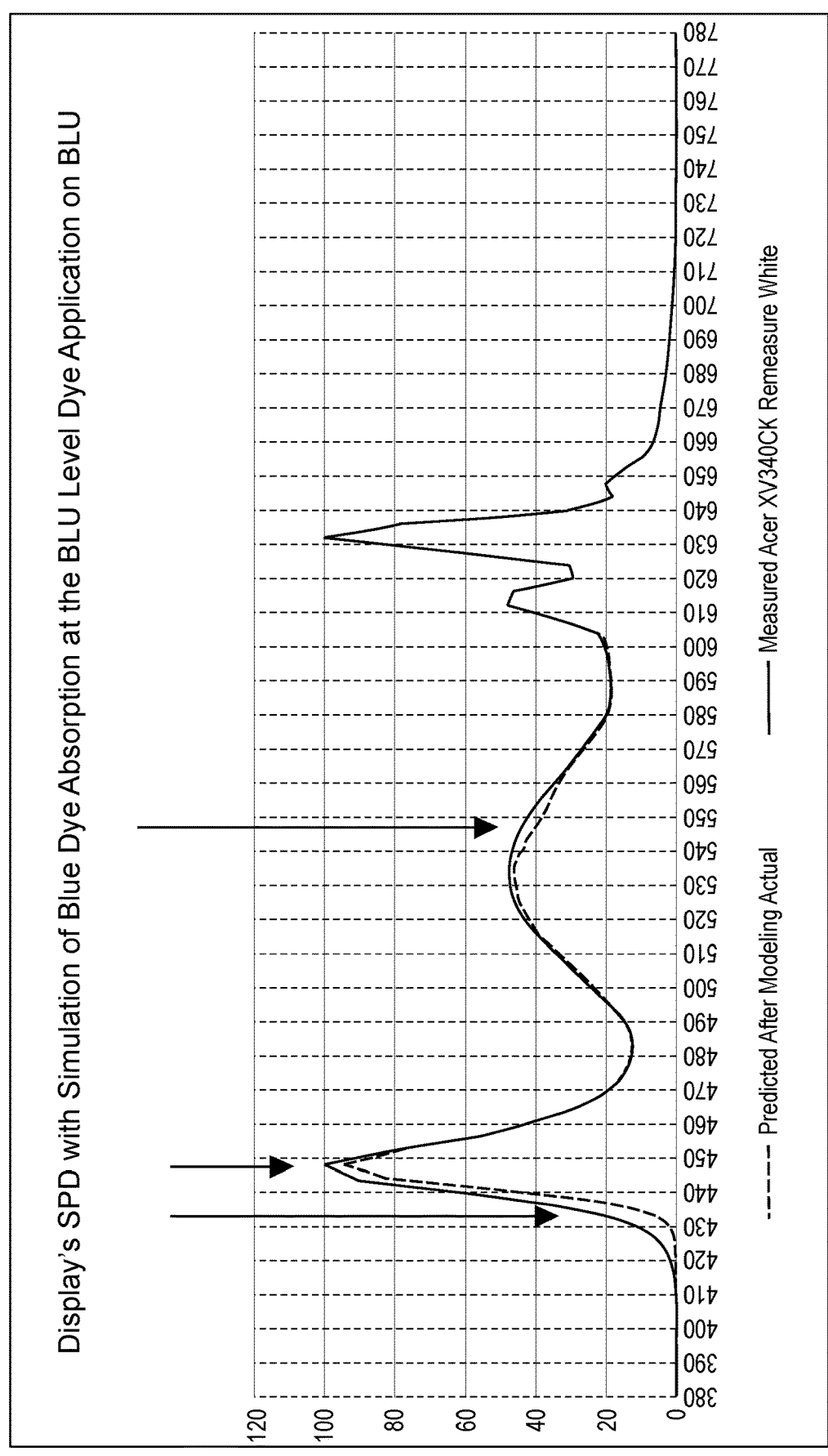
FIG. 4 is a non-limiting illustration of a display's spectral power distribution with simulation of blue dye absorption at the backlight unit level.

FIG. 4 illustrates a display's SPD from a display having blue dye modification at the BLU level. More specifically, FIG. 4 shows the effective transmittance of the light-conversion or absorbing material (blue-light filtering layer) across the visible spectrum as a function of where the light conversion material or light absorbing material is placed within the display (in this case, the BLU). The light of the display can be measured with a radiometer. The measured values of absorption can be noted on the Y-axis. In FIG. 4, the wavelength of light from the display is noted on the X-axis. In some cases, the type of display may impact the resulting X-axis and Y-axis values. When blue dye is applied at the level of the BLU, there can be a blue light peak between 430-470 nm, a green light peak between 490-580 nm, a red light peak between 600-660 nm, and combinations thereof. The graph in FIG. 4 illustrates one embodiment of the unique spectrum with blue dye(s) added in the BLU of the display system.

In some embodiments, the dye applied at the color filter level (or, in some cases, to the backlight unit) can have at least two absorption peaks, a primary absorption peak in the blue light range and a secondary absorption peak that can be above 500 nm. Due to this secondary absorption peak being above 500 nm, there can be a reduction of the leakage of green light (i.e., longer wavelength light) into the blue subpixel, which may narrow the blue emission spectrum and move the blue color's Y-axis coordinate/value on the color gamut to lower values. The hazardous blue light from the main peak can be filtered off, increasing the Y-axis coordinate/value, and the blue emission peak can become narrower, which increases the saturation and advantageously moves the blue color's X-axis coordinate/value to the left. Other pigments or other absorbers with wavelengths greater than 495 nm (+/−15 nm) may be used to reduce leakage of longer wavelength light into the blue subpixel.

As mentioned above (and shown in Table 2), adding a second dye to the first dye on either the color filter or the BLU can bring more drastic differences in the decrease of blue light toxicity factor, difference in luminance loss, and difference in gamut coverage, therefore showing that the modification on the color filter is more improved for the overall performances of the display.

In another embodiment, (see below Table 3), dyes absorbing in the green range, between 490 nm and 610 nm, can be used to modify a color filter and/or BLU. The modification in the green range does not greatly affect the blue emission, however the modification may impact the luminance and color gamut. Table 3 is one embodiment of values measured for one type of display. There are many different types of monitors with varying values when measured.

value. Alternatively, or in addition, to dyes, other pigments or other absorbers with wavelengths longer than 590 nm can be used to reduce longer wavelength light leakage into the green subpixel.

Figure 5:
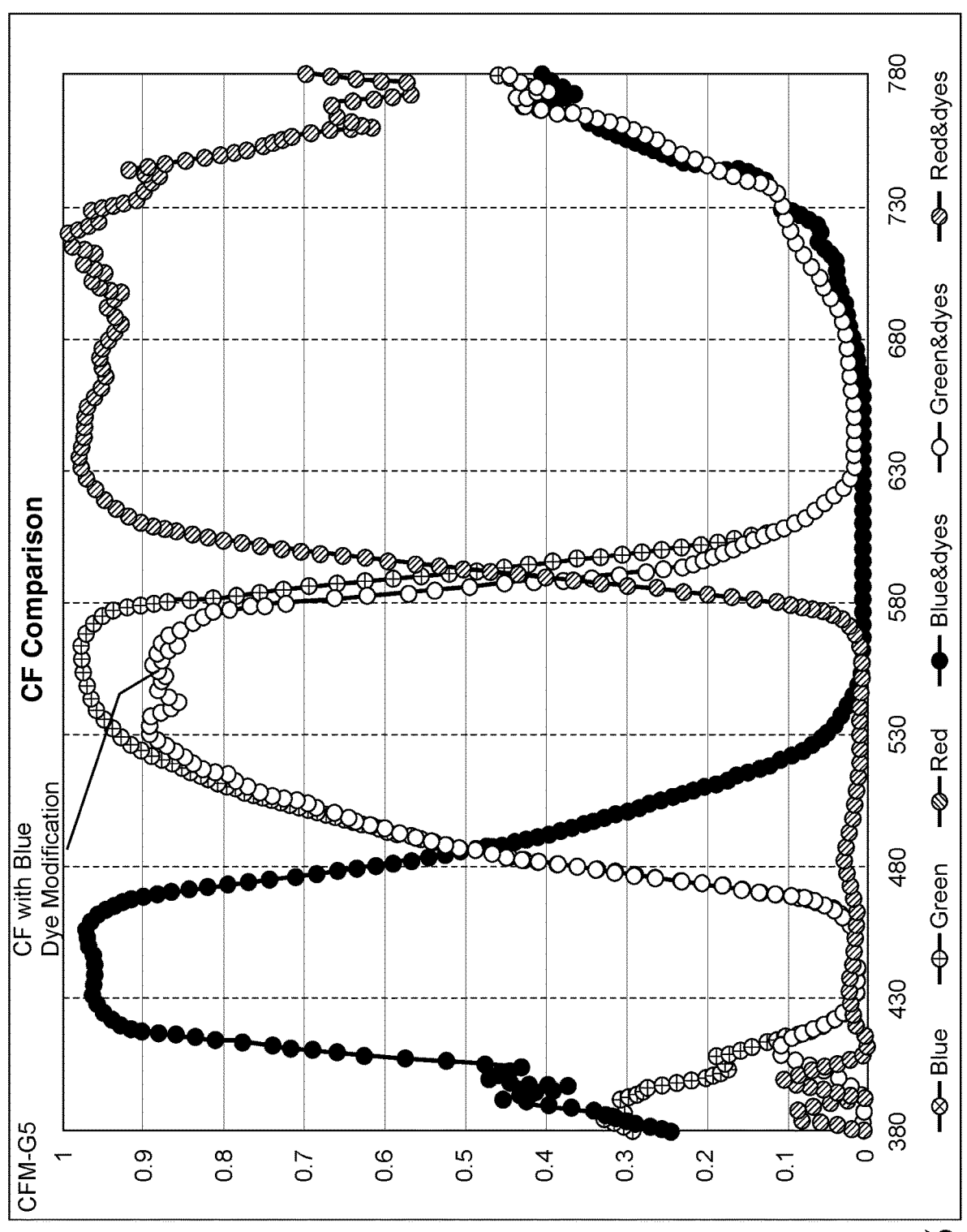
FIG. 5 is a non-limiting illustration of a possible transmittance spectra of the color filter with green dye modification.

In FIG. 5, the graph may relate to a transmittance spectra of the color filter with green dye modification. In FIG. 5, the green spectrum prior to dye modification is represented as a dot with a "crosshair" through it, and the curve made of white dots represents the green spectrum from the color filter with green dye modification. The graph shows that the green dye modification reduces the wave height. The green dye modification range can occur within 470-620 nm. Effectiveness of dye ranges varies based on display type and the

TABLE 3

| | | | Dye modification in the green range on color filters and backlight unit | | | | | | | |
|---|---|---|---|---|---|---|---|---|---|---|
| | Dye | | | Toxicity Factor | | Toxic Blue Ratio | | | | Adobe RGB |
| | | | absorption | | Change | | Change | Luminance | | Coverage |
| | Dye | # | peak, nm | % | - % | % | % | | Δ -% | - % |
| Display | N/A | | N/A | 0.0899 | — | 61.5% | — | 277.8 | — | 78.89% |
| CF | P491 | 4 | 491 | 0.0900 | 0.1% | 64.2% | 4.4% | 273.2 | −1.7% | 78.42% |
| BLU | P491 | 4 | 491 | 0.0847 | −5.7% | 69.1% | 12.3% | 269.3 | −3.1% | 77.84% |
| CF | 185HE | 5 | 584 | 0.0978 | 8.8% | 61.6% | 0.1% | 254.7 | −8.3% | 81.55% |
| BLU | 185HE | 5 | 584 | 0.0990 | 10.2% | 61.6% | 0.1% | 249.8 | −10.1% | 81.33% |
| CF | 181HE | 6 | 594 | 0.0966 | 7.5% | 61.6% | 0.2% | 257.8 | −7.2% | 81.33% |
| BLU | 181HE | 6 | 594 | 0.0975 | 8.5% | 61.4% | −0.2% | 249.3 | −10.3% | 81.04% |
| CF | Ideal 610 | 7 | 610 | 0.0919 | 2.3% | 61.5% | 0.0% | 271.5 | −2.3% | 82.08% |
| BLU | Ideal 610 | 7 | 610 | 0.0968 | 7.7% | 61.5% | 0.0% | 257.8 | −7.2% | 81.40% |

| | Adobe RGB Coverage | DCI-P3 Coverage | | sRGB Coverage | | BT.2020 Coverage | | NTSC Coverage | |
|---|---|---|---|---|---|---|---|---|---|
| | Change % | - % | Change % | - % | Change % | - % | Change % | - % | Change % |
| Display | — | 82.79% | — | 99.87% | — | 59.99% | — | 73.96% | — |
| CF | −0.47% | 83.43% | 0.64% | 99.80% | −0.07% | 60.44% | 0.45% | 74.56% | 0.61% |
| BLU | −1.05% | 83.20% | 0.41% | 99.35% | −0.52% | 60.59% | 0.60% | 74.25% | 0.30% |
| CF | 2.66% | 85.40% | 2.61% | 99.95% | 0.08% | 61.85% | 1.86% | 76.46% | 2.50% |
| BLU | 2.44% | 85.79% | 3.00% | 99.95% | 0.07% | 62.54% | 2.54% | 76.22% | 2.26% |
| CF | 2.44% | 85.19% | 2.40% | 99.95% | 0.07% | 61.70% | 1.71% | 76.26% | 2.30% |
| BLU | 2.15% | 85.54% | 2.75% | 99.95% | 0.07% | 62.43% | 2.44% | 75.92% | 1.97% |
| CF | 3.19% | 85.96% | 3.17% | 99.95% | 0.08% | 62.25% | 2.26% | 76.99% | 3.04% |
| BLU | 2.51% | 85.87% | 3.08% | 99.86% | −0.02% | 62.96% | 2.97% | 76.24% | 2.29% |

In some embodiments, green dyes that absorb below 500 nm may be used. In other embodiments, green dyes that absorb above 575 nm may be used. The use of dyes absorbing below 500 nm in the green filter allows for a reduction of leakage of shorter wavelength light into the green subpixel, whereas the use of dyes absorbing above 575 nm in the green filter allows for a reduction of leakage of longer wavelength light into the green subpixel.

Leakage from shorter wavelength light into the green subpixel can hurt the green primary color saturation and leads to a negative move of the Y-axis coordinate/value. This can also shift the X-axis coordinate/value unfavorably depending on a targeted gamut value. Alternatively, or in addition, to dyes, other pigments or other absorbers with wavelengths shorter than 500 nm may be used to reduce shorter wavelength light leakage into the green subpixel and to improve the saturation of the green subpixel.

Similarly to short wavelength light, leakage of longer wavelength light into the green subpixel can hurt the green primary color saturation and move the Y-axis value or coordinate negatively. This can also shift the X-axis coordinate/value unfavorably depending on the targeted gamut amount of dye, as well as dye combination(s) if there are any. In the embodiment of FIG. 5, the blue subpixels may transmit in range 350-530 nm, with possibly more than one peak within this range. Green subpixels may transmit in range 460-630, with possibly more than one peak within this range. Red subpixels may transmit in range 570 nm and higher, with possibly more than one peak within this range. This can create an opportunity to amplify the impact of a selective light conversion material or light absorbing material. For example, there may be reduced leakage into subpixels and/or luminance and color gamut may be improved. These selective light-conversion materials or light absorbing materials can be included as a separate film or can be coated onto or added within any of the layers that make up the disclosed backlight unit.

In some embodiments, as illustrated in FIG. 5, the addition of green dye to a color filter can shift aspects of the transmittance spectra of the display. More specifically, FIG. 5 shows that the additive green dye, when applied to a color filter (for example, at the level of the green subpixels), can cause a decrease in light emitted in the green range between 510 nm and 580 nm (+/−30 nm). The transmittance graph may be representative of the total impact of the color filter on the light with green dye and without green dye.

Figure 6:
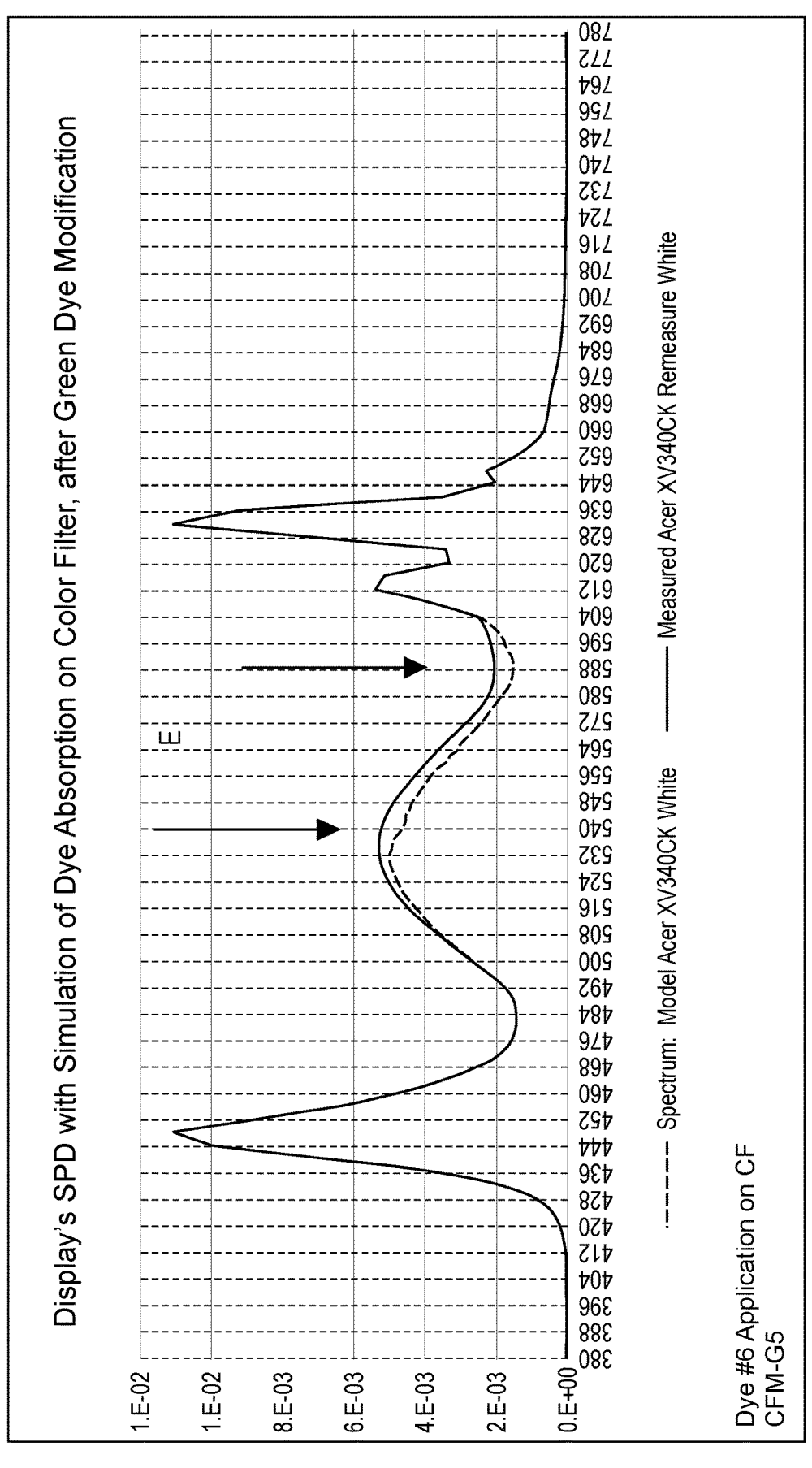
FIG. 6 is a non-limiting illustration of a display's spectral power distribution with simulation of green dye absorption on the color filter.

FIG. 6 illustrates a display's SPD when green dye is added to the color filter. The light of the display can be measured with a radiometer and the measured values of intensity are noted on the Y-axis, as mentioned above. In FIG. 6, the wavelength of light from the display is noted on the X-axis, as also mentioned above. The graph shows that the model spectrum is similar to the measured light values.

can reduce red primary color saturation. Therefore, use of a red dye in a red subpixel also helps manage the x, y coordinates (axis) for optimum gamut coverage. Table 4 illustrates how various measurements such as, but not limited to, luminance and color gamut, change when red dye is added to one type of display. There are many different types of monitors with varying values when measured.

TABLE 4

| | | | Dye modification in the red range on color filters and backlight unit | | | | | | |
|---|---|---|---|---|---|---|---|---|---|
| | | | Dye | Toxicity Factor | | Toxic Blue Ratio | | Luminance | |
| | | | absorption | | Change | | Change | | |
| Dyes | | # | peak nm | | -% | -% | -% | | Δ -% |
| Display | N/A | | | 0.0899 | — | 61.5% | — | 277.8 | — |
| Red-CF | 185HE | 5 | 584 | 0.0935 | 4.0% | 61.5% | 0.01% | 266.9 | −3.9% |
| BLU | 185HE | 5 | 584 | 0.1187 | 32.1% | 61.7% | 0.23% | 204.3 | −26.5% |

| | Adobe RGB coverage | | DCI-P4 Coverage | | sRGB Coverage | | BT.2021 Coverage | | NTSC Coverage | |
|---|---|---|---|---|---|---|---|---|---|---|
| | | Change | | Change | | Change | | Change | | Change |
| | -% | -% | -% | -% | -% | -% | -% | -% | -% | -% |
| Display | 78.89% | — | 82.79% | — | 99.87% | — | 59.99% | — | 73.96% | — |
| Red-CF | 78.52% | −0.37% | 83.04% | 0.25% | 99.85% | −0.02% | 61.50% | 1.51% | 73.52% | −0.44% |
| BLU | 84.35% | 5.46% | 88.38% | 5 59% | 99.73% | −0.15% | 65.90% | 5.91% | 79.06% | 5.10% |

The center peak is within the range 510-560 nm. There is a slight drop or absorption around 540 nm where the spectrum model is slightly less (more absorption) than the actual measured values. Similarly, the spectrum model is slightly less around 580-605 nm. When green dye is applied at the level of the color filter, there can be a blue light peak between 430-470 nm, a green light peak between 490-580 nm, a red light peak between 600-660 nm, and combinations thereof. The graph in FIG. 6 illustrates one embodiment of the unique spectrum with green dye(s) added in the color filter of the display system.

Figure 7:
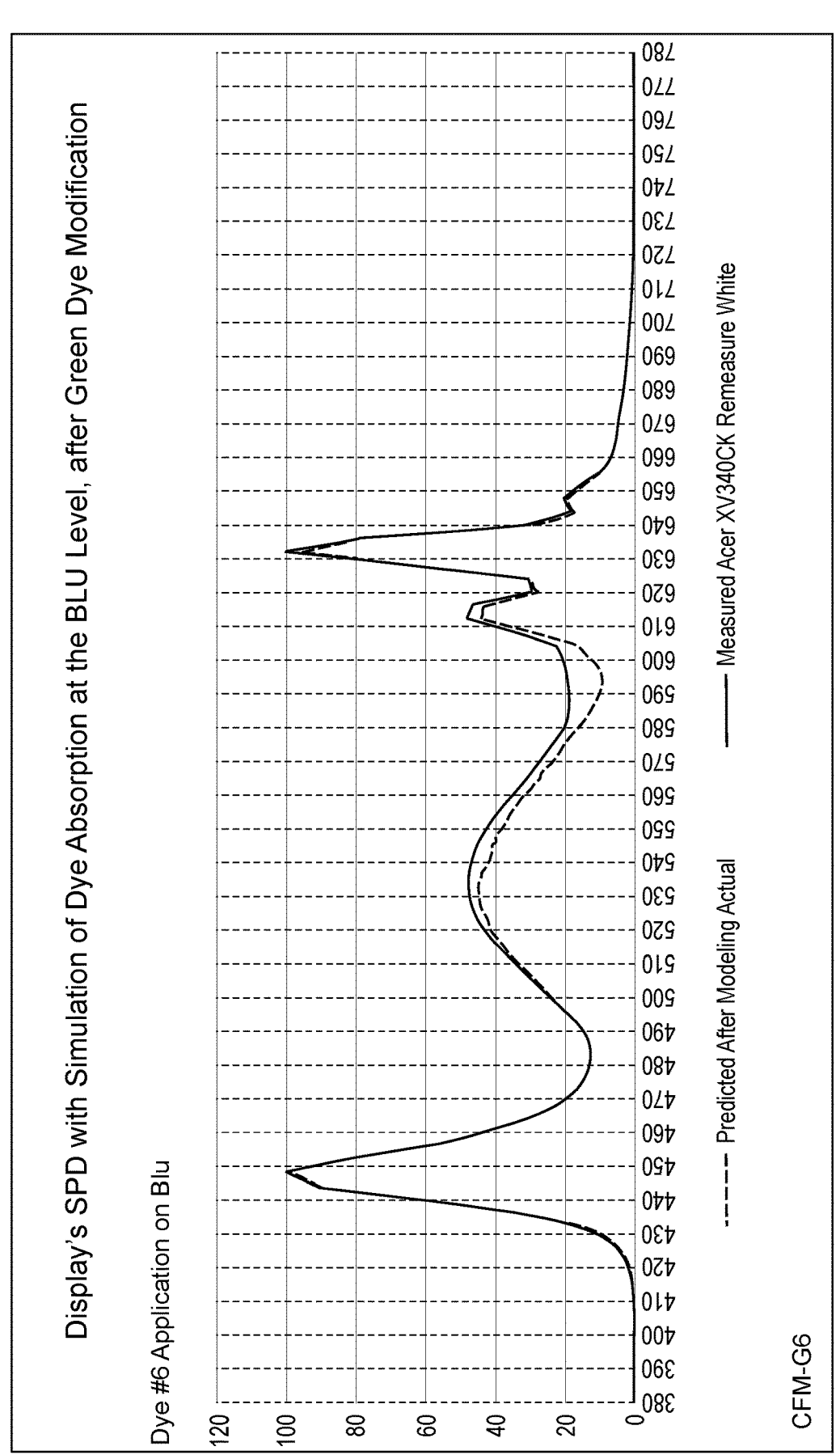
FIG. 7 is a non-limiting illustration of a display's spectral power distribution with simulation of green dye absorption at the backlight unit level.

FIG. 7 illustrates a display's SPD from a display having green dye modification at the BLU level. Similar to FIG. 6, FIG. 7 illustrates a graphical representation of the measured predicted after modeling actual and the measured light. More specifically, FIG. 7 shows the effective transmittance of the light-conversion or absorbing material (green-light filtering layer) across the visible spectrum as a function of where the light conversion material or light absorbing material is placed within the display (in this case, the BLU). The light of the display can be measured with a radiometer. The measured values of absorption can be noted on the Y-axis. In FIG. 7, the wavelength of light from the display is noted on the X-axis. In some cases, the type of display may impact the resulting X-axis and Y-axis values. When green dye is applied at the level of the BLU, there can be a blue light peak between 420-470 nm, a green light peak between 490-590 nm, a red light peak between 600-660 nm, and combinations thereof. The graph in FIG. 7 illustrates one embodiment of the unique spectrum with green dye(s) added in the BLU of the display system.

In another embodiment, (see below, Table 4), dyes absorbing in the red range, below 590 nm, can be used to modify a color filter and/or BLU. The modification in the red range at the level of the color filter can reduce leakage of short wavelength light into the red subpixel. That leakage The values listed show the results of adding red dye to a red subpixel in terms of effect on toxic blue ratio, toxicity factor, luminance, and color gamut change. As with the green subpixel, leakage from shorter wavelength light into the red subpixel can hurt the red primary color saturation and can lead to a negative move of the Y-axis coordinate/value. This can also shift the X-axis coordinate/value unfavorably depending on a targeted gamut value. Alternatively, or in addition, to dyes, other pigments or other absorbers with wavelengths shorter than 600 nm can be used to reduce leakage of shorter wavelength light into the red subpixel and to improve the saturation of the red subpixel.

Figure 8:
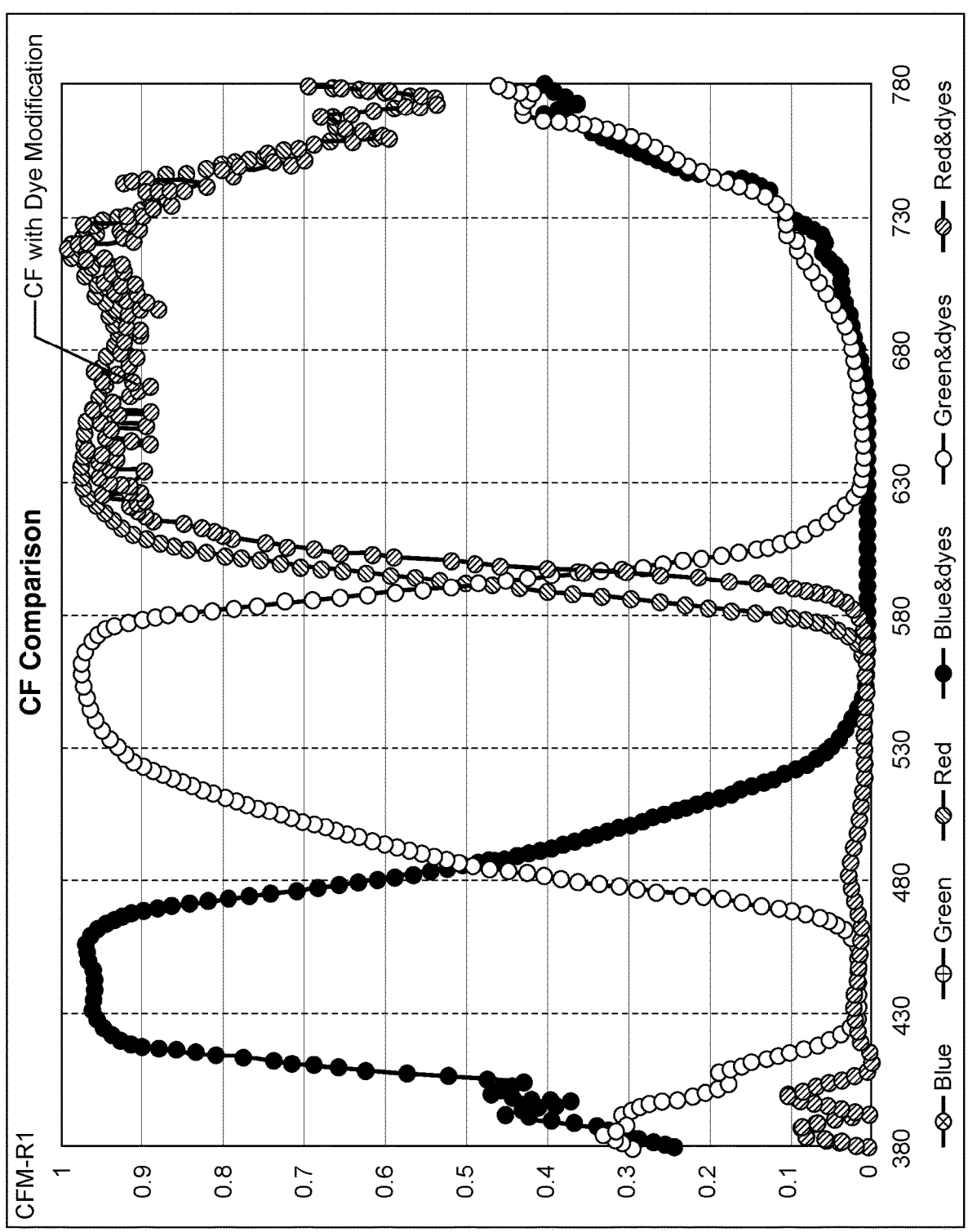
FIG. 8 is a non-limiting illustration of a possible transmittance spectra of the color filter with red dye modification.

In FIG. 8, the graph may relate to a transmittance spectra of the color filter with red dye modification. The graph may illustrate one non-limiting embodiment of when red dyes, blue dyes, and green dyes are added to the color filter. In FIG. 8, the red spectrum prior to dye modification is represented as a curve made of dots having "right slashes", and the curve made of dots having left slashes represents the red spectrum from the color filter (or, more specifically, red subpixel) with red dye modification. The color filter modification with red dye suggests that there is absorption of red light in wavelengths 580 nm and higher.

In some embodiments, the added dye may impact the graph by narrowing and reducing the crossover of green and red. The separation may improve between colors to improve color gamut. The red dye modification range can occur within 560-750 nm. Effectiveness of dye ranges varies based on display type and the amount of dye, as well as dye combination(s) if there are any. In the embodiment of FIG. 8, the blue subpixels may transmit in range 380-530 nm, with possibly more than one peak within this range. Green subpixels may transmit in range 460-630, with possibly more than one peak within this range. Red subpixels may transmit in range 560 nm and higher, with possibly more than one peak within this range. This can create an opportunity to amplify the impact of a selective light conversion material or light absorbing material. For example, there may be reduced leakage into subpixels and/or luminance and color gamut may be improved. These selective light-conversion materials or light absorbing materials can be included as a separate film or can be coated onto or added within any of the layers that make up the disclosed backlight unit.

In some embodiments, as illustrated in FIG. 8, the addition of red dye to a color filter can shift aspects of the transmittance spectra of the display. More specifically, FIG. 8 shows that the additive red dye, when applied to a color filter (for example, at the level of the red subpixels), can cause a shift in light emitted in the red range. More specifically, the lower end of the red range without the red dye may start between 560 nm and 570 nm whereas the lower end of the red range with the red dye may start between 570 nm and 580 nm (+/−30 nm). The transmittance graph may be representative of the total impact of the color filter on the light with red dye and without red dye.

Figure 9:
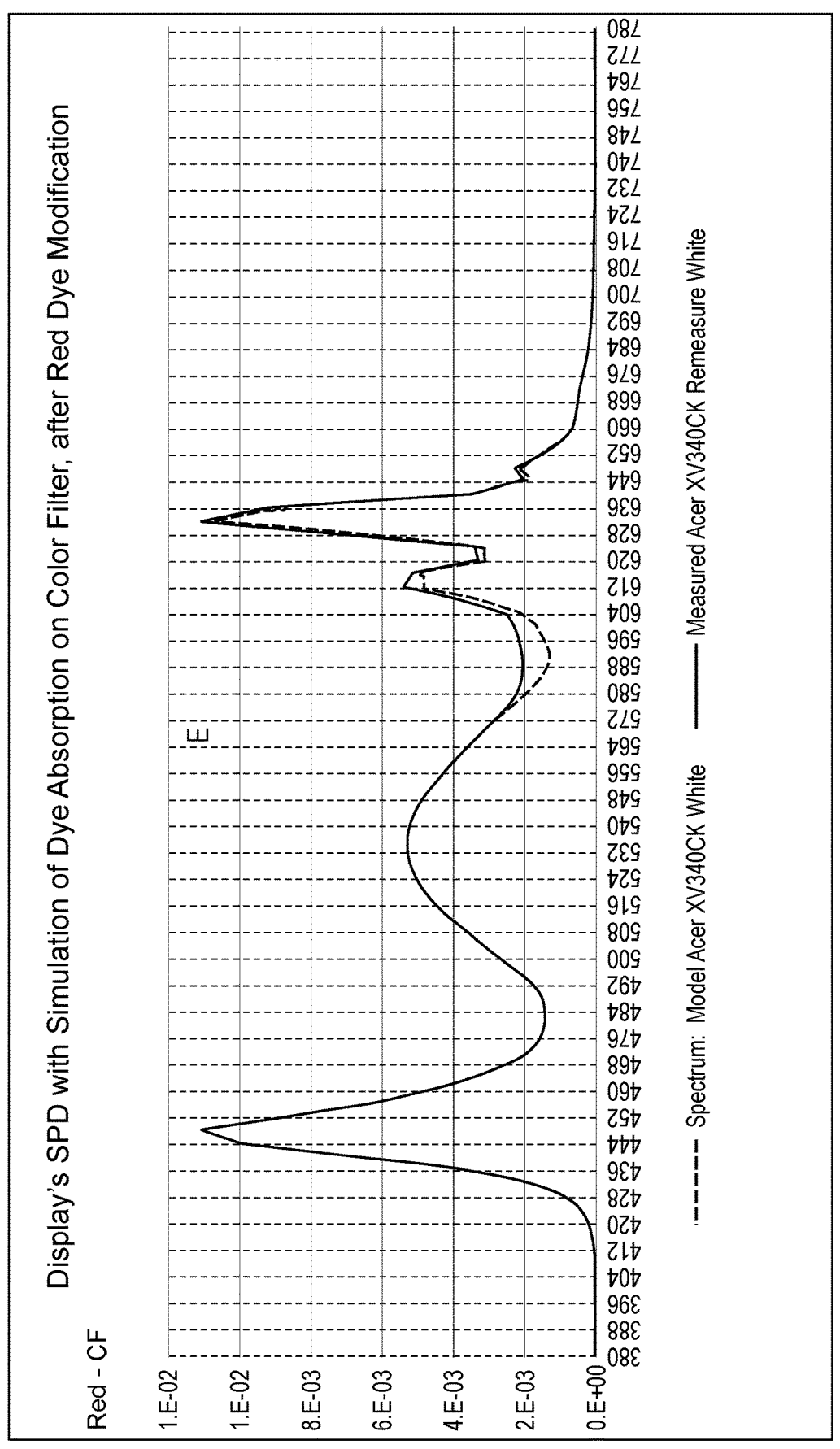
FIG. 9 is a non-limiting illustration of a display's spectral power distribution with simulation of red dye absorption on the color filter.

FIG. 9 illustrates a display's SPD when red dye is added to the color filter. The light of the display can be measured with a radiometer and the measured values of intensity are noted on the Y-axis, as mentioned above. In FIG. 9, the wavelength of light from the display is noted on the X-axis, as also mentioned above. The graph shows that the model spectrum is similar to the measured light values. The modification with red dye begins at approximately 580 nm. The graph illustrates one embodiment of the original color filter and resulting values after modification of the color filter with red dye. The result is that there may be more than one peak in the values for the red dye. For example, there may be a first peak between 600 nm and 620 nm and a second peak between 625 nm and 645 nm. The absorption range appears in the embodiment of FIG. 9 to drop off at 670 nm. When red dye is applied at the level of the color filter, there can be a blue light peak between 420-475 nm, a green light peak between 490-580 nm, a red light peak between 600-620 nm, an alternative or additional red light peak between 625-645 nm, and combinations thereof. The graph in FIG. 9 illustrates one embodiment of the unique spectrum with red dye(s) added in the color filter of the display system.

Figure 10:
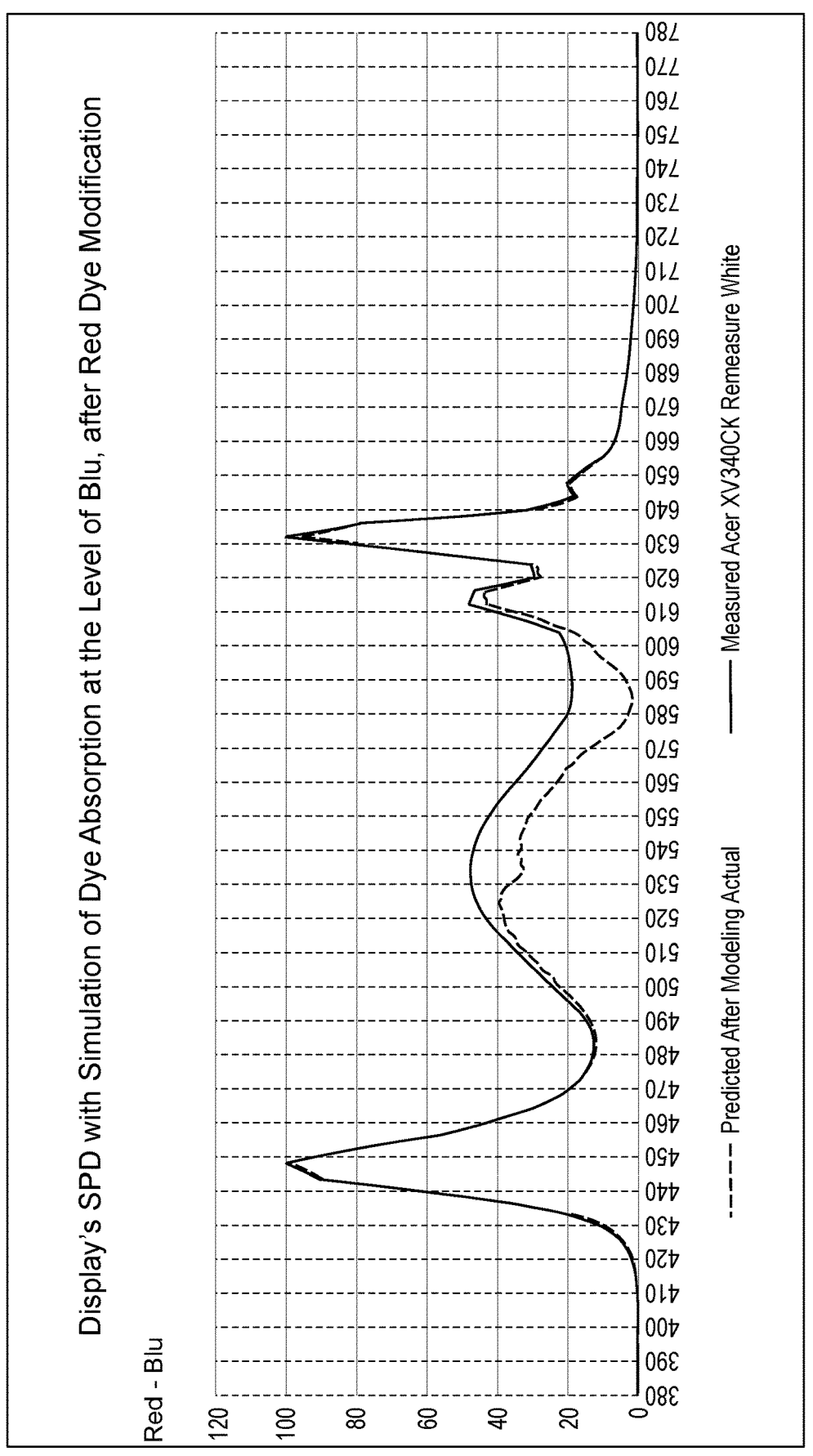
FIG. 10 is a non-limiting illustration of a display's spectral power distribution with simulation of red dye absorption at the backlight unit level.

FIG. 10 illustrates a display's SPD from a display having red dye absorption at the level of the BLU. Similar to FIG. 9, FIG. 10 illustrates a graphical representation of the measured predicted after modeling actual and the measured light. More specifically, FIG. 10 shows the effective transmittance of the light-conversion or absorbing material (red-light filtering layer) across the visible spectrum as a function of where the light conversion material or light absorbing material is placed within the display (in this case, the BLU). The light of the display can be measured with a radiometer. The measured values of absorption can be noted on the Y-axis. In FIG. 10, the wavelength of light from the display is noted on the X-axis. In some cases, the type of display may impact the resulting X-axis and Y-axis values. When red dye is applied at the level of the BLU, there can be a blue light peak appearing at approximately 430-470 nm, a green light peak between 490-580 nm, a red light peak between 600-620 nm, a red light peak between 625-645 nm, and combinations thereof. Some ranges have multiple peaks in the range. In some embodiments, transmission or absorptions dips are also seen, such as the green range modification from 515-580 nm and the red range modification from 580-620 nm. The graph in FIG. 10 illustrates one embodiment of the unique spectrum with red dye(s) added in the BLU of the display system.

In another embodiment (see below, Table 5), combinations of dyes can be used to modify a color filter, backlight unit, or both at the same time. The resulting measurements of blue light toxicity factor, luminance, and color gamut coverages indicate that blue absorbing dye modification at the level of the color filter (for example, in blue subpixels) is advantageous for reduction of the toxicity factor. It also results in a lower luminance loss when compared to a modification on the BLU only or when compared to modification on both the color filter and the BLU. Using different combinations of dyes also allows for customization of the resulting color performance of the display. For example, it can reduce leakage of short and long wavelength light into subpixels. Table 5 illustrates how various measurements such as, but not limited to, luminance and color gamut, change when multiple dyes are added to the color filter and/or BLU on one type of display. There are many different types of monitors with varying values when measured.

TABLE 5

| Dye modification in the blue and green ranges on color filters and backlight unit | | | | | | | | |
|---|---|---|---|---|---|---|---|---|
| | | Dye | Toxicity Factor | | Toxic Blue Ratio | | | Adobe RGB |
| | | absorption | | Change | | Change | Luminance | coverage |
| | Dyes | peak nm | -% | -% | -% | -% | Δ -% | -% |
| Display | N/A | | 0.0899 | — | 61.5% | — | 277.8 | — | 78.89% |
| CF-B + G | 2, 3, 6 | 431, 553 + 422, 526 (595) | 0.0566 | −37.1% | 49.4% | −19.7% | 250.3 | −9.9% | 82.18% |
| BLU-B + G | 2, 3, 6 | 431, 553 + 422,526 (595) | 0.0783 | −12.8% | 50.0% | −18.7% | 166.4 | −40.1% | 72.26% |
| CF-B & BLU-B + G | 2, 3, 6 | 431, 553 + 422,526 (595) | 0.0574 | −36.1% | 49.2% | −20.0% | 242 | −12.9% | 81.88% |
| CF-B + G | 1, 6 | 427, 551 (595) | 0.0809 | −10.0% | 57.4% | −6.6% | 270 | −2.8% | 80.34% |
| BLU-B + G | 1, 6 | 427, 551 (595) | 0.0835 | −7.1% | 57.3% | −6.9% | 258.2 | −7.1% | 80.34% |
| CF-B & BLU-B + G | 1, 6 | 427, 551 (595) | 0.0813 | −9.59% | 57.4% | −6.7% | 266.8 | −4.0% | 80.24% |
| CF-B + G | 2, 6 | 431, 553 (595) | 0.0820 | −8.6% | 58.7% | −4.6% | 269.9 | −2.8% | 80.21% |
| BLU-B + G | 2, 6 | 431, 553 (595) | 0.0835 | −7.0% | 58.7% | −4.6% | 261.3 | −5.9% | 80.54% |
| CF-B & BLU-B +G | 2, 6 | 431, 553 (595) | 0.0823 | −8.4% | 58.6% | −4.7% | 266.7 | −4.0% | 80.13% |

TABLE 5-continued

| | Adobe RGB Coverage | DCI-P4 Coverage | | sRGB Coverage | | BT.2021 Coverage | | NTSC Coverage | |
|---|---|---|---|---|---|---|---|---|---|
| | Change -% | -% | Change -% | -% | Change -% | -% | Change -% | -% | Change -% |
| Display | — | 82.79% | — | 99.87% | — | 59.99% | — | 73.96% | — |
| CF-B + G | 3.28% | 85.73% | 2.93% | 100.00% | 0.13% | 61.71% | 1.72% | 77.00% | 3.04% |
| BLU-B + G | −6.63% | 77.26% | −5.33% | 94.90% | −4.97% | 56.38% | −3.61% | 67.84% | −6.12% |
| CF-B & BLU-B + G | 2.99% | 86.34% | 3.55% | 100.00% | 0.12% | 62.46% | 2.47% | 76.66% | 2.70% |
| CF-B + G | 1.45% | 83.95% | 1.16% | 100.00% | 0.13% | 60.43% | 0.43% | 75.29% | 1.33% |
| BLU-B + G | 1.45% | 84.50% | 1.71% | 100.00% | 0.13% | 60.89% | 0.90% | 75.39% | 1.43% |
| CF-B & BLU-B + G | 1.37% | 84.25% | 1.46% | 100.00% | 0.13% | 60.71% | 0.71% | 75.17% | 1.21% |
| CF-B + G | 1.32% | 63.87% | 1.08% | 99.99% | 0.12% | 60.42% | 0.42% | 75.18% | 1.22% |
| BLU-B + G | 1.65% | 84.77% | 1.98% | 99.99% | 0.12% | 61.16% | 1.36% | 75.58% | 1.62% |
| CF-B & BLU-B +G | 1.24% | 84.15% | 1.36% | 99.99% | 0.12% | 60.69% | 0.70% | 75.06% | 1.10% |

TABLE 6

Dye absorption peaks (nm) associated with Table 5

| Dyes | # | Dye absorption peak (nm) |
|---|---|---|
| 250ES + ABS526N (181HE) | 2, 3, 6 | 431, 553 + 422, 526 (595) |
| 250ES + ABS526N (181HE) | 2, 3, 6 | 431, 553 + 422, 526 (595) |
| 250ES + ABS526N (181HE) | 2, 3, 6 | 431, 553 + 422, 526 (595) |
| 252HE (181HE) | 1, 6 | 427, 551 (595) |
| 252HE (181HE) | 1, 6 | 427, 551 (595) |
| 252HE (181HE) | 1, 6 | 427, 551 (595) |
| 250ES (181HE) | 2, 6 | 431, 553 (595) |
| 250ES (181HE) | 2, 6 | 431, 553 (595) |
| 250ES (181HE) | 2, 6 | 431, 553 (595) |

In some instances, there is more than one dye absorption peak (nm) depending on the dye(s) used. Overall, dye modification at the level of the BLU may impact all the primary colors and may reduce the luminance by impacting the light in the green range and, to a lesser extent, in the blue range. This potential emission reduction correlates closely with the photopic sensitivity curve with a greater degradation of luminance. However, because the dye modification at the level of the color filter may only impact one primary color at a time, it may be possible to better optimize the color emission of each primary color and customize the resulting SPD of the display. Table 6 lists some values for dye modification in both blue and green ranges, on color filters and backlight unit, using different dyes combinations.

Figure 11:
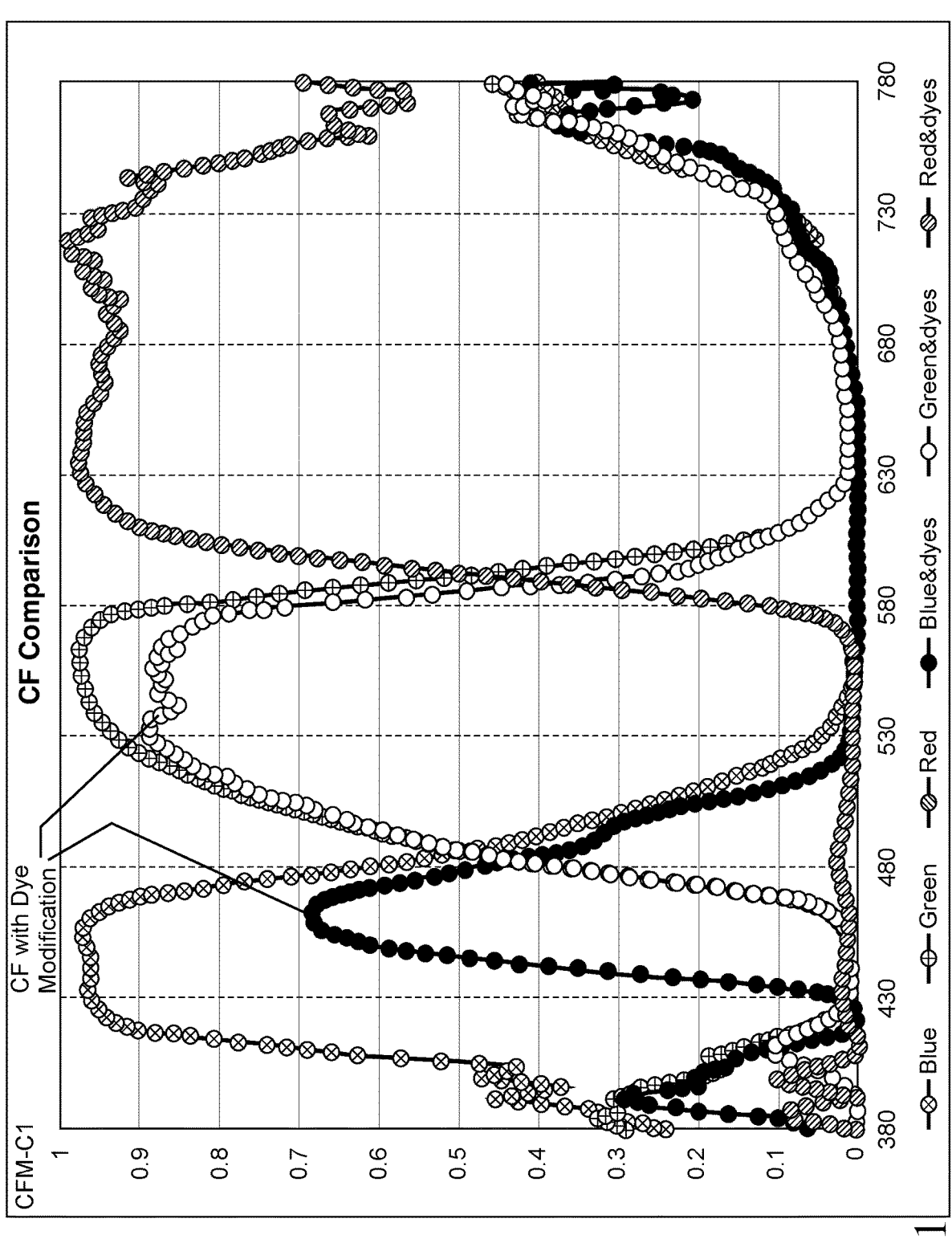
FIG. 11 is a non-limiting illustration of a possible transmittance spectra of the color filter with both blue and green dye modification.

FIG. 11 may be a representation of a transmittance spectra of the color filter after both blue and green dye modification. The graph illustrates the impact of dye modification at the color filter on total luminance. In FIG. 11, data points related to transmission curves in blue, green, and red subpixels prior to the addition of dyes are indicated by an "x", "crosshair", and "right slashes", respectively whereas data points related to transmission curves in blue, green, and red subpixels after the addition of dyes are indicated by a solid black dot, solid white dot, and "left slashes", respectively. Peaks for color filters having dye modifications may occur for the display measures at approximately 440-490 nm, 500-580 nm, and 600-680 nm (+/−30 nm). Peaks for color filters prior to dye modifications may occur for display measures at approximately 400-480 nm, 500-590 nm, and 600-680 nm (+/−30 nm). In some embodiments, the added dyes may impact the graph by narrowing and reducing the crossover of blue and green as well as green and red. Therefore, due to improved separation between subpixel transmissions, there may be reduced leakage into subpixels and/or the luminance and color gamut may be improved. Effectiveness of dye ranges varies based on display type and the amount of dye, as well as dye combination(s) if there are any. The selective light-conversion materials or light absorbing materials can be included as a separate film or can be coated onto or added within any of the layers that make up the disclosed backlight unit.

Figure 12:
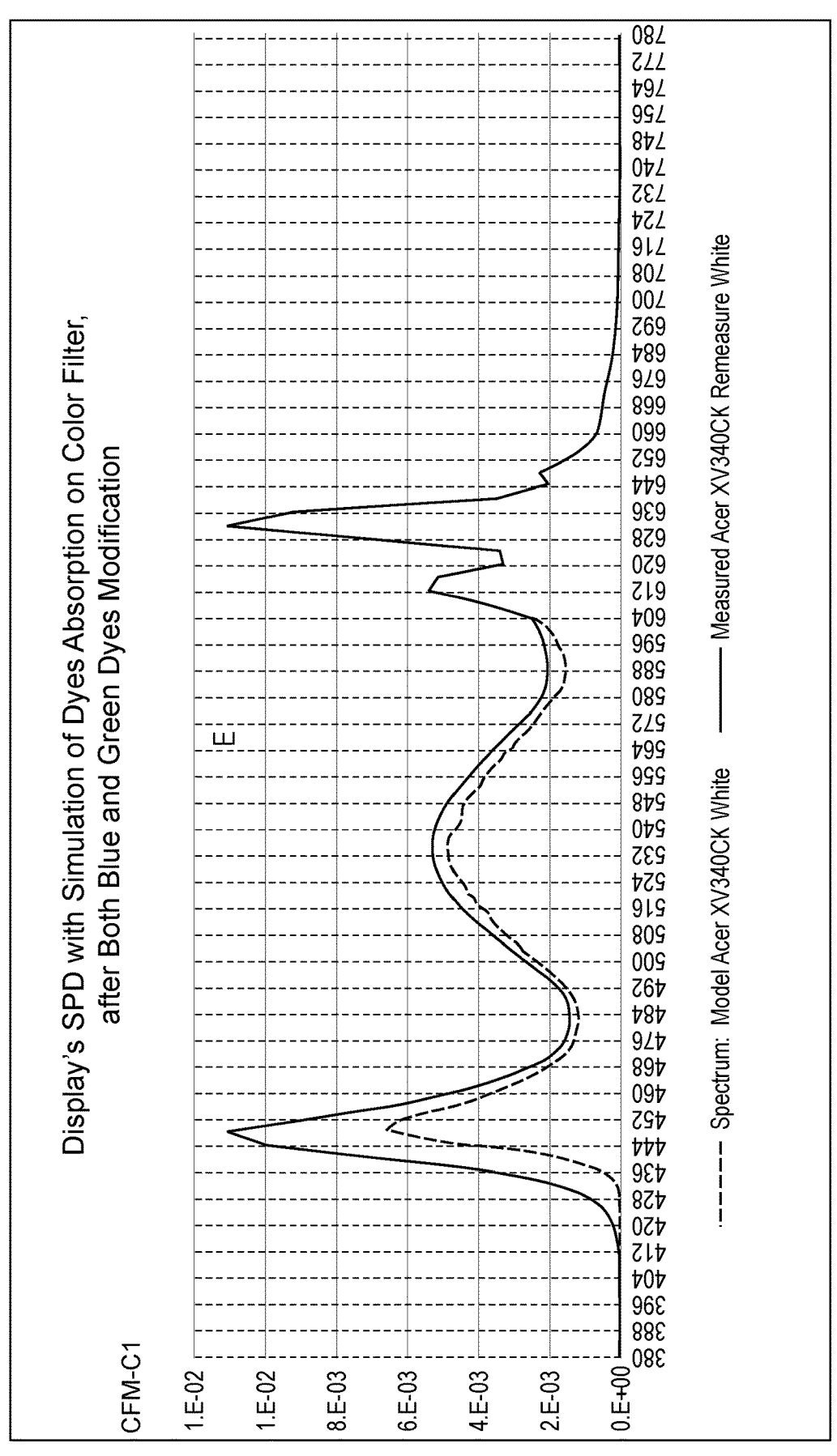
FIG. 12 is a non-limiting illustration of a display's spectral power distribution with simulation of blue and green dye absorption on the color filter.

FIG. 12 illustrates a display's SPD when both blue and green dyes are added to the color filter. The light of the display can be measured with a radiometer and the measured values of intensity are noted on the Y-axis, as mentioned above. In FIG. 12, the wavelength of light from the display is noted on the X-axis, as also mentioned above. The graph illustrates one embodiment of the original color filter and resulting values after modification of the color filter with blue and green dyes. Dye modification (i.e., addition of blue and green dyes to the color filter) may cause a blue light absorption peak between 430 nm and 470 nm, a green light absorption peak between 484 nm and 588 nm, a red light absorption peak between 600 nm and 620 nm, an alternative or additional red light absorption peak between 625 nm and 645 nm, and combinations thereof. The solid lines may show the values of the modified color filter absorption values when measured.

Figure 13:
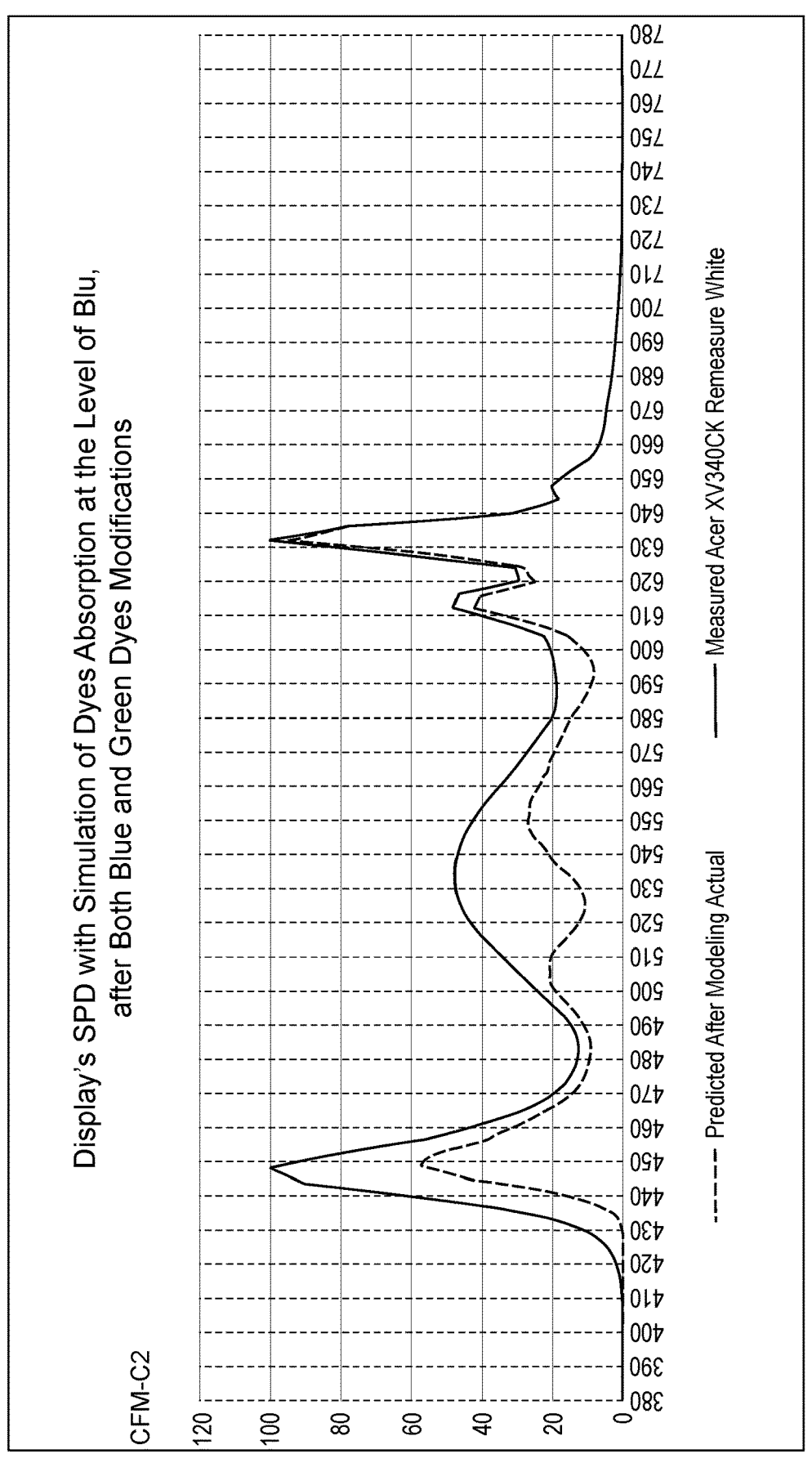
FIG. 13 is a non-limiting illustration of a display's spectral power distribution with simulation of blue and green dye absorption at the backlight unit level.

FIG. 13 illustrates a display's SPD from a display having blue and green dye absorption at the level of the BLU. Similar to FIG. 12, FIG. 13 illustrates a graphical representation of the measured predicted after modeling actual and the measured light. More specifically, FIG. 13 shows the effective transmittance of the light-conversion or absorbing material across the visible spectrum as a function of where the light conversion material or light absorbing material is placed within the display (in this case, the BLU). The light of the display can be measured with a radiometer. The measured values of absorption can be noted on the Y-axis. In FIG. 13, the wavelength of light from the display is noted on the X-axis. In some cases, the type of display may impact the resulting X-axis and Y-axis values. The larger difference from the measured and actual values as a result after both blue and green dyes are added to that color filter. When blue and green dyes are applied at the level of the BLU, there can be a blue light absorption peak at around 450 (+/−15 nm), green light peaks at 500-510 nm and 540-560 nm (+/−15 nm), red light peaks at 610-620 nm and 630-640 nm (+/−5 nm), and combinations thereof. As illustrated, some ranges have multiple peaks in the range. The graph in FIG. 13 illustrates one embodiment of the unique spectrum with blue and green dyes added in the BLU of the display system.

The embodiments may further demonstrate that the display system can reduce blue light toxicity while increasing luminance and expanding or shifting the color gamut. The examples discussed so far herein primarily demonstrate how the inclusion of the identified dyes in the color filter are an improvement over including them in a layer within the back-light unit. That comparison did show some improvement in color gamut over the original display performance, and the primary comparison was with the dyes in the backlight unit. The resins herein can be thermally or photolithographically cured, whereas most color filter materials are photolithographically cured (given the very tight dimensions of modern displays).

FIGS. 14-25 illustrate the luminance, toxic blue light, and color gamut data from various color filter modifications. One typical way that manufacturers will increase transmittance or luminance for a color filter is to reduce the coating thickness, and thus, have less absorption with a shorter optical path and lower dye coverage per square area. The figures herein illustrate, with various representative lines as indicated, that the corresponding color filter ("CF") for the various wavelengths associated with specific colors may have a possible increased transmittance/luminance, mathematically simulating the thinner coating. In some cases, the color filter thickness may be decreased to improve luminance while the addition of dyes and/or pigments at the level of the color filter can maintain and even improve color performance. The spectra from when blue, green and red dyes and/or pigments are added to color filters are shown in respective (isolated) graphs. In those individual graphs (see, for example, FIGS. 15*a-c*, 19*a-c*, and 23*a-c*), the transmission peak may increase while the overall width may decrease, thereby indicating a sharpening of the colors by a reduction of leakage of low/high wavelengths into each respective subpixel. The selective filtration of toxic blue light may be illustrated with the dip in transmittance lowering particularly between 415 to 435 nm in FIGS. 15*a*, 19*a*, and 23*a*. The maintained or improved color gamut is most clearly illustrated in a comparison of color changes as shown in FIGS. 17*a-c*, 21*a-c*, and 25*a-c* and in the color gamut charts in FIGS. 17*d*, 21*d*, and 25*d*. FIGS. 17*d*, 21*d*, and 25*d* show separation of colors and different display spectra on the color gamut.

Figure 14A:
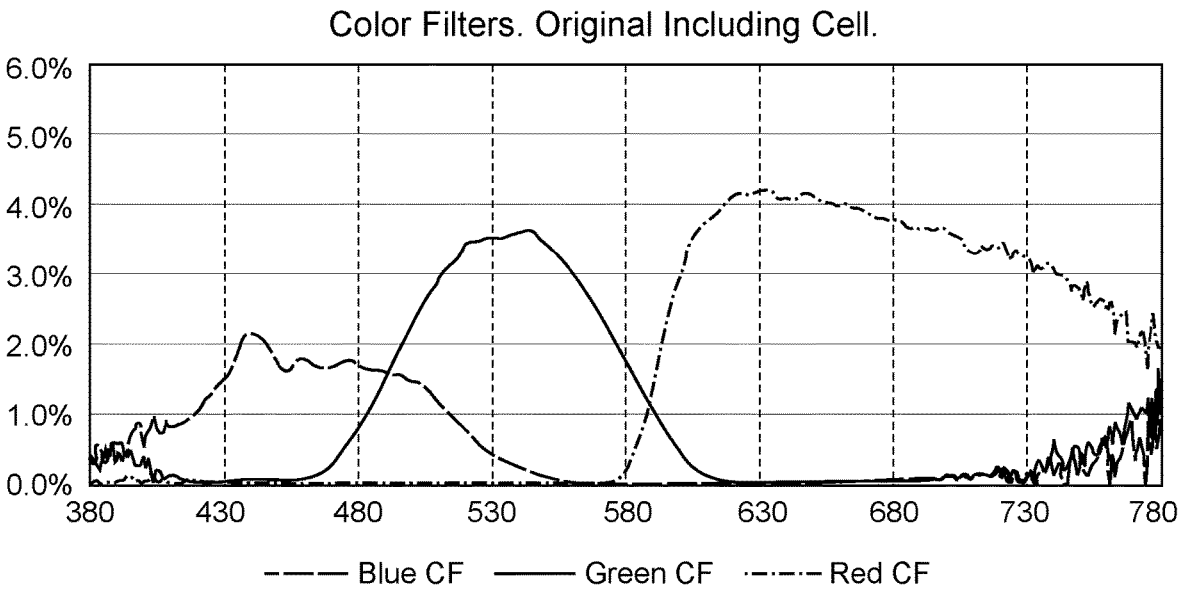
FIG. 14*a* is a non-limiting illustration of displays of spectral power distribution with simulation of red, blue and green dye absorption at the backlight unit level with original unmodified color filter.
Figure 14B:
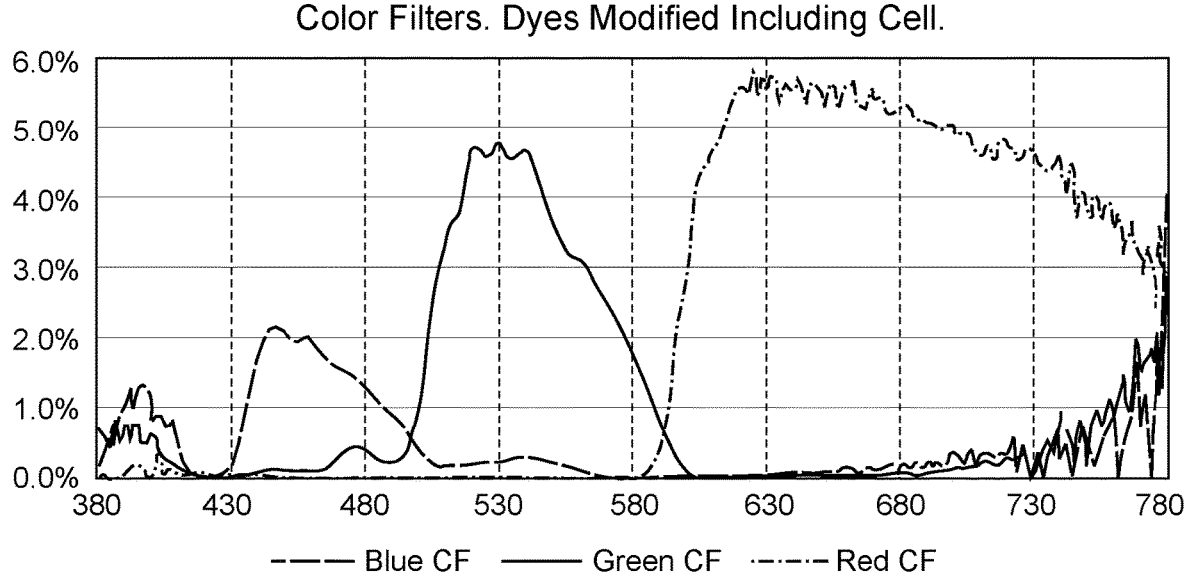
FIG. 14*b* is a non-limiting illustration of displays of spectral power distribution with simulation of red, blue and green dye absorption at the backlight unit level with dye modification, with dye modification.

In the figures, FIG. 14*a* (no dyes) and FIG. 14*b* (color filter with dye(s)) show the change in transmittance before and after the color filter includes dye(s). In the comparison between FIGS. 14*a* and 14*b*, the addition of the dye(s) clearly improves the separation between the different transmission peaks. For example, there is overlap between the blue and green transmission curves in FIG. 14*a* that is significantly reduced in FIG. 14*b*. This is similar, though not as dramatic, when comparing overlap between the green and red curves. This decrease in overlap results in improved color gamut. Additionally, as is evidenced in the comparison of FIGS. 14*a* and 14*b*, overall transmission of each of the colors is not impacted by the addition of dye(s). In fact, for the green and red transmission curves, there is a significant improvement in transmission. Therefore, as illustrated, improved color gamut does not result in lower transmittance or luminosity.

Figures 15A, 15B, 15C:
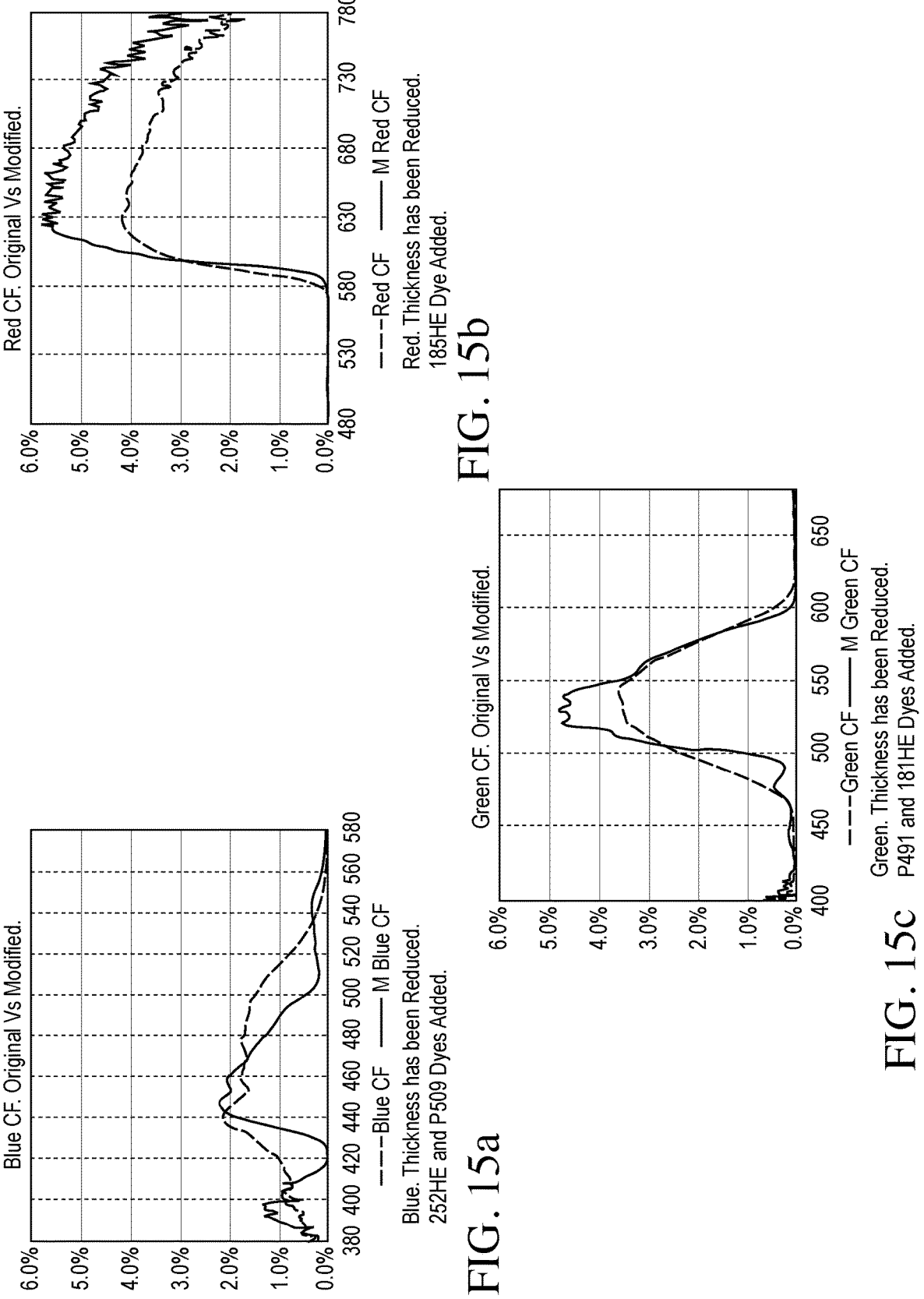
FIG. 15*a-c* is a non-limiting illustration of displays of spectral power distribution with simulation of red, green and blue dye absorption at the backlight unit level, respective of each dye type.

FIGS. 15*a-c* are a comparison between each of the individual color filters of graphs 14*a* and 14*b*. The color filters are associated with certain wavelength ranges, and the isolated color filters show the changes between unmodified and dye-modified color filters. More specifically, FIG. 15*a* compares the original blue color filter transmission curve against the modified blue color filter transmission curve. Similarly, FIG. 15*b* compares the original red color filter transmission curve against the modified red color filter transmission curve, and FIG. 15*c* compares the original green color filter transmission curve against the modified green color filter transmission curve. The maintained and/or improved transmissions after dye(s) is added are clearly illustrated in FIGS. 15*a-c* by comparing the peaks in each graph for an unmodified filter and a modified filter.

Figure 16A:
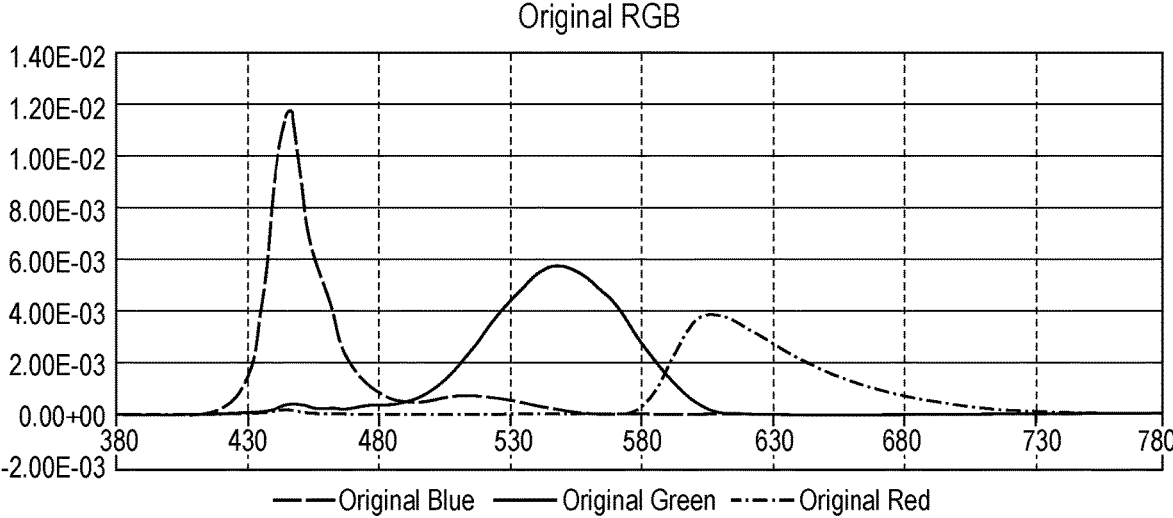
FIG. 16*a* is a non-limiting illustration of displays of spectral power distribution with simulation of red, blue and green color filter modification with original unmodified RGB.
Figure 16B:
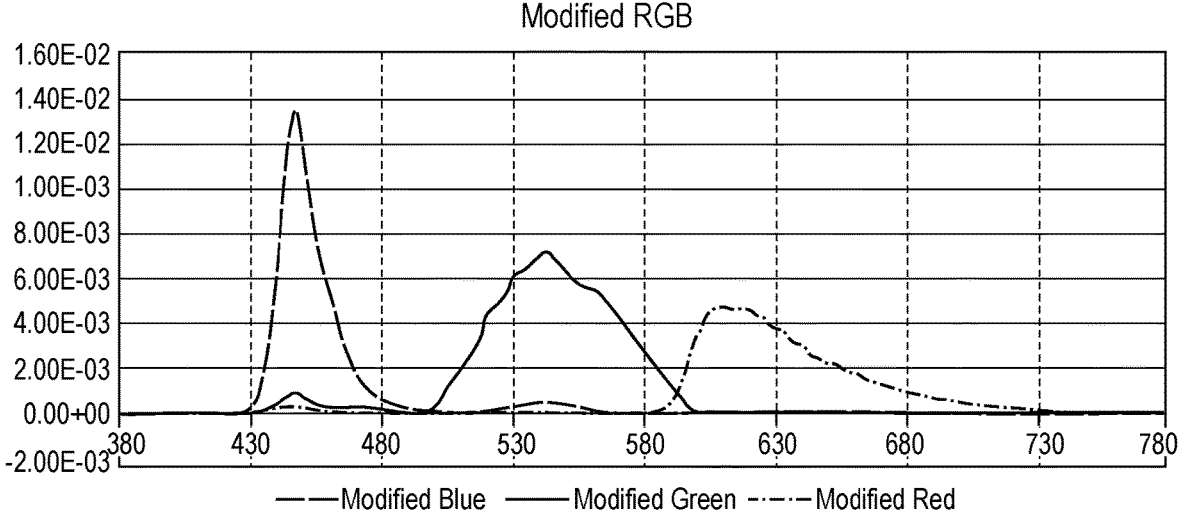
FIG. 16*b* is a non-limiting illustration of displays of spectral power distribution with simulation of red, blue and green color filter modification with modified RGB.
Figures 17A, 17B, 17C:
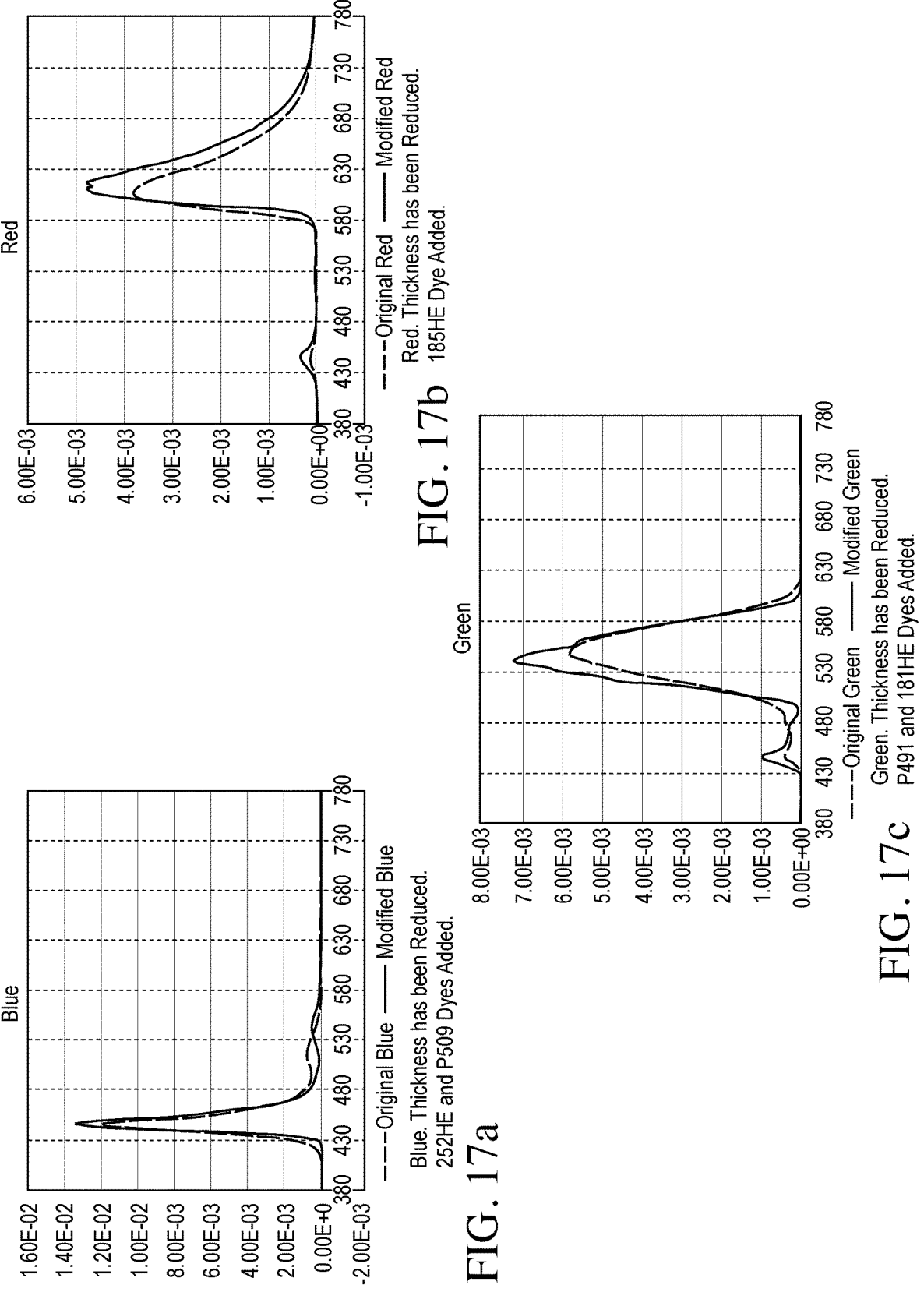
FIG. 17*a-c* is a non-limiting illustration of displays of spectral power distribution with simulation of red, green and blue dye in color filter modification, respective of the identified color targeting type of dye.
Figure 17D:
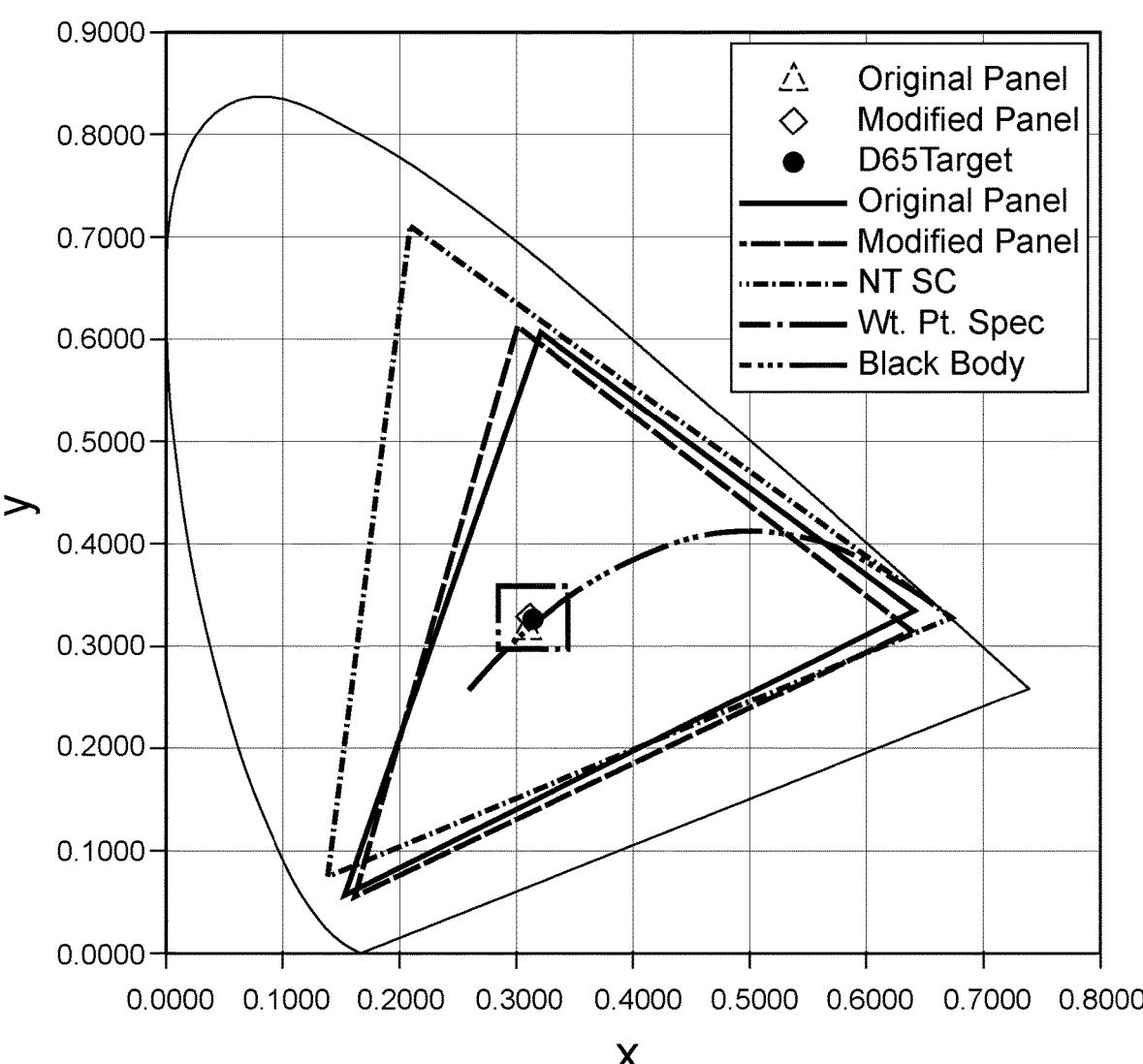
FIG. 17*d* is a non-limiting illustration of the color gamut of unmodified and addition of modification dyes to a color filter.

FIGS. 16*a-b* illustrate the impact on the red, green, and blue primary color saturation when dye(s) are added to a color filter. More specifically, FIGS. 16*a-b* are a graphical illustration of the maintained (or improved) color gamut as also seen in the color gamut chart of FIG. 17*d*. The figures illustrate that the addition of dye(s) to a color filter can sharpen the primary colors. FIG. 16*a* (no dyes) and FIG. 16*b* (color filter with dye(s)) show the change in color saturation after the color filter includes dye(s). As with the previous FIGS. 14-15, FIGS. 16*a* and 16*b* are broken down by color in FIGS. 17*a-c* where it is clear that the addition of dye(s) to the color filter maintains, if not improves, the color saturation and sharpness. FIG. 17*d* illustrates a color gamut chart for the original (no dye(s) added) and modified (dye(s) added to color filter) display panels. As is well known, color gamut charts illustrate the three primary colors: red, green, and blue. While the figures herein are in black and white, they are to be interpreted as incorporating the standard gamut chart color gradients as illustrated at: https://upload.wikimedia.org/wikipedia/commons/9/91/SRGB_chromaticity_CIE1931.svg

TABLE 7 illustrates a breakdown of the data illustrated in FIG. 17d.

| Data Sets | | Original panel | | | Modified Panel | Diff. |
|---|---|---|---|---|---|---|
| Red | x | 0.6406 | Red | x | 0.6394 | 0.00116275 |
| | y | 0.3385 | | y | 0.3152 | 0.02333859 |
| | Y | 0.0863 | | Y | 0.0899 | −0.0035861 |
| Green | x | 0.3192 | Green | x | 0.3002 | 0.01895069 |
| | y | 0.6086 | | y | 0.6144 | −0.0058603 |
| | Y | 0.3176 | | Y | 0.3563 | −0.0386734 |
| Blue | x | 0.1545 | Blue | x | 0.1627 | −0.0082211 |
| | y | 0.0602 | | y | 0.0578 | 0.002473 |
| | Y | 0.0355 | | Y | 0.0339 | 0.00157733 |
| White | x | 0.3081 | White | x | 0.3112 | −0.0031173 |
| Point | y | 0.3216 | Point | y | 0.3305 | −0.0089335 |
| | Y | 0.4394 | | Y | 0.4801 | −0.0406822 |
| | L* | 3.9692 | | L* | 4.3367 | −0.367482 |
| | a* | 0.1358 | | a* | −0.1753 | 0.31116297 |
| | b* | −0.3960 | | b* | 0.0316 | −0.4275755 |

Therefore, collectively, FIGS. 14-17 illustrate that the addition of dye(s) to a color filter (for example, at the subpixel level as described above wherein blue dyes can be added to blue subpixels, green dyes can be added to green subpixels, red dyes can be added to red subpixels, as well as combinations thereof) can lead to an overall luminance improvement, a reduction in toxic blue light, and maintained or improved color gamut. More specifically, the Blue Light Toxicity Factor can be reduced by 7.6% and the luminance can be increased by 9.3%. As illustrated in Table 8 below, the gamut coverage percentages are most relevant to show the improvement in the various standard gamut charts (NTSC, sRGB, etc.). Some of the standards measured (see NTSC and Adobe RGB) illustrate an effective maintenance in the color gamut, while other illustrate an increase of between 2 and 3% coverage. Therefore, the addition of dye(s) to a color filter can clearly increase luminance while, at the very least, maintaining color gamut.

TABLE 8

| Color gamut measurements for color filter with dye(s) | | | | |
|---|---|---|---|---|
| | CIE 1931 Color Gamut | | | |
| | Original panel | | Modified panel | |
| | Ratio, % | Coverage, % | Ratio, % | Coverage, % |
| NTSC | 69.75% | 67.61% | 72.68% | 67.75% |
| sRGB | 98.48% | 93.64% | 102.61% | 96.37% |
| Adobe RGB | 73.01% | 72.33% | 76.07% | 72.38% |
| DCI-P3 | 72.60% | 72.58% | 75.64% | 75.17% |
| BT.2020 | 52.08% | 52.08% | 54.27% | 54.26% |

FIGS. 18-21 illustrate the same type of information as FIGS. 14-17 but instead of dyes being present in the color filter, pigment(s) are used. As illustrated herein, pigment dispersions may provide better performance than a standard color filter. However, pigments are not optimized for the photolithography needed for modern displays. Therefore, while they are described herein and are potentially usable, preferred embodiments of the disclosed system use dyes. In the base-line performance, the toxicity factor can be reduced by almost 10% with pigments alone with additional improvements in gamut coverage.

Figure 18A:
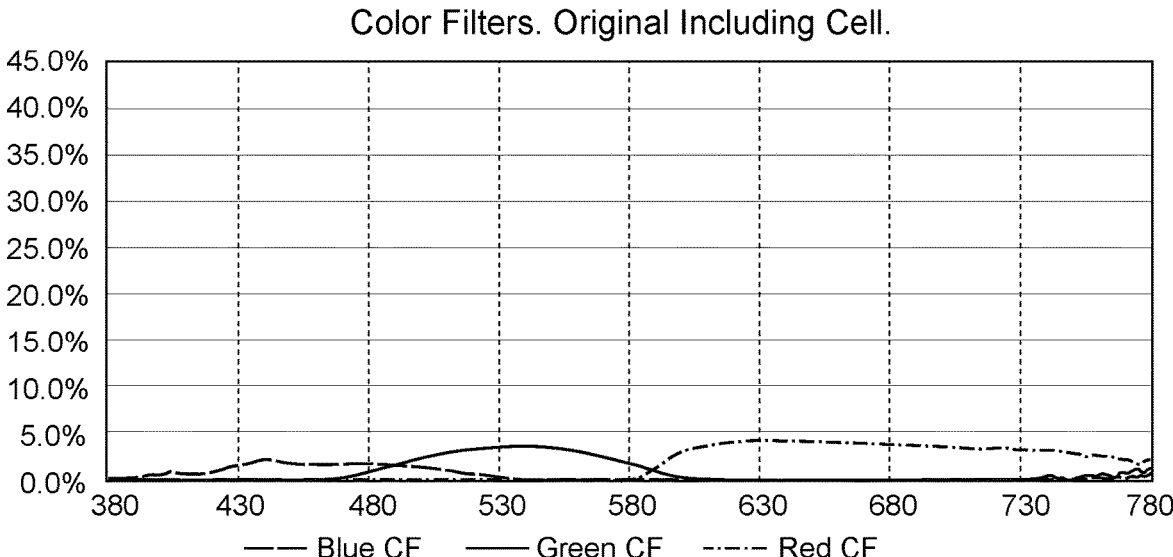
FIG. 18*a* is a non-limiting illustration of displays of spectral power distribution with simulation of red, green, and blue dye ink pigment dispersions, unmodified.
Figure 18B:
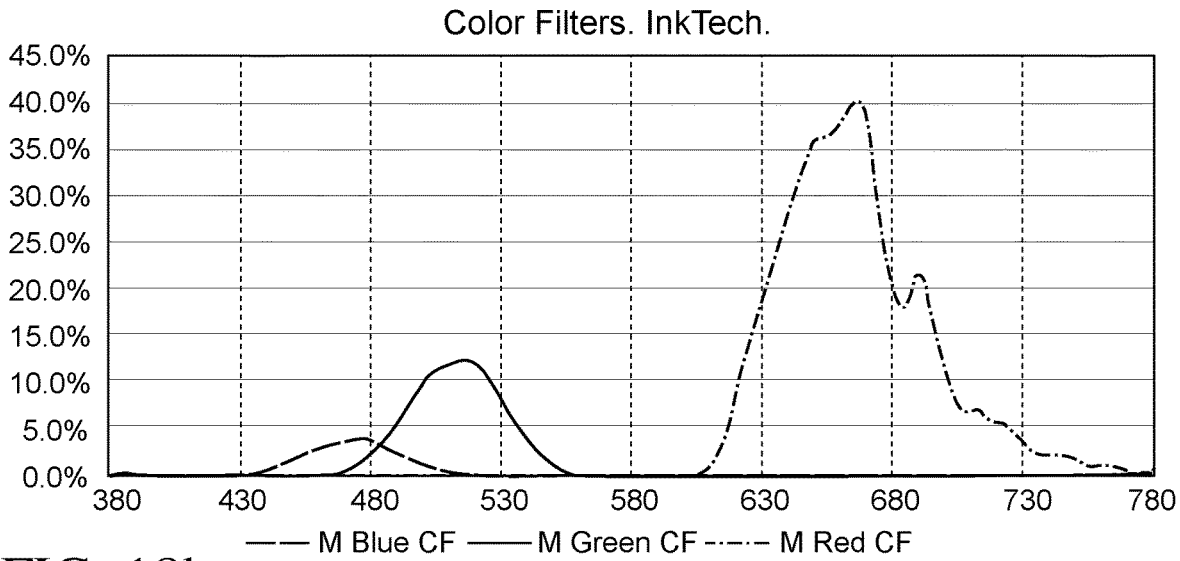
FIG. 18*b* is a non-limiting illustration of displays of spectral power distribution with simulation of blue and green dye ink pigment dispersions, modified with dyes.

In the figures, FIG. 18a (no pigments) and FIG. 18b (color filter with pigment(s)) show the change in transmittance before and after the color filter includes pigment(s). In the comparison between FIGS. 18a and 18b, the addition of the pigment(s) clearly improves the separation between the different transmission peaks. For example, there is overlap between the blue and green transmission curves in FIG. 18a that is reduced in FIG. 18b. This is similar, and even more dramatic, when comparing overlap between the green and red curves. As mentioned above, this decrease in overlap results in improved color gamut. Additionally, as is evidenced in the comparison of FIGS. 18a and 18b, overall transmission of each of the colors is not impacted by the addition of pigment(s). In fact, for the green and red transmission curves, there is a significant improvement in transmission. Therefore, as illustrated, improved color gamut does not result in lower transmittance or luminosity.

Figures 19A, 19B, 19C:
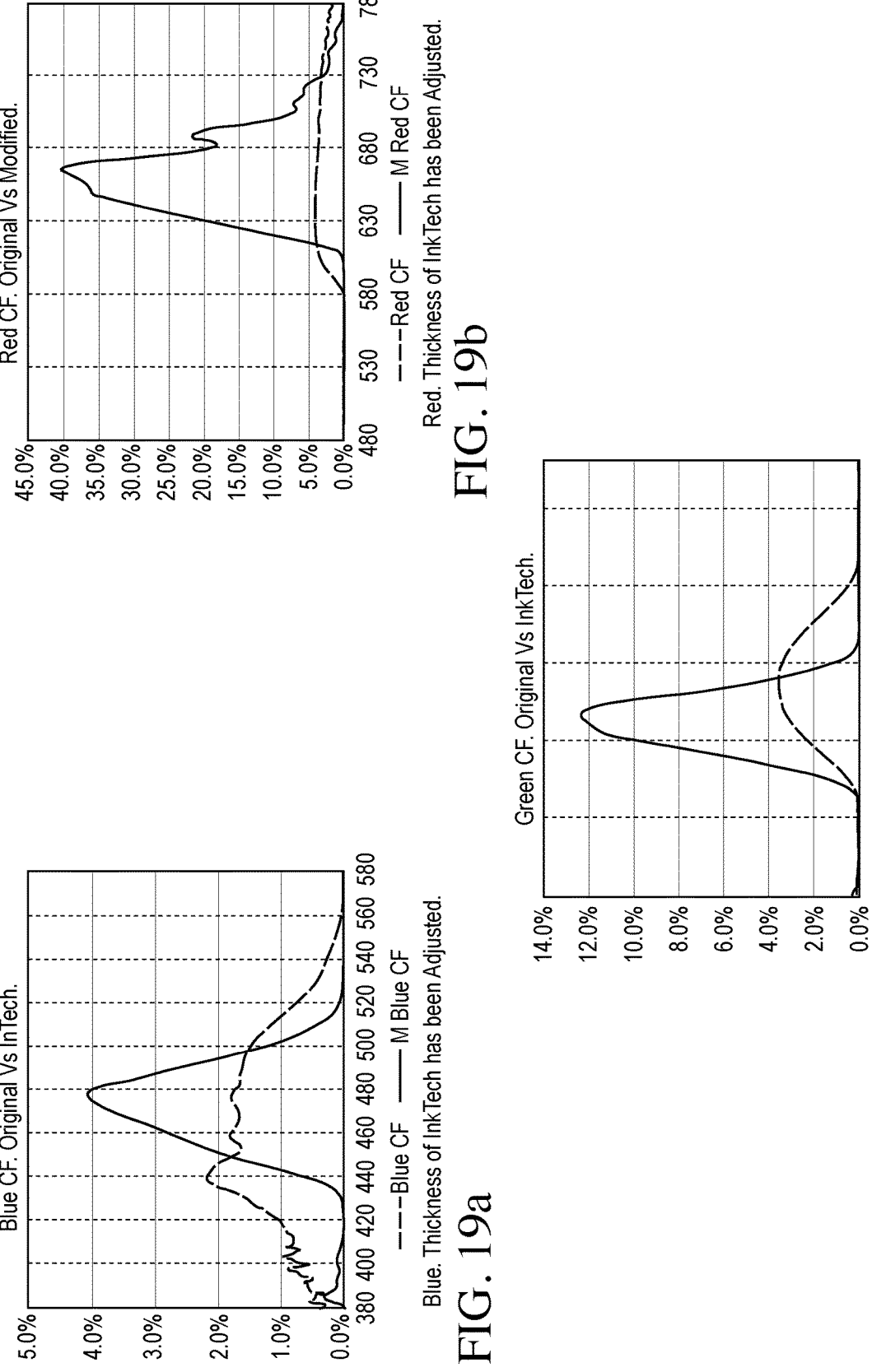
FIG. 19*a-c* is a non-limiting illustration of displays of spectral power distribution with simulation of red, green and blue pigment dye dispersions, respective of the identified color targeting type of dye.

FIGS. 19a-c are a comparison between each of the individual color filters of graphs 18a and 18b. The color filters are associated with certain wavelength ranges, and the isolated color filters show the changes between unmodified and pigment-modified color filters. More specifically, FIG. 19a compares the original blue color filter transmission curve against the modified blue color filter transmission curve. Similarly, FIG. 19b compares the original red color filter transmission curve against the modified red color filter transmission curve, and FIG. 19c compares the original green color filter transmission curve against the modified green color filter transmission curve. The improved transmissions after pigment(s) is added are clearly illustrated in FIGS. 19a-c by comparing the peaks in each graph for an unmodified filter and a modified filter.

Figure 20A:
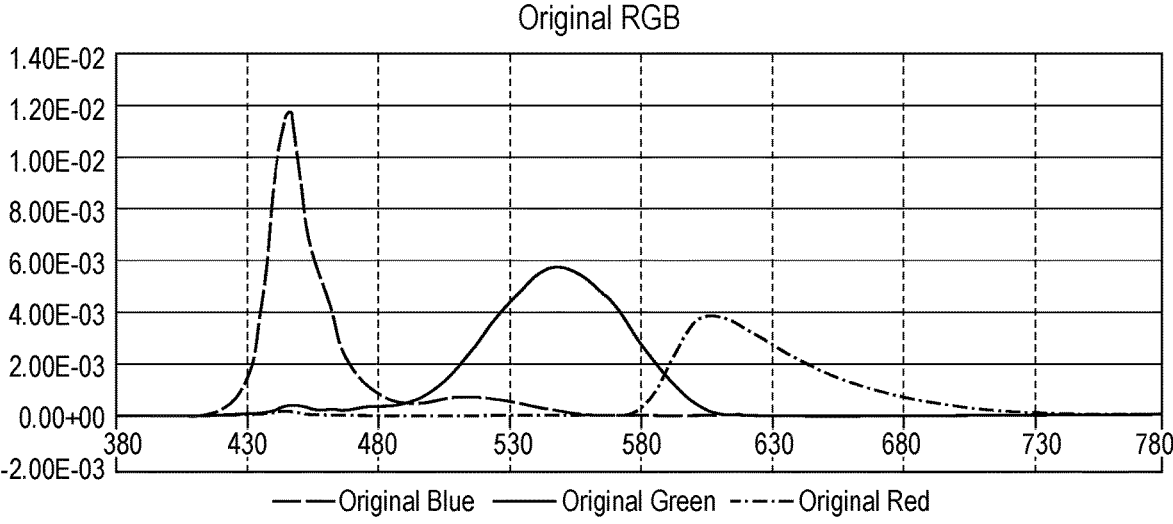
FIG. 20*a* is a non-limiting illustration of displays of spectral power distribution with simulation of red, blue and green pigment dispersions, without modification.
Figure 20B:
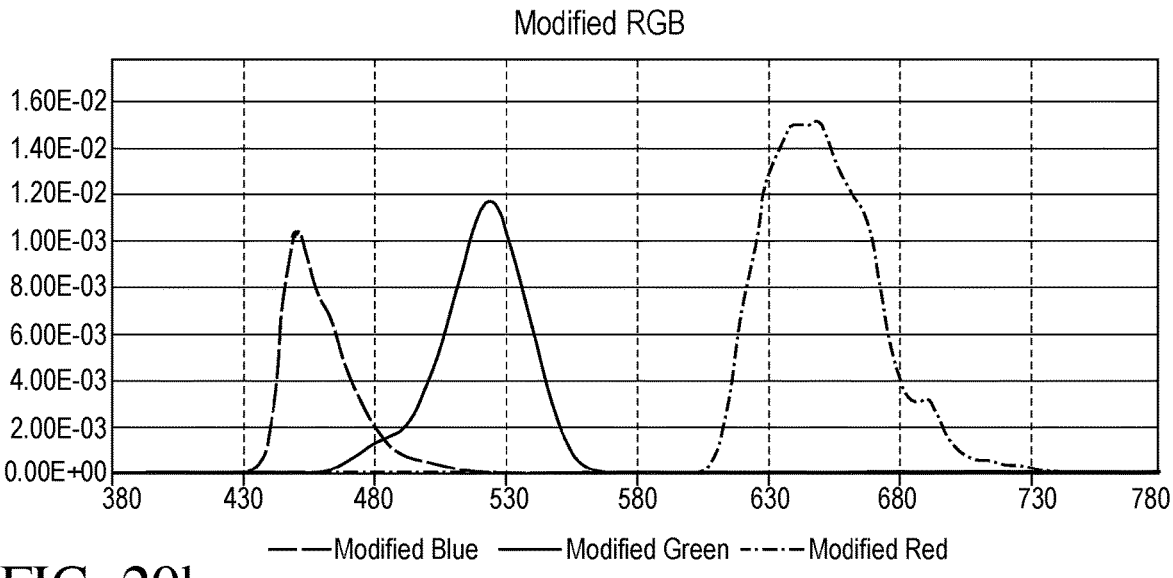
FIG. 20*b* is a non-limiting illustration of displays of spectral power distribution with simulation of red, blue and green pigment dye dispersions, modified with dyes.
Figures 21A, 21B, 21C:
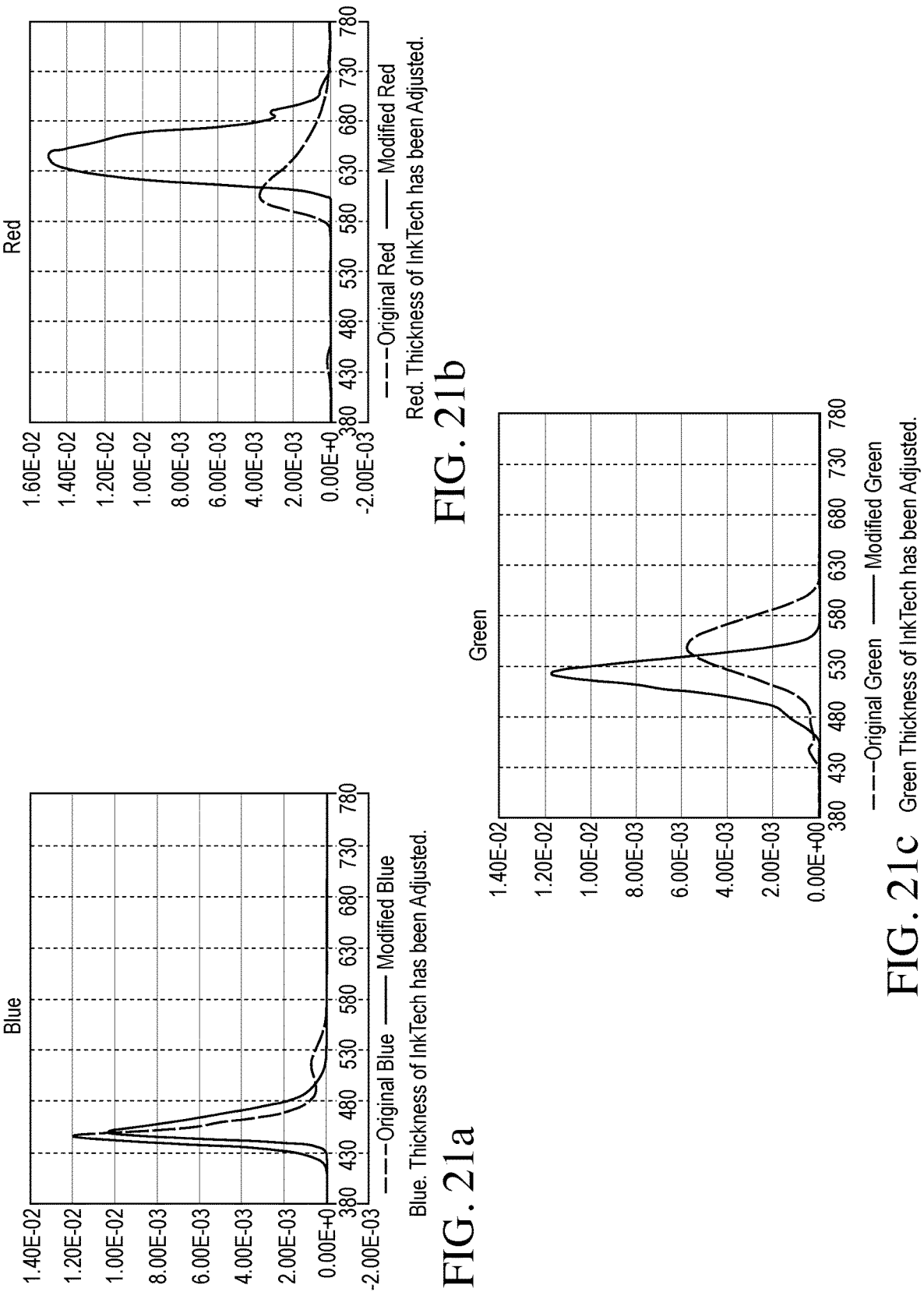
FIG. 21*a-c* is a non-limiting illustration of displays of spectral power distribution with simulation of red, blue and green dye pigments dispersions with dyes at the backlight unit level.
Figure 21D:
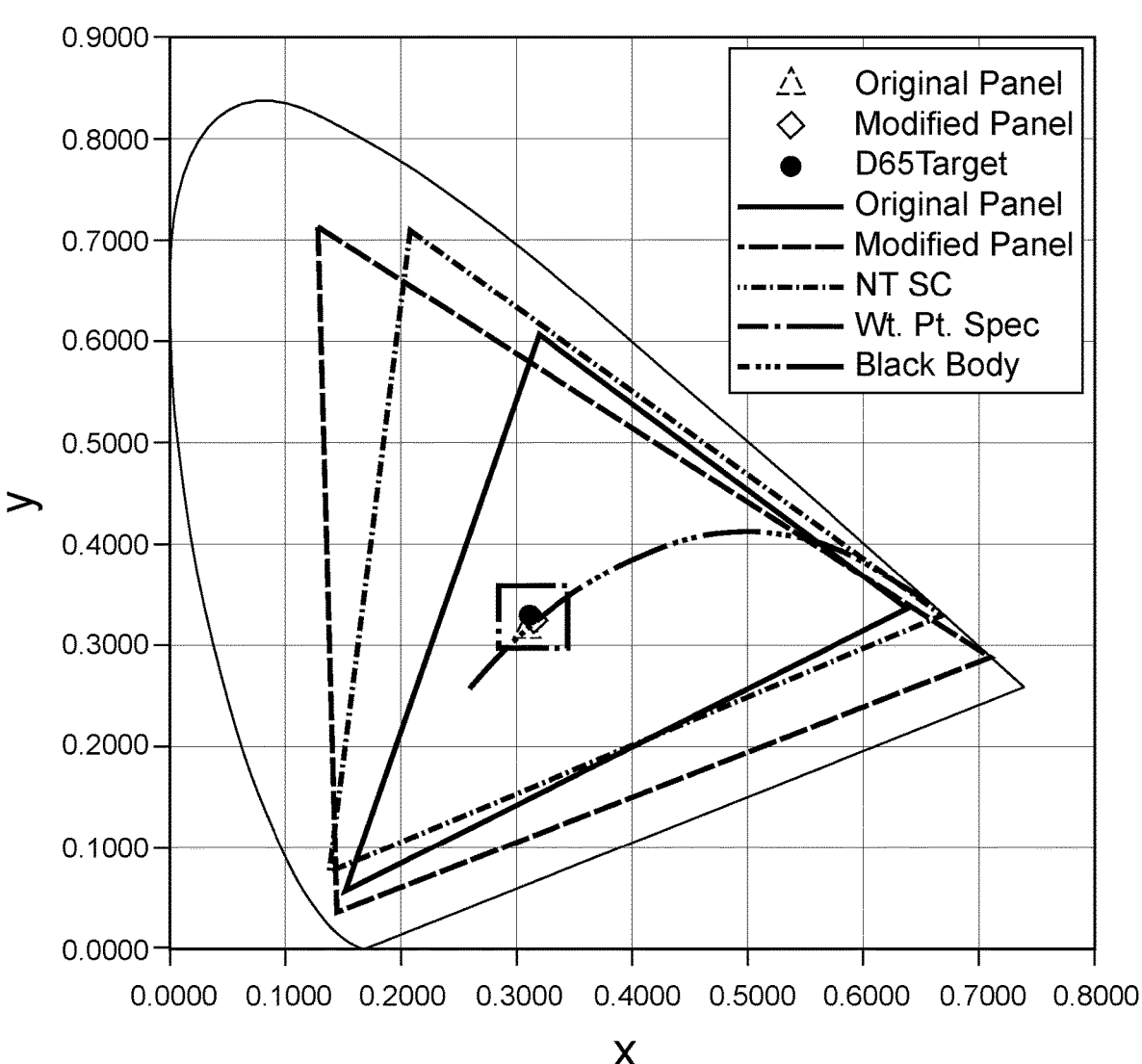
FIG. 21*d* is a non-limiting illustration of the color gamut of unmodified and addition of modification pigments to a color filter.
Figure 22A:
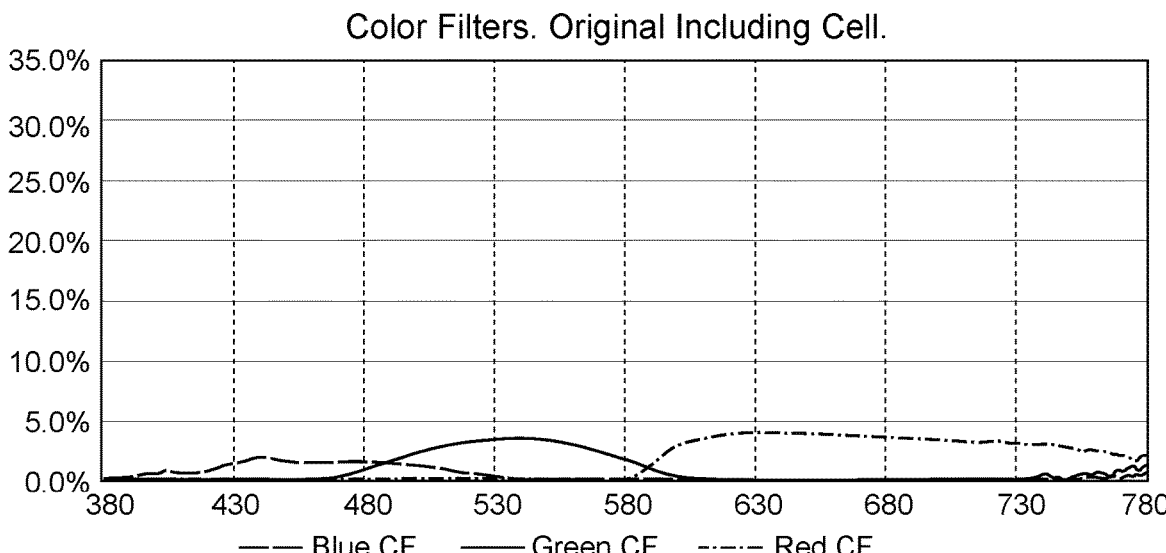
FIG. 22*a* is a non-limiting illustration of displays of spectral power distribution with simulation of red, green, and blue dye ink pigment dispersions, unmodified.
Figure 22B:
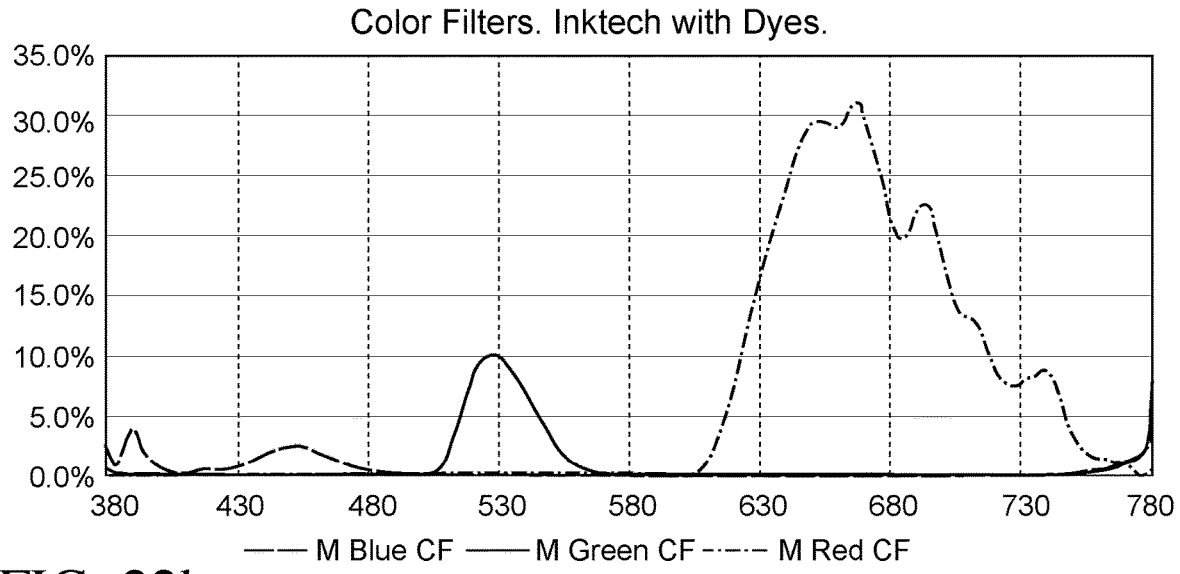
FIG. 22*b* is a non-limiting illustration of displays of spectral power distribution with simulation of blue and green dye ink pigment dispersions, modified with dyes.

FIGS. 20a-b illustrate the impact on the red, green, and blue primary color saturation when pigment(s) are added to a color filter. More specifically, FIGS. 20a-b are a graphical illustration of the maintained (or improved) color gamut as also seen in the color gamut chart of FIG. 21d. The figures illustrate that the addition of pigment(s) to a color filter can sharpen the primary colors. FIG. 20a (no pigments) and FIG. 20b (color filter with pigment(s)) show the change in color saturation after the color filter includes pigment(s). As with the previous FIGS. 18-19, FIGS. 20a and 20b are broken down by color in FIGS. 21a-c where it is clear that the addition of pigment(s) to the color filter maintains, if not improves, the color saturation and sharpness. FIG. 21d illustrates a color gamut chart for the original (no pigment(s) added) and modified (pigment(s) added to color filter) display panels. As is well known, color gamut charts illustrate the three primary colors: red, green, and blue. While the figures herein are in black and white, they are to be interpreted as incorporating the standard gamut chart color gradients as illustrated at: https://upload.wikimedia.org/wikipedia/commons/9/91/SRGB_chromaticity_CIE1931.svg

TABLE 9

| illustrates a breakdown of the data illustrated in FIG. 21d. | | | | | | |
|---|---|---|---|---|---|---|
| Data Sets | | Original panel | | | Modified Panel | Diff. |
| Red | x | 0.6406 | Red | x | 0.7096 | −0.0690322 |
| | y | 0.3385 | | y | 0.2903 | 0.0482158 |
| | Y | 0.0863 | | Y | 0.1219 | −0.0356136 |
| Green | x | 0.3192 | Green | x | 0.1300 | 0.18915083 |
| | y | 0.6086 | | y | 0.7143 | −0.1057299 |
| | Y | 0.3176 | | Y | 0.3018 | 0.01583219 |
| Blue | x | 0.1545 | Blue | x | 0.1444 | 0.0101312 |
| | y | 0.0602 | | y | 0.0396 | 0.0206847 |
| | Y | 0.0355 | | Y | 0.0205 | 0.01500686 |
| White | x | 0.3081 | White | x | 0.3144 | −0.0062584 |
| Point | y | 0.3216 | Point | y | 0.3264 | −0.0048146 |
| | Y | 0.4394 | | Y | 0.4442 | −0.0047745 |
| | L* | 3.9692 | | L* | 4.0123 | −0.0431281 |
| | a* | 0.1358 | | a* | 0.2291 | −0.0932128 |
| | b* | −0.3960 | | b* | −0.0767 | −0.3192571 |

Therefore, collectively, FIGS. 18-21 illustrate that the addition of pigment(s) to a color filter (for example, at the subpixel level as described above wherein blue dyes and/or pigments can be added to blue subpixels, green dyes and/or pigments can be added to green subpixels, red dyes and/or pigments can be added to red subpixels, as well as combinations thereof) can lead to an overall luminance improvement, a reduction in toxic blue light, and maintained or improved color gamut. More specifically, the Blue Light Toxicity Factor can be reduced by 9.79% and the luminance can be increased by 1.0%. As illustrated in Table 10 below, the gamut coverage percentages are most relevant to show the improvement in the various standard gamut charts (NTSC, sRGB, etc.). All of the standards measured illustrate an increase of between 6 and 21% coverage. Therefore, the addition of pigment(s) to a color filter can effectively maintain luminance while greatly improving color gamut.

TABLE 10

| Color gamut measurements for color filter with pigment(s) | | | | |
|---|---|---|---|---|
| | CIE 1931 Color Gamut | | | |
| | Original panel | | Modified panel | |
| | Ratio, % | Coverage, % | Ratio, % | Coverage, % |
| NTSC | 69.75% | 67.61% | 121.67% | 86.33% |
| sRGB | 98.48% | 93.64% | 171.79% | 99.27% |
| Adobe RGB | 73.01% | 72.33% | 127.35% | 93.53% |

TABLE 10-continued

| Color gamut measurements for color filter with pigment(s) | | | | |
|---|---|---|---|---|
| | CIE 1931 Color Gamut | | | |
| | Original panel | | Modified panel | |
| | Ratio, % | Coverage, % | Ratio, % | Coverage, % |
| DCI-P3 | 72.60% | 72.58% | 126.64% | 88.47% |
| BT.2020 | 52.08% | 52.08% | 90.85% | 61.48% |

FIGS. 22-25 illustrate the same type of information as FIGS. 14-17 and 18-21 but instead of either dyes or pigments being present in the color filter, both dyes and pigments are used. Therefore, in the figures, FIG. 22*a* (no dyes/pigments) and FIG. 22*b* (color filter with dye(s) and pigment(s)) show the change in transmittance before and after the color filter includes dye(s) and pigment(s). In the comparison between FIGS. 22*a* and 22*b*, the addition of the dye(s)/pigment(s) clearly improves the separation between the different transmission peaks. For example, there is overlap between the blue and green transmission curves in FIG. 22*a* that is clearly reduced in FIG. 22*b*. This is similar, and even more dramatic, when comparing overlap between the green and red curves. As mentioned above, this decrease in overlap results in improved luminosity and color gamut. Additionally, as is evidenced in the comparison of FIGS. 22*a* and 22*b*, overall transmission of each of the colors is not impacted by the addition of dye(s) and pigment(s). In fact, for the green and red transmission curves, there is a significant improvement in transmission. Therefore, as illustrated, improved color gamut does not result in lower transmittance or luminosity.

Figures 23A, 23B, 23C:
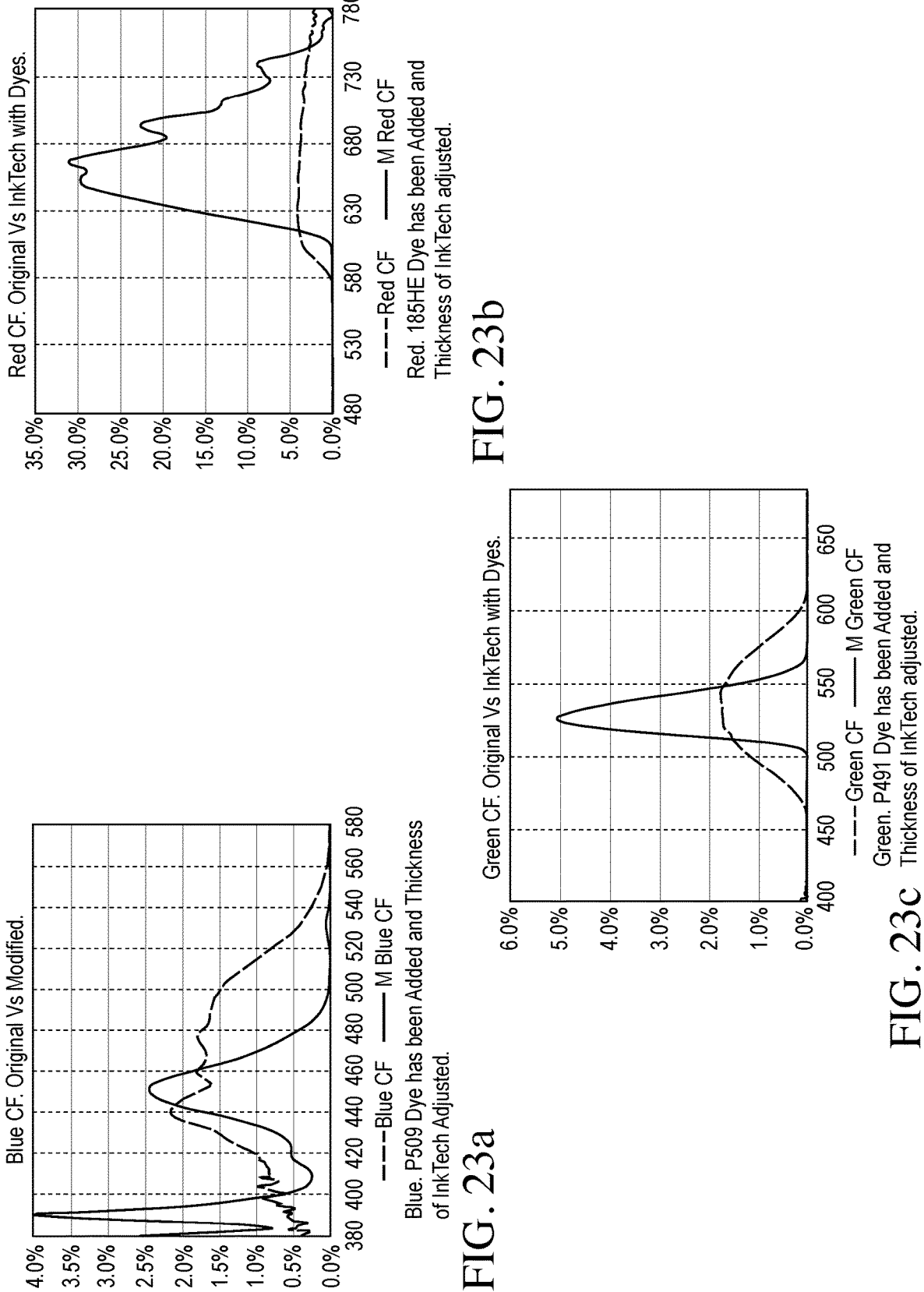
FIG. 23*a-c* is a non-limiting illustration of displays of spectral power distribution with simulation of red, green and blue pigment dye dispersions, respective of the identified color targeting type of dye.

FIGS. 23*a-c* are a comparison between each of the individual color filters of graphs 22*a* and 22*b*. The color filters are associated with certain wavelength ranges, and the isolated color filters show the changes between unmodified and dye/pigment-modified color filters. More specifically, FIG. 23*a* compares the original blue color filter transmission curve against the modified blue color filter transmission curve. Similarly, FIG. 23*b* compares the original red color filter transmission curve against the modified red color filter transmission curve, and FIG. 23*c* compares the original green color filter transmission curve against the modified green color filter transmission curve. The improved transmissions after dye(s) and pigment(s) are added are clearly illustrated in FIGS. 23*a-c* by comparing the peaks in each graph for an unmodified filter and a modified filter.

Figure 24A:
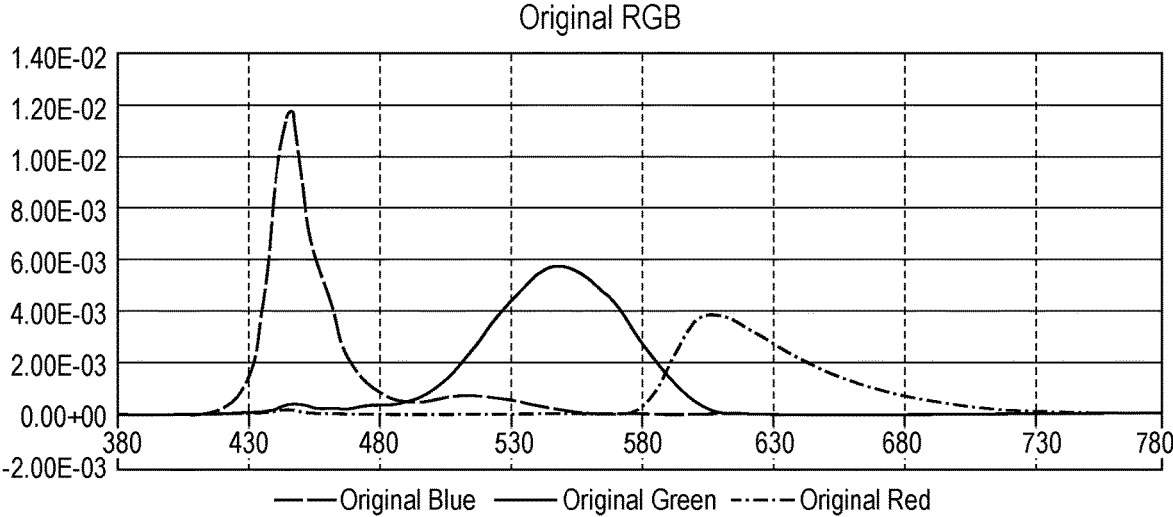
FIG. 24*a* is a non-limiting illustration of displays of spectral power distribution with simulation of red, blue and green pigment dispersions, without modification.
Figure 24B:
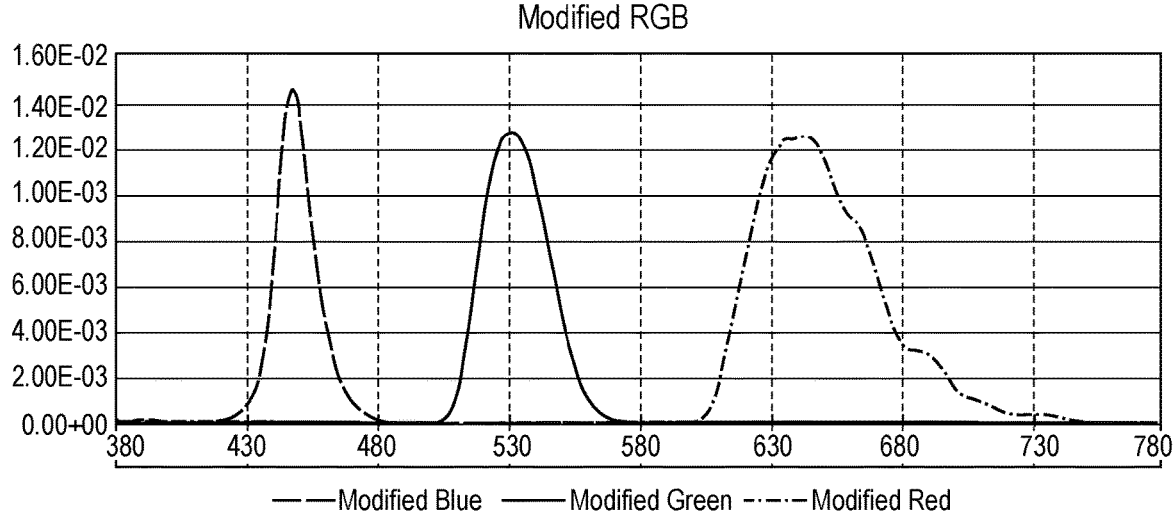
FIG. 24*b* is a non-limiting illustration of displays of spectral power distribution with simulation of red, blue and green pigment dye dispersions, modified with dyes.
Figures 25A, 25B, 25C:
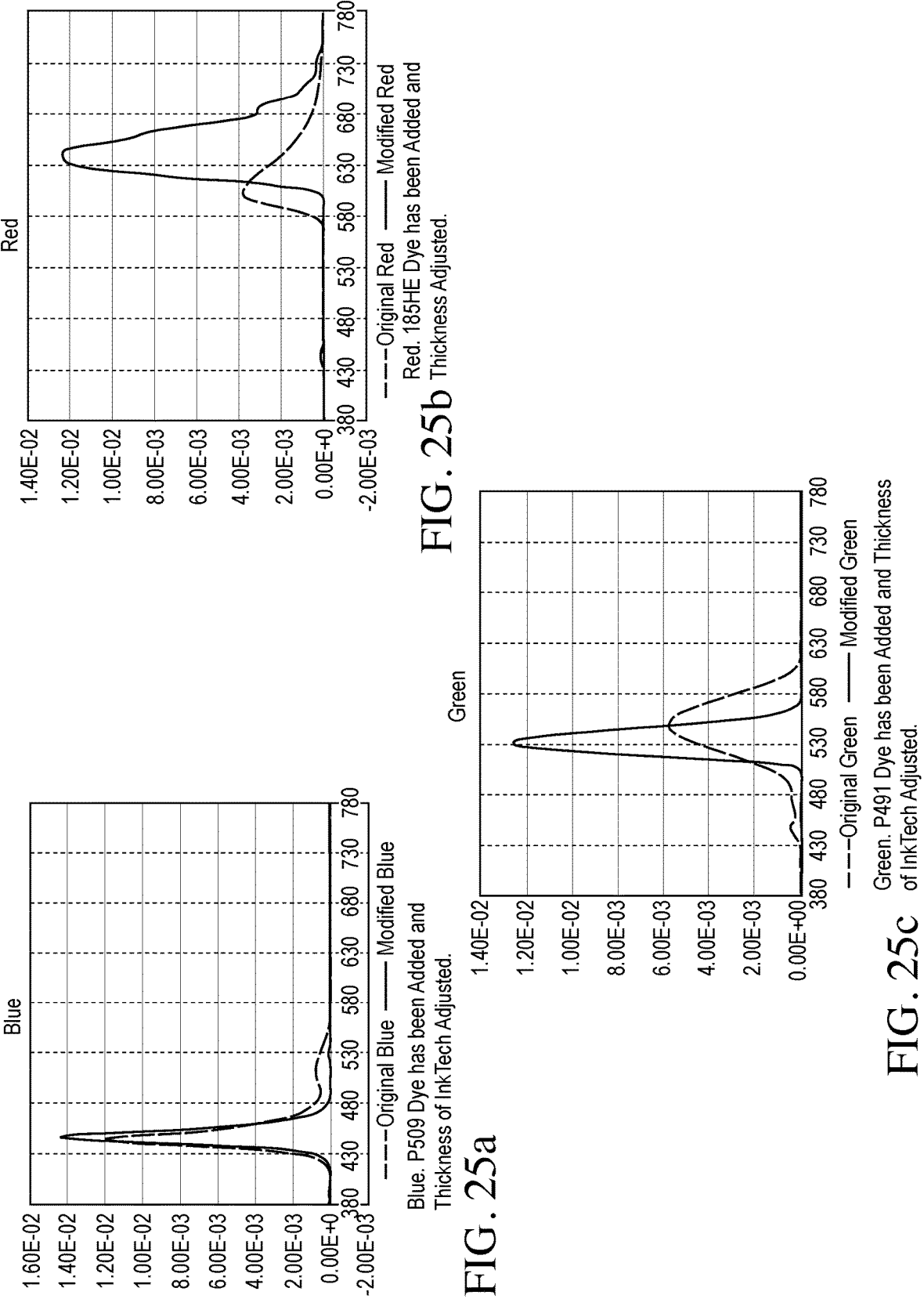
FIG. 25*a-c* is a non-limiting illustration of displays of spectral power distribution with simulation of red, blue and green dye pigments dispersions with dyes at the backlight unit level.
Figure 25D:
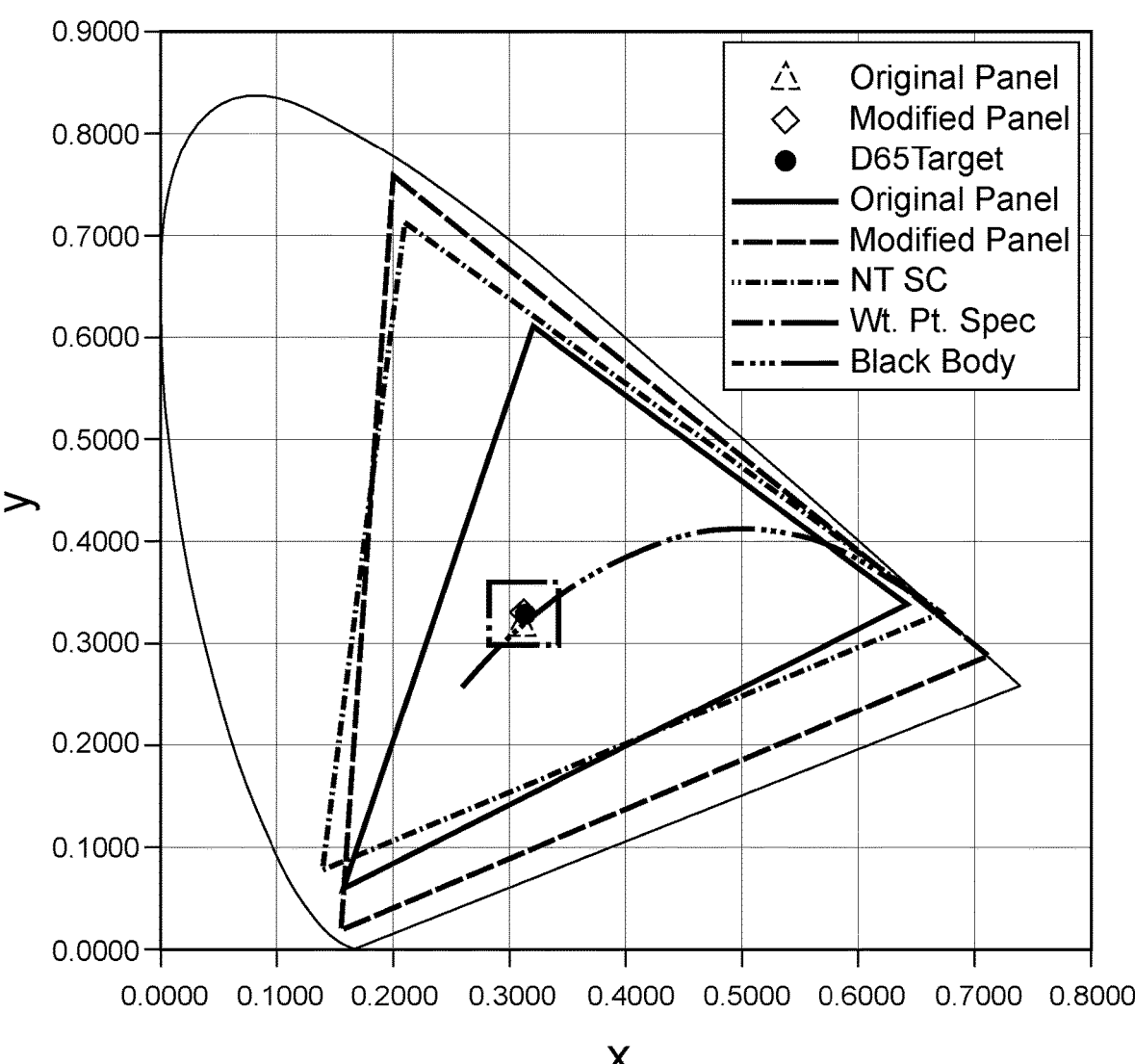
FIG. 25*d* is a non-limiting illustration of the color gamut of unmodified and addition of modification dyes and pigments to a color filter.

FIGS. 24*a-b* illustrate the impact on the red, green, and blue primary color saturation when dye(s) and pigment(s) are added to a color filter. More specifically, FIGS. 24*a-b* are a graphical illustration of the maintained (or improved) color gamut as also seen in the color gamut chart of FIG. 25*d*. The figures illustrate that the addition of dye(s) and pigment(s) to a color filter can sharpen the primary colors. FIG. 24*a* (no dyes/pigments) and FIG. 24*b* (color filter with dye(s) and pigment(s)) show the change in color saturation after the color filter includes dye(s) and pigment(s). As with the previous FIGS. 22-23, FIGS. 24*a* and 24*b* are broken down by color in FIGS. 25*a-c* where it is clear that the addition of dye(s) and pigment(s) to the color filter maintains, if not improves, the color saturation and sharpness. FIG. 25*d* illustrates a color gamut chart for the original (no dye(s)/pigment(s) added) and modified (dye(s) and pigment(s) added to color filter) display panels. As is well known, color gamut charts illustrate the three primary colors: red, green, and blue. While the figures herein are in black and white, they are to be interpreted as incorporating the standard gamut chart color gradients as illustrated at: https://upload.wikimedia.org/wikipedia/commons/9/91/SRGB_chromaticity_CIE1931.svg

TABLE 11

| illustrates a breakdown of the data illustrated in FIG. 25d. | | | | | | |
|---|---|---|---|---|---|---|
| Data Sets | | Original panel | | | Modified Panel | Diff. |
| Red | x | 0.6406 | Red | x | 0.7094 | −0.0688108 |
| | y | 0.3385 | | y | 0.2905 | 0.0479959 |
| | Y | 0.0863 | | Y | 0.1013 | −0.01499 |
| Green | x | 0.3192 | Green | x | 0.2028 | 0.11637725 |
| | y | 0.6086 | | y | 0.7560 | −0.1473988 |
| | Y | 0.3176 | | Y | 0.3415 | −0.0239479 |
| Blue | x | 0.1545 | Blue | x | 0.1556 | −0.0010227 |
| | y | 0.0602 | | y | 0.0210 | 0.03923364 |
| | Y | 0.0355 | | Y | 0.0120 | 0.02347752 |
| White | x | 0.3081 | White | x | 0.3117 | −0.0035979 |
| Point | y | 0.3216 | Point | y | 0.3312 | −0.009634 |
| | Y | 0.4394 | | Y | 0.4549 | −0.0154604 |
| | L* | 3.9692 | | L* | 4.1088 | −0.139654 |
| | a* | 0.1358 | | a* | −0.1762 | 0.31201748 |
| | b* | −0.3960 | | b* | 0.0680 | −0.464046 |

Therefore, collectively, FIGS. 22-25 illustrate that the addition of dye(s) and pigment(s) to a color filter (for example, at the subpixel level as described above wherein blue dyes and/or pigments can be added to blue subpixels, green dyes and/or pigments can be added to green subpixels, red dyes and/or pigments can be added to red subpixels, as well as combinations thereof) can lead to an overall luminance improvement, a reduction in toxic blue light, and maintained or improved color gamut.

More specifically, the Blue Light Toxicity Factor can be reduced by 7.41% and the luminance can be increased by 3.7%. As illustrated in Table 12 below, the gamut coverage percentages are most relevant to show the improvement in the various standard gamut charts (NTSC, sRGB, etc.). All of the standards measured illustrate an increase of between 6 and 36% coverage. Therefore, the addition of dye(s) and pigment(s) to a color filter can clearly increase luminance while greatly improving color gamut.

TABLE 12

| Color gamut measurements for color filter with dye(s) and pigment(s) | | | | |
|---|---|---|---|---|
| | CIE 1931 Color Gamut | | | |
| | Original panel | | Modified panel | |
| | Ratio, % | Coverage, % | Ratio, % | Coverage, % |
| NTSC | 69.75% | 67.61% | 124.63% | 97.50% |
| sRGB | 98.48% | 93.64% | 175.96% | 99.88% |
| Adobe RGB | 73.01% | 72.33% | 130.44% | 99.25% |
| DCI-P3 | 72.60% | 72.58% | 129.71% | 99.76% |
| BT.2020 | 52.08% | 52.08% | 93.06% | 88.17% |

Other features may be added to optimize the stack. Display systems according to this disclosure can include backlight units that include optical stacks. The disclosed optical stacks can include light-emission systems such as light-emitting diodes, arrays of light-emitting diodes or other sources of substantially white light. These optical stacks can include layers of optical films that can pass the light transparently or can modify properties of the light passing therethrough. This can include reflection layers, diffusion layers, brightness enhancing layers (usually prismatic), and polarizer filters, to name a few. In some embodiments the optical stacks can include at least one optical film having at least one light conversion layer therewithin. Additionally, that same at least one optical film can have light absorption layers thereon or therewithin. Alternatively, the optical stack can include at least one optical film having at least one light conversion material and at least one optical film having at least one light absorption disposed thereon or therewithin. The stacks may also reduce glare and have additional benefits in the resulting display appearance.

In other embodiments, depending on the dye or pigments used and the amount that is used in the layer of the color filter, the result may change the resulting color seen by the user by changing the color gamut of the emitted light through the filter layer. The addition of specific compounds, such as dyes and pigments, and in certain amounts may cause the color of the resulting light through the color filter to change in the color gamut. In other embodiments the value of the transmission and emission of the color filter may also reduce in value as a result of the additional compounds, reducing the value of the color that may represent the color emission, transmission, intensity, etc. The reduction in color value may result in a reduction of color overlap, resulting in improved definition between colors and better control of colors and sharpness of picture.

The color filter may, in some embodiments, also include dyes affecting certain colors to the associated subpixel. For example, dyes or pigments selected may affect the color blue, so the dye may be added to the blue subpixel. In some instances, the dye may absorb the color blue, but in other instances, the dye may increase or improve transmission of the blue wavelengths. In some embodiments, the dye may impact other wavelengths other than blue light, or in other embodiments, the light may improve or increase the transmission of the blue light wavelengths (particularly, light in certain wavelengths associated by the user as blue colored light). In another embodiment, the same dye or different dyes, pigments, or compounds, may be added to other color subpixels (not limited to red and green subpixels), to further control the color, color contrast, and definition of picture, and to lower the toxicity of certain light in specific wavelength ranges. The possible addition of red and green dyes, compounds, pigments, etc. to red and green subpixels respectively, may cause a shift in the color gamut and may improve the resulting light display by changing the resulting light through the filter. In this instance, the user experience may be improved though the color gamut expansion or changed area of color definition, so the resulting emitted light is enhanced. The user experience is improved with improved display picture and safe light emission, improving the wellness and wellbeing of the user.

Approaches to blue light emission mitigation that are based upon absorption of light (or that otherwise remove light), without subsequent emission of light in the visible region of the electromagnetic spectrum, can generally result in a decrease in the brightness (measured and/or perceived) of a display, as compared with an otherwise identical reference display without such absorption features. In some cases, to compensate for such an absorption-related brightness decrease, the power input to a display can be increased (relative to the power input to a reference display). Generally, increases in display power consumption can be undesirable, particularly in portable devices where they may negatively impact battery life.

In the present disclosure, systems for modifying the emission of light from displays are disclosed in which light conversion materials or light absorbing materials can be employed away from light sources (such as color filter 112 of FIG. 1) of a display. Light conversion materials generally can absorb light in a first wavelength range and emit light in a second wavelength range (thus "converting" light from one wavelength range to another). Light absorbing materials absorb light in one wavelength range. In the present disclosure, conversion from shorter wavelengths to longer wavelengths can be referred to as "upconversion" and conversion from longer wavelengths to shorter wavelengths can be referred to as "downconversion." It should be recognized that these definitions may not be universal, however, and that other documents may define upconversion and downconversion oppositely (for example, some documents may define such terms relative to frequency, which is inversely related to wavelength).

Systems using light conversion materials away from light sources of a display can be used to absorb light in less useful or harmful wavelength ranges, such as UV and blue light ranges (particularly below about 455 nm) and re-emit light in more benign wavelength ranges (from a health perspective) that can be more useful, such as in green and/or red wavelength ranges. In some cases, light can be upconverted from shorter blue wavelengths (at or below about 455 nm) to longer blue wavelengths that can be less harmful and also useful for display illumination. In ways such as these, systems using light conversion materials away from light sources can modify the emission of light from display systems, relative to display systems not employing such light conversion materials.

In some examples, systems using light conversion materials or light absorbing materials away from light sources of a display can be employed with electronic device displays to mitigate blue light emissions such that the resulting display systems can achieve brightness comparable to reference displays without light conversion materials or light absorbing layers away from light sources, while consuming not more than 10% more energy than the reference displays.

Systems using light conversion materials or light absorbing materials away from light sources can improve the color balance of a display, compared to some known prior approaches to reducing blue light emissions from a display that do not employ light conversion materials or light absorbing materials away from light sources. Some such known prior approaches can reduce blue light emissions by absorbing or otherwise removing a portion of blue light from the spectrum, thus altering the spectral balance of the light emitted from the display. In systems of the present disclosure, in addition to reducing the amount of hazardous blue light emitted from an electronic display device, light conversion materials away from light sources can re-emit light that can contribute to, aid, or otherwise improve the color balance of light emitted from an electronic display device, as compared with an otherwise similar display with blue light mitigation that does not include such light conversion materials. In some embodiments, display systems that include systems of the present disclosure incorporating light conversion materials or light absorbing materials away from light sources can maintain a D65 white point. In some embodiments, display systems that include systems of the present disclosure incorporating light conversion materials or light absorbing materials away from light sources can maintain a correlated color temperature (CCT) substantially the same as a reference display system without the blue light mitigation systems of the present disclosure.

In some embodiments of systems of the present disclosure, at least one light conversion material can be used in combination with at least one light absorbing material to reduce hazardous blue light emissions from, and improve or maintain the color balance of, a display system.

Systems of the present disclosure can include multiple light conversion materials or light absorbing materials that can absorb light from multiple wavelength ranges, including wavelength ranges other than UV or blue wavelength ranges.

Light conversion materials or light absorbing materials can be included or provided in, on, or with a film of light management films, reflector, or another layer, in any suitable manner. In some embodiments, light conversion materials or light absorbing materials can be extruded, cast, or diffused within with a film. In some embodiments, light conversion materials or light absorbing materials can be coated onto a film. In some embodiments, the light conversion materials or light absorbing materials can be included as a separate film layer or coated onto any of the layers that make up the backlight unit. In some embodiments, light conversion materials or light absorbing materials can be provided in or with an adhesive used to bond or laminate one or more layers of a display system, such as any suitable layers or films of display system 100. Such an adhesive incorporating light conversion materials or light absorbing materials can be substantially optically clear, exhibiting negligible scattering of light transmitted through the adhesive, other than redirection of light associated with absorption and re-emission by light conversion materials.

In some embodiments, light conversion materials or light absorbing materials can be solubly or insolubly distributed or dispersed throughout a material that is a component or precursor of any suitable film or layer of display system 100. Systems of the present disclosure incorporating light conversion materials or light absorbing materials can be custom designed to retrofit into existing display systems, with selectable design parameters including choice of light conversion materials, light absorbing materials, and also other non-converting blocking or filtering compounds. In other examples, new display systems can be designed that employ systems of the present disclosure incorporating light conversion and/or light absorbing materials. Through judicious choices of LEDs (and/or other light sources), light conversion materials, light absorbing materials, and other non-converting blocking or filtering compounds, and other optical films and devices, numerous combinations of approaches can be developed to provide displays that addresses eye health concerns while providing high display quality.

While embodiments of the disclosed improvements have been illustrated and described, it will also be apparent that various modifications can be made without departing from the scope of the invention. It is also contemplated that various combinations or sub combinations of the specific features and aspects of the disclosed embodiments can be combined with or substituted for one another in order to form varying modes of the embodiments. Accordingly, it is not intended that the disclosed improvements be limited, except as by the appended claims. All references cited within are herein incorporated by reference in their entirety.

What is claimed is:

1. A display system comprising:
a light emitting array; and
a color filter having one or more light absorbing materials, wherein
the one or more light absorbing materials are one or more light absorbing dyes, the one or more light absorbing dyes comprise a soluble, primary light absorbing dye,
the soluble, primary light absorbing dye has only absorption properties and absorbs light in a particular wavelength range,
the color filter is comprised of a plurality of pixels,
each pixel is comprised of a red, a green, and a blue subpixel,
the subpixels are created from a resin and colorants such that each subpixel has resin and at least one colorant,
the colorants are suspended in the resin of the subpixels,
the soluble, primary light absorbing dye is dissolved in the resin of at least one color set of the red, green, and blue subpixels, and
the soluble, primary light absorbing dye is a separate compound than the colorants.

2. The display system of claim 1, further comprising light emitting diodes incorporated into the light emitting array, a reflector adjacent to the light emitting array, a diffuser opposite the reflector, a thin film transistor array layer, and a layer of cover glass.

3. The display system of claim 1, wherein the liquid crystal panel is adjacent to the color filter and is comprised of a liquid crystal layer disposed between two panel plates.

4. The display system of claim 1, further comprising a first brightness enhancing layer and at least one polarizer, wherein
a first polarizer is located adjacent the color filter,
a second brightness enhancing layer is adjacent to the first brightness enhancing layer, and
a second polarizer is located next to the backlight unit.

5. The display system of claim 1, the color filter further comprising one or more dye enhancement compounds located within the resin of at least one color set of the red, green, and blue subpixels in the color filter, wherein the one or more dye enhancement compounds are at least one of a photoinitiator, a polymerization initiation aid, a monomer, and a stabilizer.

6. The display system of claim 1, the color filter further comprising one or more dye enhancement compounds located within the resin of at least one color set of the red, green, and blue subpixels in the color filter, wherein the one or more dye enhancement compounds are antioxidants.

7. The display system of claim 1, wherein the soluble, primary light absorbing dye is included in blue subpixels of the color filter.

8. The display system of claim 7, the one or more absorbing dyes further comprising a soluble, secondary light absorbing dye that only has absorption properties and that absorbs light at wavelengths below 415 nm.

9. The display system of claim 7, the one or more absorbing dyes further comprising a soluble, secondary light absorbing dye that only has absorption properties and that absorbs light at wavelengths above 480 nm.

10. The display system of claim 7, wherein the soluble, primary light absorbing dye reduces blue light toxicity factor by up to 20%.

11. The display system of claim 1, wherein the soluble, primary light absorbing dye is included in green subpixels of the color filter.

12. The display system of claim 11, the at least one absorbing dyes further comprising a first, soluble, secondary light absorbing dye that only has absorption properties and that absorbs light at wavelengths below 500 nm or a second, soluble, secondary light absorbing dye that only has absorption properties and that absorbs light at wavelengths above 575 nm.

13. The display system of claim 1, wherein the soluble, primary light absorbing dye is included in red subpixels of the color filter.

14. The display system of claim 13, the one or more absorbing dyes further comprising a soluble, secondary light absorbing dye that only has absorption properties and that absorbs light at wavelengths below 590 nm.

15. The display system of claim 1, the one or more absorbing dyes further comprising a second, soluble, primary light absorbing dye that only has absorption properties, wherein a first, soluble primary light absorbing dye absorbs in the wavelength range 410-430 nm, and a second, soluble primary light absorbing dye absorbs in the wavelength range of 470-495 nm.

16. The display system of claim 1, wherein the one or more absorbing dyes are at least one of organic dyes, metal complex dyes, porphyrin-based compounds, coumarins, retinal pigments, and phthalocyanine compounds.

17. The display system of claim 1, wherein there is a reduction in luminance of no more than 10% compared to a display system without the one or more absorbing dyes.

18. The display system of claim 1, wherein there is a change in color gamut of no more than 5%.

19. The display system of claim 1, wherein the absorbing dyes combined with the dye enhancement compounds are heat resistant and resist color gamut coordinate changes more than 0.005 along the X-axis and 0.005 along the Y-axis after being exposed to temperatures of at least 200 degrees Celsius for at least 30 minutes.

20. The display system of claim 1, wherein the soluble, primary light absorbing dye is a first soluble, primary light absorbing dye, the one or more light absorbing dyes further comprise a second and a third soluble, primary light absorbing dye, the first soluble, primary light absorbing dye is a blue-light absorbing dye located within the resin of blue subpixels of the color filter, the second soluble, primary light absorbing dye is a green-light absorbing dye located within the resin of green subpixels of the color filter, and the third soluble, primary light absorbing dye is a red-light absorbing dye located within the resin of red subpixels of the color filter.

21. The display system of claim 1, wherein the one or more light absorbing dyes further comprise a soluble, secondary light absorbing dye, and the soluble, secondary light absorbing dye is located within the resin of the at least one color set of the red, green, and blue subpixels in the color filter such that the primary light absorbing dye and the secondary light absorbing dye are located within the same color set of subpixels.

22. The display system of claim 7, the one or more absorbing dyes further comprising a first, soluble, secondary light absorbing dye that absorbs light at wavelengths below 415 nm, and a second, soluble, secondary light absorbing dye that absorbs light at wavelengths above 480 nm.

23. The display system of claim 7, wherein the soluble, primary light absorbing dye is a blue dye, the blue dye is dissolved in the resin of the blue subpixels, and the blue dye only impacts transmission in between 412 and 460.

24. The display system of claim 12, wherein the one or more absorbing dyes further comprise the first, soluble, secondary light absorbing dye that absorbs light at wavelengths below 500 nm and the second, soluble, secondary light absorbing dye that absorbs light at wavelengths above 575 nm.

25. The display system of claim 11, wherein the soluble, primary light absorbing dye is a green dye, the green dye is dissolved in the resin of the green subpixels, and the green dye only impacts transmission in between 490 and 610.

26. The display system of claim 13, wherein the soluble, primary light absorbing dye is a red dye, the red dye is dissolved in the resin of the red subpixels, and the red dye only impacts transmission in between 570 and 670.

27. A display system comprising:

a backlight unit having a light emitting array; and a color filter having one or more light absorbing materials, wherein the one or more light absorbing materials are one or more light absorbing dyes, the one or more light absorbing dyes comprise a soluble, primary light absorbing dye and a soluble, secondary light absorbing dye, the soluble, primary light absorbing dye and the soluble, secondary light absorbing dye only have absorption properties and absorb light in a predetermined wavelength range, the color filter is comprised of a plurality of pixels, each pixel is comprised of red, green, and blue subpixels, the subpixels are created from a resin and a colorant such that the red subpixels have a red colorant, the green subpixels have a green colorant, and the blue subpixels have a blue colorant, the colorants are suspended in the resin of the subpixels, the soluble, primary light absorbing dye and the soluble, secondary light absorbing dye are dissolved in the resin of at least one color set of the red, green, and blue subpixels, and the soluble, primary light absorbing dye and the soluble, secondary light absorbing dye are separate compounds than the colorants.

* * * * *